United States Patent
Vandenberg et al.

(10) Patent No.: US 12,234,654 B2
(45) Date of Patent: Feb. 25, 2025

(54) HIDDEN FASTENER UNIT AND RELATED METHOD OF USE

(71) Applicant: National Nail Corp., Grand Rapids, MI (US)

(72) Inventors: Roger A. Vandenberg, Hudsonville, MI (US); Todd E. A. Schwartzkopf, Hudsonville, MI (US)

(73) Assignee: National Nail Corp., Grand Rapids, MI (US)

( * ) Notice: Subject to any disclaimer, the term of this patent is extended or adjusted under 35 U.S.C. 154(b) by 906 days.

(21) Appl. No.: 17/328,072

(22) Filed: May 24, 2021

(65) Prior Publication Data

US 2021/0277668 A1    Sep. 9, 2021

Related U.S. Application Data

(63) Continuation-in-part of application No. 29/758,604, filed on Nov. 17, 2020, now Pat. No. Des. 945,870,
(Continued)

(51) Int. Cl.
*F16B 5/02* (2006.01)
*E04F 15/02* (2006.01)
(Continued)

(52) U.S. Cl.
CPC ........ *E04F 15/02044* (2013.01); *F16B 5/002* (2013.01); *F16B 5/0088* (2013.01);
(Continued)

(58) Field of Classification Search
CPC ...... F16B 5/002; F16B 5/0056; F16B 5/0088; F16B 5/02; E04B 5/023; E04F 15/02044; E04F 15/02183; E04F 2015/02122
See application file for complete search history.

(56) References Cited

U.S. PATENT DOCUMENTS

| 126,366 A | 4/1872 | Wills |
| 137,414 A | 4/1873 | Burdick |

(Continued)

FOREIGN PATENT DOCUMENTS

| AT | 406894 B | 10/2000 |
| CA | 1242601 | 10/1988 |

(Continued)

OTHER PUBLICATIONS

Translation of JP 2008-31757. worldwideespacenet.com. Sep. 26, 2024.*
(Continued)

*Primary Examiner* — Michael P Ferguson
(74) *Attorney, Agent, or Firm* — Warner Norcross + Judd LLP

(57) ABSTRACT

A fastener unit and related method for securing a board to a support is provided. The fastener unit includes a spacer block, a grip element extending from the spacer block and configured to fit in and engage a groove of the board, and one or more board engagement elements. The board engagement elements can engage the groove of the board, thereby securing the spacer block in a position adjacent the groove to establish a gap between the board and another board. Related methods of use also are provided.

23 Claims, 46 Drawing Sheets

Related U.S. Application Data and a continuation-in-part of application No. 16/689,625, filed on Nov. 20, 2019, now Pat. No. 11,149,445, and a continuation-in-part of application No. 29/714,015, filed on Nov. 20, 2019, now Pat. No. Des. 924,044, said application No. 16/689,625 is a continuation-in-part of application No. 16/537,128, filed on Aug. 9, 2019, now Pat. No. 11,111,679, which is a continuation-in-part of application No. 16/011,213, filed on Jun. 18, 2018, now Pat. No. 10,378,218, which is a continuation-in-part of application No. 29/649,771, filed on Jun. 1, 2018, now Pat. No. Des. 853,829, and a continuation-in-part of application No. 29/648,131, filed on May 18, 2018, now Pat. No. Des. 850,897.

(60) Provisional application No. 62/674,247, filed on May 21, 2018, provisional application No. 62/635,745, filed on Feb. 27, 2018, provisional application No. 62/545,709, filed on Aug. 15, 2017.

(51) Int. Cl.
*F16B 5/00* (2006.01)
*E04F 13/08* (2006.01)

(52) U.S. Cl.
CPC ............ *F16B 5/02* (2013.01); *E04F 13/0826* (2013.01); *E04F 2015/02094* (2013.01); *E04F 15/02183* (2013.01); *E04F 2201/0523* (2013.01)

(56) References Cited

U.S. PATENT DOCUMENTS

| | | |
|---|---|---|
| 138,784 A | 5/1873 | Bourn |
| 186,463 A | 1/1877 | Dickinson |
| 411,202 A | 9/1889 | Rose |
| 876,399 A | 1/1908 | Robinson |
| 877,831 A | 1/1908 | Creedon |
| 984,323 A | 2/1911 | Vauclain |
| 1,714,738 A | 5/1929 | Smith |
| 1,879,459 A | 9/1932 | Pelton |
| 1,888,611 A | 11/1932 | Wolfson |
| 2,065,525 A | 12/1936 | Hamilton |
| 2,066,813 A | 1/1937 | Williams |
| 2,116,737 A | 5/1938 | Urbain |
| 2,129,975 A | 9/1938 | Urbain |
| 2,129,976 A | 9/1938 | Urbain et al. |
| 2,325,766 A | 8/1943 | Gisondi |
| 2,338,870 A | 1/1944 | Praeger |
| 2,620,705 A | 12/1952 | Podvinecz et al. |
| 2,774,969 A | 12/1956 | Samples |
| 2,994,878 A | 8/1961 | Abrahamsen |
| 3,010,496 A | 11/1961 | Bruce |
| 3,012,247 A | 12/1961 | Sillars |
| 3,020,602 A | 2/1962 | Siering |
| 3,080,021 A | 3/1963 | Muir |
| 3,147,484 A | 9/1964 | Nelson |
| 3,177,755 A | 4/1965 | Kahn |
| 3,207,023 A | 9/1965 | Knohl |
| 3,237,360 A | 3/1966 | Mills |
| 3,267,630 A | 8/1966 | Olmholt |
| 3,284,117 A | 11/1966 | Meehan |
| 3,316,949 A | 5/1967 | Canfield |
| 3,331,180 A | 7/1967 | Vissing et al. |
| 3,357,295 A | 12/1967 | Smith |
| 3,360,176 A | 12/1967 | Gehl |
| 3,439,464 A | 4/1969 | Omholt |
| 3,553,919 A | 1/1971 | Omholt |
| 3,577,694 A | 5/1971 | Omholt |
| 3,619,963 A | 11/1971 | Omholt |
| 3,713,264 A | 1/1973 | Morgan, Jr. |
| 3,738,218 A | 6/1973 | Gutshall |
| 3,760,547 A | 9/1973 | Brenneman |
| 3,942,405 A | 3/1976 | Wagner |
| 4,018,254 A | 4/1977 | DeCaro |
| 4,023,831 A | 5/1977 | Thompson |
| 4,068,554 A | 1/1978 | Hirabayashi |
| 4,117,644 A | 10/1978 | Weinar |
| 4,123,186 A | 10/1978 | Hoadley |
| 4,125,006 A | 11/1978 | Lewis |
| 4,125,972 A | 11/1978 | Pate |
| 4,146,071 A | 3/1979 | Mueller et al. |
| 4,154,172 A | 5/1979 | Curtis, Jr. |
| 4,170,430 A | 10/1979 | Mrotzek |
| 4,209,275 A | 6/1980 | Kim |
| 4,241,638 A | 12/1980 | Shimizu et al. |
| 4,255,914 A | 3/1981 | Seipos |
| 4,266,914 A | 3/1981 | Seipos |
| 4,281,494 A | 8/1981 | Neinar |
| 4,296,580 A | 10/1981 | Weinar |
| 4,323,326 A | 4/1982 | Okada et al. |
| 4,329,099 A | 5/1982 | Shimizu et al. |
| 4,333,286 A | 6/1982 | Weinar |
| 4,435,935 A | 3/1984 | Larrea |
| 4,439,077 A | 3/1984 | Godsted |
| 4,448,007 A | 5/1984 | Adams |
| 4,467,579 A | 8/1984 | Weinar |
| 4,497,148 A | 2/1985 | Lopez |
| 4,498,272 A | 2/1985 | Adams |
| 4,572,720 A | 2/1986 | Rockenfeller et al. |
| 4,586,862 A | 5/1986 | Yamasaki |
| 4,616,462 A | 10/1986 | Abendroth |
| 4,625,597 A | 12/1986 | Cast |
| 4,653,244 A | 3/1987 | Farrell |
| 4,701,066 A | 10/1987 | Beam et al. |
| 4,703,601 A | 11/1987 | Abendroth |
| D295,496 S | 5/1988 | Burke et al. |
| 4,776,144 A | 10/1988 | Pardo |
| 4,831,808 A | 5/1989 | Wynar |
| 4,834,602 A | 5/1989 | Takasaki |
| 4,844,651 A | 7/1989 | Partridge |
| 4,925,141 A | 5/1990 | Classen |
| 5,015,134 A | 5/1991 | Gotoh |
| 5,064,324 A | 11/1991 | Ragaller |
| 5,074,089 A | 12/1991 | Kemmer et al. |
| 5,083,483 A | 1/1992 | Takagi |
| 5,184,497 A | 2/1993 | Hanlon et al. |
| 5,188,496 A | 2/1993 | Giannuzzi |
| 5,243,804 A | 9/1993 | Therrien et al. |
| 5,271,670 A | 12/1993 | Grabher |
| 5,282,708 A | 2/1994 | Giannuzzi |
| 5,322,396 A | 6/1994 | Blacker |
| 5,337,635 A | 8/1994 | Habermehl |
| 5,341,706 A | 8/1994 | Takagi |
| 5,351,586 A | 10/1994 | Habermehl et al. |
| 5,394,667 A | 3/1995 | Nystrom |
| D357,175 S | 4/1995 | Godfrey |
| 5,452,630 A | 9/1995 | Haas et al. |
| 5,469,767 A | 11/1995 | Habermehl |
| 5,531,142 A | 7/1996 | Adamo |
| 5,531,143 A | 7/1996 | Habermehl et al. |
| 5,568,753 A | 10/1996 | Habermehl et al. |
| 5,570,618 A | 11/1996 | Habermehl et al. |
| 5,660,016 A | 8/1997 | Erwin et al. |
| 5,687,624 A | 11/1997 | Tsuge et al. |
| D391,135 S | 2/1998 | Habermehl et al. |
| 5,839,332 A | 11/1998 | Fujiyama et al. |
| 5,842,319 A | 12/1998 | Ravetto |
| 5,871,486 A | 2/1999 | Huebner et al. |
| 5,884,541 A | 3/1999 | Habermehl et al. |
| 5,904,079 A | 5/1999 | Tsuge et al. |
| 5,918,512 A | 7/1999 | Habermehl et al. |
| 5,927,163 A | 7/1999 | Habermehl et al. |
| 5,934,162 A | 8/1999 | Habermehl |
| 5,988,025 A | 11/1999 | Sasaki et al. |
| 5,997,209 A | 12/1999 | Sachs |
| 6,027,004 A | 2/2000 | Ramella et al. |
| 6,036,398 A | 3/2000 | Theodorou |
| D427,050 S | 6/2000 | Bryan |
| 6,089,132 A | 7/2000 | Habermehl |
| 6,098,442 A | 8/2000 | Walldorf et al. |

(56) References Cited

U.S. PATENT DOCUMENTS

| | | |
|---|---|---|
| 6,108,992 A | 8/2000 | Shaw |
| 6,109,144 A | 8/2000 | Muro |
| 6,109,146 A | 8/2000 | Muro |
| 6,158,939 A | 12/2000 | Grossberndt et al. |
| 6,230,385 B1 | 5/2001 | Nelson |
| 6,244,140 B1 | 6/2001 | Habermehl |
| 6,296,433 B1 | 10/2001 | Forsell et al. |
| D450,568 S | 11/2001 | Sachs |
| 6,314,699 B1 | 11/2001 | West |
| 6,322,307 B1 | 11/2001 | Glover |
| 6,328,516 B1 | 12/2001 | Hettich |
| 6,332,741 B1 | 12/2001 | Janusz |
| 6,345,940 B2 | 2/2002 | Anjanappa et al. |
| 6,394,712 B1 | 5/2002 | Weinstein et al. |
| 6,416,269 B1 | 7/2002 | Martel et al. |
| 6,418,681 B1 | 7/2002 | Dunks |
| 6,418,693 B2 | 7/2002 | Ballard |
| 6,425,306 B1 | 7/2002 | Habermehl |
| 6,439,085 B1 | 8/2002 | Habermehl |
| 6,453,780 B2 | 9/2002 | Habermehl |
| 6,470,641 B1 | 10/2002 | Faure |
| 6,481,937 B1 | 11/2002 | Sommerfeld et al. |
| 6,484,467 B2 | 11/2002 | Crout |
| 6,490,838 B2 | 12/2002 | Summerford |
| D469,007 S | 1/2003 | Chen et al. |
| 6,514,026 B1 | 2/2003 | Gerhard |
| 6,540,432 B2 | 4/2003 | Albanese |
| 6,592,015 B1 | 7/2003 | Gostylla et al. |
| 6,594,961 B2 | 7/2003 | Leines |
| 6,601,480 B1 | 8/2003 | Habermehl |
| 6,604,901 B1 | 8/2003 | Grossberndt et al. |
| 6,623,228 B1 | 9/2003 | Hettich et al. |
| 6,647,638 B1 | 11/2003 | Doyal |
| 6,651,398 B2 | 11/2003 | Gregori |
| 6,651,400 B1 | 11/2003 | Murphy |
| 6,666,638 B2 | 12/2003 | Craven |
| D485,160 S | 1/2004 | Pelc |
| 6,675,545 B2 | 1/2004 | Chen et al. |
| 6,711,864 B2 | 3/2004 | Erwin |
| D488,373 S | 4/2004 | Eberle |
| 6,763,643 B1 | 7/2004 | Martensson |
| 6,769,332 B2 | 8/2004 | Muro |
| 6,810,633 B2 | 11/2004 | Harris, Sr. |
| 6,843,402 B2 | 1/2005 | Sims et al. |
| 6,851,884 B2 | 2/2005 | Eberle |
| 6,871,467 B2 | 3/2005 | Hafner |
| 6,887,023 B1 | 5/2005 | Lu et al. |
| 6,915,724 B2 | 7/2005 | Kigel et al. |
| 6,941,635 B2 | 9/2005 | Craven |
| 6,941,847 B2 | 9/2005 | Habermehl et al. |
| 6,986,934 B2 | 1/2006 | Chen et al. |
| 6,993,875 B2 | 2/2006 | Rudduck |
| 7,037,059 B2 | 5/2006 | Dicke |
| 7,044,460 B2 | 5/2006 | Bolton |
| 7,052,200 B2 | 5/2006 | Harris |
| 7,073,303 B2 | 7/2006 | Baker |
| 7,090,453 B2 | 8/2006 | Lin |
| 7,156,600 B2 | 1/2007 | Panasik et al. |
| 7,165,481 B2 | 1/2007 | Kikuchi |
| 7,168,213 B2 | 1/2007 | Rudduck et al. |
| 7,231,854 B2 | 6/2007 | Kikuchi |
| D547,169 S | 7/2007 | Harris |
| D557,130 S | 12/2007 | Kashikura et al. |
| D557,131 S | 12/2007 | Liu |
| 7,344,057 B2 | 3/2008 | Dion et al. |
| D567,644 S | 4/2008 | Liu |
| D573,454 S | 7/2008 | Eberle, III |
| 7,398,623 B2 | 7/2008 | Martel et al. |
| 7,424,840 B1 | 9/2008 | Huang |
| 7,444,792 B2 | 11/2008 | Matson |
| 7,454,996 B2 | 11/2008 | Hsu |
| D581,776 S | 12/2008 | Yin-Feng |
| 7,487,699 B2 | 2/2009 | Xu |
| 7,533,500 B2 | 5/2009 | Morton et al. |
| 7,546,717 B2 | 6/2009 | Juan Puerta |
| 7,578,105 B2 | 8/2009 | Eberle, III |
| D600,105 S | 9/2009 | Harris |
| 7,600,353 B2 | 10/2009 | Hafner |
| D604,153 S | 11/2009 | Wantz |
| D604,599 S | 11/2009 | Prichard, Jr. et al. |
| 7,682,118 B2 | 3/2010 | Gong et al. |
| 7,682,119 B2 | 3/2010 | Chen |
| 7,695,228 B2 | 4/2010 | Craven |
| D614,942 S | 5/2010 | Gaudron |
| 7,721,503 B2 | 5/2010 | Pervan et al. |
| 7,779,765 B2 | 8/2010 | Donnell, Jr. et al. |
| 7,805,902 B2 | 10/2010 | Martel |
| 7,841,145 B2 | 11/2010 | Pervan et al. |
| 7,841,150 B2 | 11/2010 | Pervan |
| 7,866,236 B2 | 1/2011 | Hsu |
| RE42,207 E | 3/2011 | Janusz |
| D634,186 S | 3/2011 | Kemper |
| 7,908,816 B2 | 3/2011 | Grafenauer et al. |
| D637,071 S | 5/2011 | Gaudron et al. |
| D637,896 S | 5/2011 | Dotsey |
| 7,950,312 B2 | 5/2011 | Matthiesen et al. |
| 7,980,041 B2 | 7/2011 | Pervan et al. |
| 7,984,599 B2 | 7/2011 | Snell et al. |
| 7,992,469 B2 | 8/2011 | Chang et al. |
| D647,393 S | 10/2011 | Carrillo et al. |
| 8,042,311 B2 | 10/2011 | Pervan et al. |
| 8,079,196 B2 | 12/2011 | Pervan |
| 8,162,196 B2 | 4/2012 | Gasser et al. |
| 8,192,124 B2 | 6/2012 | Wolpert et al. |
| D662,808 S | 7/2012 | Vandenberg |
| D664,836 S | 8/2012 | Kikuchi |
| 8,245,478 B2 | 8/2012 | Bergelin et al. |
| 8,336,272 B2 | 12/2012 | Prager et al. |
| 8,348,571 B2 | 1/2013 | Shih |
| 8,359,805 B2 | 1/2013 | Pervan et al. |
| 8,360,702 B2 | 1/2013 | Yu |
| 8,382,414 B2 | 2/2013 | Vandenberg |
| D677,147 S | 3/2013 | Vandenberg |
| 8,387,327 B2 | 3/2013 | Pervan |
| 8,393,125 B2 | 3/2013 | Martel |
| 8,480,343 B2 | 7/2013 | Vandenberg |
| 8,499,521 B2 | 8/2013 | Pervan et al. |
| 8,511,031 B2 | 8/2013 | Bergelin et al. |
| 8,544,229 B2 | 10/2013 | Kilgore et al. |
| 8,544,230 B2 | 10/2013 | Pervan |
| 8,627,862 B2 | 1/2014 | Pervan et al. |
| 8,650,826 B2 | 2/2014 | Pervan et al. |
| 8,677,714 B2 | 3/2014 | Pervan |
| 8,713,886 B2 | 5/2014 | Pervan et al. |
| 8,733,065 B2 | 5/2014 | Pervan |
| 8,763,341 B2 | 7/2014 | Pervan |
| 8,769,905 B2 | 7/2014 | Pervan et al. |
| 8,826,622 B2 | 9/2014 | Cappelle et al. |
| 8,887,468 B2 | 11/2014 | Hakansson et al. |
| 8,925,274 B2 | 1/2015 | Darko et al. |
| 8,991,055 B2 | 3/2015 | Cappelle |
| 9,145,691 B2 | 9/2015 | Cappelle |
| 9,181,715 B2 | 11/2015 | Orchard |
| 9,212,493 B2 | 12/2015 | Cappelle et al. |
| 9,216,541 B2 | 12/2015 | Boo et al. |
| 9,222,267 B2 | 12/2015 | Bergelin et al. |
| 9,238,917 B2 | 1/2016 | Pervan et al. |
| 9,260,870 B2 | 2/2016 | Vermeulen et al. |
| 9,347,469 B2 | 5/2016 | Pervan et al. |
| 9,347,470 B2 | 5/2016 | Maertens et al. |
| 9,360,036 B2 | 6/2016 | Waterman et al. |
| 9,366,036 B2 | 6/2016 | Pervan |
| 9,388,584 B2 | 7/2016 | Pervan et al. |
| 9,428,919 B2 | 8/2016 | Pervan et al. |
| 9,458,634 B2 | 10/2016 | Derelov |
| 9,476,208 B2 | 10/2016 | Vermeulen et al. |
| 9,531,319 B2 | 12/2016 | Bransten et al. |
| D792,757 S | 7/2017 | Brigham et al. |
| 9,822,809 B2 | 11/2017 | Shadwell et al. |
| 9,868,147 B2 | 1/2018 | Wadsworth |
| 9,874,032 B1 | 1/2018 | Chen |
| 9,976,312 B2 | 5/2018 | Boschian |
| D821,853 S | 7/2018 | Mikkelsen |
| 10,113,306 B2 | 10/2018 | Brigham et al. |

(56) References Cited

U.S. PATENT DOCUMENTS

| | | |
|---|---|---|
| 10,214,896 B2 | 2/2019 | Tebo |
| 10,309,099 B2 | 6/2019 | Brigham et al. |
| 10,407,898 B2 | 9/2019 | Tebo |
| 10,494,820 B1 | 12/2019 | Chen |
| 10,494,821 B2 | 12/2019 | Shadwell et al. |
| 10,590,978 B2 | 3/2020 | Shadwell |
| D906,098 S | 12/2020 | Chen |
| 10,920,432 B2 | 2/2021 | Demuth et al. |
| D924,044 S | 7/2021 | Vandenberg |
| 11,149,445 B2 | 10/2021 | Vandenberg |
| 11,261,893 B2 | 3/2022 | Vandenberg |
| 11,575,344 B2 | 2/2023 | Braunstein et al. |
| 2002/0121064 A1 | 9/2002 | Erwin |
| 2003/0019174 A1 | 1/2003 | Bolduc |
| 2003/0101673 A1 | 6/2003 | West et al. |
| 2003/0121226 A1 | 7/2003 | Bolduc |
| 2003/0154662 A1 | 8/2003 | Bruchu et al. |
| 2003/0235483 A1 | 12/2003 | Chen |
| 2004/0045244 A1 | 3/2004 | Hafner |
| 2004/0141827 A1 | 7/2004 | Dicke |
| 2004/0168382 A1 | 9/2004 | Rudduck et al. |
| 2004/0237460 A1 | 12/2004 | Green |
| 2005/0003160 A1 | 1/2005 | Chen et al. |
| 2005/0063771 A1 | 3/2005 | Harris |
| 2005/0257473 A1 | 11/2005 | Shaw et al. |
| 2005/0265806 A1 | 12/2005 | Craven |
| 2005/0278934 A1 | 12/2005 | Orchard |
| 2006/0059822 A1 | 3/2006 | Guffey |
| 2006/0179757 A1 | 8/2006 | Schulner |
| 2006/0242916 A1 | 11/2006 | Simko et al. |
| 2006/0283122 A1 | 12/2006 | Burgess et al. |
| 2007/0128001 A1 | 6/2007 | Su |
| 2007/0196624 A1 | 8/2007 | Chen et al. |
| 2007/0217887 A1 | 9/2007 | Lin |
| 2007/0289249 A1 | 12/2007 | Martel |
| 2008/0025816 A1 | 1/2008 | Chen et al. |
| 2008/0080951 A1 | 4/2008 | Lin |
| 2008/0240886 A1 | 10/2008 | Martel et al. |
| 2008/0264218 A1 | 10/2008 | Wang et al. |
| 2008/0276761 A1 | 11/2008 | Hale et al. |
| 2008/0279654 A1 | 11/2008 | Deschamps |
| 2008/0296341 A1 | 12/2008 | Francescon |
| 2009/0019805 A1 | 1/2009 | Zanelli |
| 2009/0108719 A1 | 4/2009 | Lilly |
| 2009/0142159 A1 | 6/2009 | Wolpert et al. |
| 2009/0173032 A1 | 7/2009 | Prager et al. |
| 2009/0193741 A1 | 8/2009 | Cappelle |
| 2009/0217495 A1 | 9/2009 | Tipps et al. |
| 2009/0249730 A1 | 10/2009 | Vibiano |
| 2009/0314143 A1 | 12/2009 | Chen |
| 2010/0050556 A1 | 3/2010 | Bums |
| 2010/0083610 A1 | 4/2010 | King |
| 2010/0107524 A1 | 5/2010 | Moss |
| 2010/0257806 A1 | 10/2010 | Snell et al. |
| 2010/0260962 A1 | 10/2010 | Chen et al. |
| 2010/0319290 A1 | 12/2010 | Pervan et al. |
| 2011/0167744 A1 | 7/2011 | Whispell et al. |
| 2011/0167757 A1 | 7/2011 | Vandenberg |
| 2011/0225922 A1 | 9/2011 | Pervan et al. |
| 2011/0232430 A1 | 9/2011 | Hale |
| 2012/0000327 A1 | 1/2012 | Park |
| 2012/0048909 A1 | 3/2012 | Gensmann et al. |
| 2012/0073410 A1 | 3/2012 | Hoffman et al. |
| 2012/0255158 A1 | 10/2012 | Kawasaki |
| 2013/0014465 A1 | 1/2013 | Kilgore |
| 2013/0025230 A1 | 1/2013 | Turner |
| 2013/0051955 A1 | 2/2013 | Su et al. |
| 2013/0104493 A1 | 5/2013 | Orchard |
| 2013/0287484 A1 | 10/2013 | Phillips |
| 2013/0340377 A1 | 12/2013 | Shadwell |
| 2014/0099161 A1 | 4/2014 | Chen |
| 2014/0165491 A1 | 6/2014 | Lachevrotiere et al. |
| 2014/0290173 A1 | 10/2014 | Hamberger |
| 2014/0305064 A1 | 10/2014 | Baker et al. |
| 2015/0211558 A1 | 7/2015 | Garrison |
| 2015/0275951 A1 | 10/2015 | Shadwell et al. |
| 2015/0354204 A1 | 12/2015 | Kinnunen et al. |
| 2016/0362902 A1 | 12/2016 | Lee et al. |
| 2017/0037643 A1 | 2/2017 | Mitchell |
| 2017/0044776 A1 | 2/2017 | Rodriguez Lopez |
| 2017/0114536 A1 | 4/2017 | Tebo |
| 2017/0138063 A1 | 5/2017 | Boschian |
| 2017/0232499 A1 | 8/2017 | Wadsworth |
| 2017/0314278 A1 | 11/2017 | Lee et al. |
| 2017/0321434 A1 | 11/2017 | Shadwell et al. |
| 2017/0362815 A1 | 12/2017 | Brigham et al. |
| 2018/0010627 A1 | 1/2018 | Shadwell |
| 2018/0238060 A1 | 8/2018 | Doupe et al. |
| 2019/0071880 A1 | 3/2019 | Demuth et al. |
| 2019/0211856 A1 | 7/2019 | Getsiv |
| 2019/0360214 A1 | 11/2019 | Vandenberg et al. |
| 2020/0362570 A1 | 11/2020 | Vandenberg |
| 2021/0277668 A1 | 9/2021 | Vandenberg et al. |
| 2021/0363761 A1 | 11/2021 | Vandenberg |
| 2021/0388622 A1 | 12/2021 | Vernon et al. |
| 2021/0404190 A1 | 12/2021 | Vandenberg |
| 2022/0010825 A1 | 1/2022 | Voß |

FOREIGN PATENT DOCUMENTS

| | | | | |
|---|---|---|---|---|
| CA | 2277586 | | 7/2000 | |
| CA | 2305852 A1 | | 10/2001 | |
| CH | 695482 | | 6/2006 | |
| DE | 4228727 | | 3/1994 | |
| DE | 4331689 | | 3/1994 | |
| DE | 202014004575 U1 | | 8/2014 | |
| DE | 202014006016 | | 9/2014 | |
| DE | 102015006325 A1 | | 11/2015 | |
| DE | 102014011022 A1 | | 1/2016 | |
| DE | 102015202596 | | 6/2016 | |
| DE | 202018003385 U1 | | 10/2018 | |
| EP | 0482363 | | 4/1992 | |
| EP | 0863317 | | 9/1998 | |
| EP | 1187993 | | 3/2002 | |
| EP | 1 600 579 | * | 11/2005 | ........ E04F 15/02161 |
| EP | 1595627 | | 11/2005 | |
| EP | 1920890 | | 5/2008 | |
| EP | 1932623 | | 6/2008 | |
| EP | 1938928 | | 7/2008 | |
| EP | 2228504 B1 | | 9/2010 | |
| EP | 2258518 | | 12/2010 | |
| EP | 2397706 | | 12/2011 | |
| EP | 2076362 | | 3/2012 | |
| EP | 2476819 A1 | | 7/2012 | |
| EP | 2489812 A1 | | 8/2012 | |
| EP | 2592365 | | 5/2013 | |
| EP | 2995744 | | 3/2016 | |
| EP | 3150083 | | 4/2017 | |
| FR | 1566765 | | 5/1969 | |
| FR | 2968366 | | 6/2012 | |
| GB | 191001226 | | 12/1910 | |
| GB | 167620 | | 8/1921 | |
| GB | 1009630 | | 11/1965 | |
| GB | 2127927 | | 4/1984 | |
| GB | 2542898 A | | 4/2017 | |
| GB | 6116267 | | 1/2021 | |
| GB | 6245352 | | 12/2022 | |
| JP | 7217625 | | 8/1995 | |
| JP | 10329049 | | 12/1998 | |
| JP | 2000257616 | | 9/2000 | |
| JP | 2004308732 | | 11/2004 | |
| JP | 2008-31757 | * | 2/2008 | ............... E04B 1/00 |
| JP | D1413654 | | 5/2011 | |
| JP | 2011236601 A | | 11/2011 | |
| JP | 4908098 B2 | | 4/2012 | |
| JP | D1499741 | | 6/2014 | |
| JP | 201661061 A | | 4/2016 | |
| KR | 20080083788 A | | 9/2008 | |
| KR | 20080088160 A | | 10/2008 | |
| KR | 20100120935 A | | 11/2010 | |
| KR | 300595365.0000 | | 4/2011 | |
| KR | 20130000374 U | | 1/2013 | |
| KR | 10-1263988 B1 | | 5/2013 | |
| KR | 20140001877 U | | 4/2014 | |

(56) References Cited

FOREIGN PATENT DOCUMENTS

| KR | 10-1455585 | B1 | 10/2014 |
|---|---|---|---|
| KR | 10-1579965 | B1 | 1/2016 |
| KR | 10-1781610 | B1 | 9/2017 |
| KR | 10-2095981 | B1 | 4/2020 |
| KR | 102180567 | B1 | 11/2020 |
| TW | M441693 | U | 11/2012 |
| TW | 200170-001 | | 10/2019 |
| WO | 1997017505 | | 5/1997 |
| WO | 1997042420 | | 11/1997 |
| WO | 1999067541 | | 12/1999 |
| WO | 2007091487 | | 8/2007 |
| WO | 2009/145367 | A1 | 12/2009 |
| WO | D203548-001 | | 11/2019 |

OTHER PUBLICATIONS

Eurotec ECO System Clip Webpage, dated Sep. 9, 2016.
Eurotec Catalogue, dated Jun. 2016.
Eurotec Complete Catalogue, dated Mar. 2022.
Trex Home Webpage, dated at least as early as Mar. 29, 2016.
TrexElevations Installation Guide, dated at least as early as Apr. 4, 2015.
Trex Hidden Deck Fasteners Webpage, dated at least as early as Apr. 2, 2016.
CAMO Fastener Hidden Clips Webpage, dated at least as early as Feb. 7, 2015.
Pan American Screws Hidden Deck Fasteners Webpage, dated at least as early as Mar. 26, 2016.
Pan American Screws Mantis Hidden Deck Fasteners Webpage, dated at least as early as Jun. 8, 2016.
TigerClaw Installation Instructions, dated at least as early as Jun. 12, 2010.
TigerClaw ProClip PVC Decking Hidden Fastener Webpage, dated at least as early as Jan. 25, 2014.
TigerClaw TC-120 Grooved Board Hidden Deck Fastener for Hardwood Webpage, dated at least as early as Jan. 25, 2014.
TigerClaw Wayback Archive, dated at least as early as Jul. 21, 2002.
Ipe Clip Fasteners (Ipe Clip) Hidden Deck Fasteners Webpage, dated at least as early as Dec. 12, 2016.
MetalsDepot Products Webpage, dated at least as early as Mar. 13, 2016.
Unistrut Products Webpage, dated at least as early as Mar. 24, 2017.
Fiberon DeckPilot Mar. 2009.
Fiberon DeckPilot Dec. 2009.
http://www.woodworkersjournal.com/todays-wood-screw-technology-2/ downloaded Feb. 23, 2018.
http://www.starbornindustries.com/cap-tor-xd-product downloaded Feb. 26, 2018.
DeckLock Limited Universal Decking Spacers, downloaded from http://www.hellotrade.com/decklock/universal-decking-spacers.html (viewed Jun. 8, 2017).
Deck Spacers, downloaded from http://www.contractortalk.com/f50/spacers-cleats-simpson-worth-anything-82833/ (viewed Jun. 8, 2017).
Spacer clip, discovered 2017.
https://web.archive.org/web/20160303100406/http:/www.trex.com/products/accessory-hardware, dated at least as early as Mar. 5, 2021.

\* cited by examiner

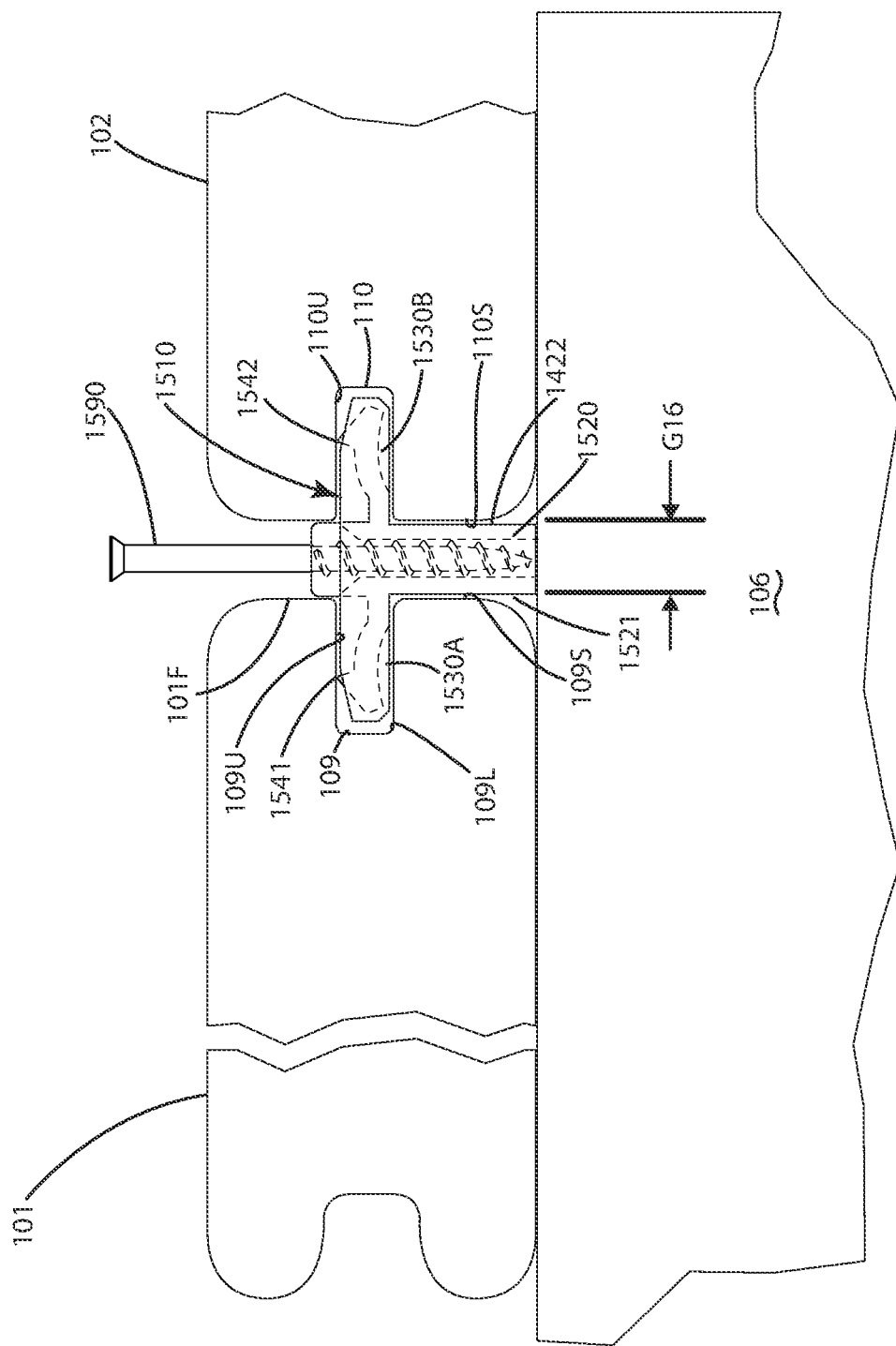

HIDDEN FASTENER UNIT AND RELATED METHOD OF USE

CROSS REFERENCE TO RELATED APPLICATIONS

This application is a continuation-in-part of and claims priority to U.S. patent application Ser. No. 16/689,625, filed Nov. 11, 2019, entitled HIDDEN FASTENER UNIT AND METHOD OF USE, which is a continuation-in-part of U.S. patent application Ser. No. 16/537,128, filed Aug. 9, 2019, entitled HIDDEN FASTENER UNIT AND METHOD OF USE, which is a continuation-in-part of U.S. patent application Ser. No. 16/011,213, now U.S. Pat. No. 10,378,218 issued Aug. 13, 2019, entitled HIDDEN FASTENER UNIT AND METHOD OF USE, which is a continuation-in-part of U.S. patent application Ser. No. 29/648,131, now U.S. Pat. No. D850,897 issued Jun. 11, 2019 entitled FASTENER POSITIONING DEVICE, and which is a continuation-in-part of U.S. patent application Ser. No. 29/649,771, now U.S. Pat. No. D853,829 issued Jul. 16, 2019, entitled FASTENER POSITIONING DEVICE, and which claims priority to U.S. Provisional Application Ser. No. 62/674,247, filed May 21, 2018, U.S. Provisional application 62/635,745, filed Feb. 27, 2018 and 62/545,709, filed Aug. 15, 2017, and this application is a continuation-in-part of U.S. patent application Ser. No. 29/758,604, filed Nov. 17, 2020, entitled FASTENER POSITIONING DEVICE, and this application is a continuation-in-part of U.S. patent application Ser. No. 29/714,015, filed Nov. 20, 2019, entitled FASTENER POSITIONING DEVICE, which are all hereby incorporated by reference in their entirety.

BACKGROUND OF THE INVENTION

The present invention relates to a fastener unit configured to fasten workpieces, such as boards, to support structures, such as joists, and more particularly to a fastener unit that engages a groove in the side of a board to secure the board to a support structure.

There are a variety of structures, such as decks, platforms and flooring, that include horizontal floors supported by an underlying support structure. The structures typically include boards that are placed side-by-side one another. The boards typically are arranged to extend across support structures, such as joists, disposed under the boards at an angle, sometimes at a right angle. The boards usually are fastened to the joists using fasteners, such as nails or screws. The nails or screws can frequently become discolored over time, or can work themselves loose from the board and project upward from the board surface. Not only are these results aesthetically displeasing, they can present safety hazards.

Some manufacturers have developed hidden fastener systems that fit loosely within grooves of adjacent boards. These hidden fasteners typically include a biscuit-shaped upper plate having two horizontal flanges that fit into the grooves defined by the sides of adjacent deck boards, a single center hole through which a fastener extends to secure to the underlying joist, and a base that extends downward from the upper plate to an underlying joist. While the horizontal flanges can engage the grooves, these elements typically do not engage those grooves forcibly enough to tack the boards to the underlying joist and prevent them from moving during expansion and contraction under changing temperatures. These systems typically also require a user to manually hold the plate in alignment with one or more grooves of the boards as the fastener is advanced, which can be cumbersome. Depending on the height of the base and the distance of the groove from the board lower surface, sometimes these items can be mismatched so that the flanges do not fit well in or align with the grooves. In addition, the flanges are of a fixed thickness so that if that thickness is mismatched relative to a groove, the plate cannot fit in the groove, let alone secure the board to the underlying joist. Further, where a support structure includes a double or triple joist, with two or more joists positioned immediately adjacent one another, the foregoing fastener systems might not be properly sized to conceal those joists or fit within the associated confined spaces.

Accordingly, there remains room for improvement in the field of fastener units that are configured to secure grooved boards to underlying support structures.

SUMMARY OF THE INVENTION

A fastener unit and related method to secure a board to a support is provided. The fastener unit includes a spacer block, a grip element extending from the spacer block and configured to fit in and engage a groove of the board, and at least one board engagement element extending from the spacer block, configured to secure the spacer block adjacent the groove to establish a gap between the board and another board.

In one embodiment, the board engagement element can be a resilient compression element that is vertically compressible so that portions of it can be compressed from an open mode to a compressed mode. In the compressed mode, the board engagement element is sized and dimensioned smaller than a width of the groove so that the element can fit within the groove. After placement in the groove, the portions can expand within the groove to forcibly engage the groove, thereby securing the resilient compression element and the joined spacer block adjacent the groove and a side surface of the board.

In a further embodiment, the board engagement element is a resilient compression element that extends laterally from the spacer body, and in the same direction as a portion of the grip element. Optionally, the grip element and resilient compression element can extend rearwardly, from a rearward face of the spacer body, an equal amount or distance. Further optionally, the resilient compression element can include a front edge that does not extend forwardly, from a forward face of the spacer body, while the grip element can extend forwardly another distance from the forward face of the spacer body.

In another embodiment, the spacer body is of a thickness extending from a forward face and a rearward face. The thickness can be optionally less than 0.200 inches, further optionally less than 0.250 inches, and even further optionally less than 0.500 inches to provide a corresponding gap between adjacent boards.

In still another embodiment, the resilient compression element includes first and second portions, optionally in the form of wings, plates, rounded sections, ellipsoids, polygonal elements, and the like, any of which can be referred to as wings herein, that function similar to resilient springs. These portions can be pinched toward one another, to convert the resilient compression element from an open mode to a compressed mode. In the compressed mode, the portions can be located in the groove of the board, which optionally can be ⅛ inch to ⅜ inch wide or other dimensions depending on the application. When the portions are released, they can forcibly engage the groove to hold the fastener unit centered in the groove.

In a further embodiment, the fastener unit can be equipped with an additional resilient compression element, projecting from the spacer body on opposite lateral sides of the spacer body. The first and second resilient compression elements can cooperate to forcibly hold the spacer body and fastener unit in place adjacent the groove during installation of the fastener. In turn, because the unit is self-supported, a user can use both hands to manipulate a tool, such as a power drill, to install the fastener. Also, because the unit is self-supported, a user can place multiple fastener units, place an adjacent board, and later come back to fasten down one or more boards with the fastener units.

In still a further embodiment, the spacer body defines a fastener hole that can include an upper portion and a lower portion. These upper and lower portions can have different diameters or dimensions to accommodate different screw types. In some cases the lower portion can include a diameter that is less than a diameter of the upper portion so that the tip of the screw can fit within the lower portion, while threads above that tip can fit within the upper portion. Optionally, the screw can be partially threaded into engagement with the spacer body, and in particular the interior surfaces of a first fastener hole defined by the spacer body.

In still yet a further embodiment, the grip element can be constructed from a first material, such as a metal and/or composite, while the spacer body, resilient compression element and other features can be constructed from a polymeric material. The polymeric material can be overmolded to the grip element to secure the grip element thereto, with the grip element at least partially entrapped in the spacer body.

In even a further embodiment, a fastener unit can include a spacer body defining a first fastener hole having first and second different internal dimensions, a threaded fastener supported by the spacer body within the first fastener hole, a grip element joined with the spacer body and configured to fit within and engage a groove of a board, and first and second joist legs extending downward from the spacer body and configured to straddle and clampingly engage sides of an underlying joist In another embodiment, the board engagement element can be a resilient compression element that includes a fixed wing and a moveable wing. The moveable wing can be disposed at an angle to the fixed wing and is joined with the fixed wing at a junction. The moveable wing can be vertically compressible to move toward the fixed wing, from an open mode to a compression mode so that at least a portion of the resilient compression element can fit within the groove of the board.

In still another embodiment, the junction at which the fixed and moveable wings are joined can be spaced from the spacer block, such that the moveable wing is resiliently compressible independent from the spacer block.

In yet another embodiment, after inserting an end of the moveable wing into the groove of the board, the moveable wing can be pressed against a lower surface of the groove while pivoting the fastener unit to compress the moveable wing toward the fixed wing until the an end of the fixed wing can be inserted into the groove. After placement of both wings within the groove, the wings can forcibly engage the groove, with the moveable wing pressing against the lower surface of the groove and the fixed wing pressing against an upper surface of the groove, thereby holding the spacer block adjacent the groove of the board.

The current embodiments of the fastener unit and related methods of use provide benefits in hidden fasteners that previously have been unachievable. For example, where the fastener unit includes a multi-dimensioned fastener hole defined by the spacer body, the spacer body can be configured to hold a fastener therein, yet not split or become damaged when the fastener is advanced through the spacer body. Where the fastener includes one or more fracturable joints between the spacer body and one or more of the board engagement elements, those elements can be easily removed and discarded from the unit to fit a particular joist combination or confined space, or can become disassociated from the remainder of the fastener unit after performing a particular function, such as clamping or securing the fastener unit to a board. Where the unit includes the board engagement element, such as a resilient compression element, that element can secure and hold the fastener unit in place adjacent the groove, without the need for additional hands to hold the unit. This can enable a user to place multiple fastener units along a board groove, install another board adjacent those units, and then come back and secure all the fastener units so that the boards are held in a fixed manner relative to the underlying support structure. Where the grip element is included having one or more downward protrusions or cleats, those elements can forcibly engage the groove to prevent the board from creeping or moving during expansion and contraction thereof during and under different temperatures. Where the spacer body is of diminished thickness, the entire fastener unit can be well concealed between adjacent boards, yet provide firm securement of those boards to underlying support structure, and provide a gap large enough to accommodate a fastener head passing between the boards. Where the board engagement element cooperates with a grip element, the fastener unit can be secured adjacent a side surface of a board, engaging either the upper surface of the board or the lower surface of the board in a clamping mode of the fastener unit and board engagement element. Further, where the board engagement element is able to be disassociated from the spacer body and remainder of the fastener unit, that component can be used to temporarily hold the fastener unit in ways, locations and orientations previously unattainable. Still further, where the unit includes the resilient compression element, that element can include a moveable or collapsible wing that fit into a range of possible groove heights, works at various angles to the joist or underlying support structure, and/or inserts easily.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disposed herein. Also, it is to be understood that the phraseology and terminology used herein are for the purpose of description and should not be regarded as limiting. The use of "Including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIG. 50 is another side view of the fastener unit in the compression mode with a second board spaced from a first board by a gap and the opposing resilient compression elements further gripping a second groove of the second board so that the fastener unit is supported between the first and second boards.

DESCRIPTION OF THE CURRENT EMBODIMENTS

Figure 1:
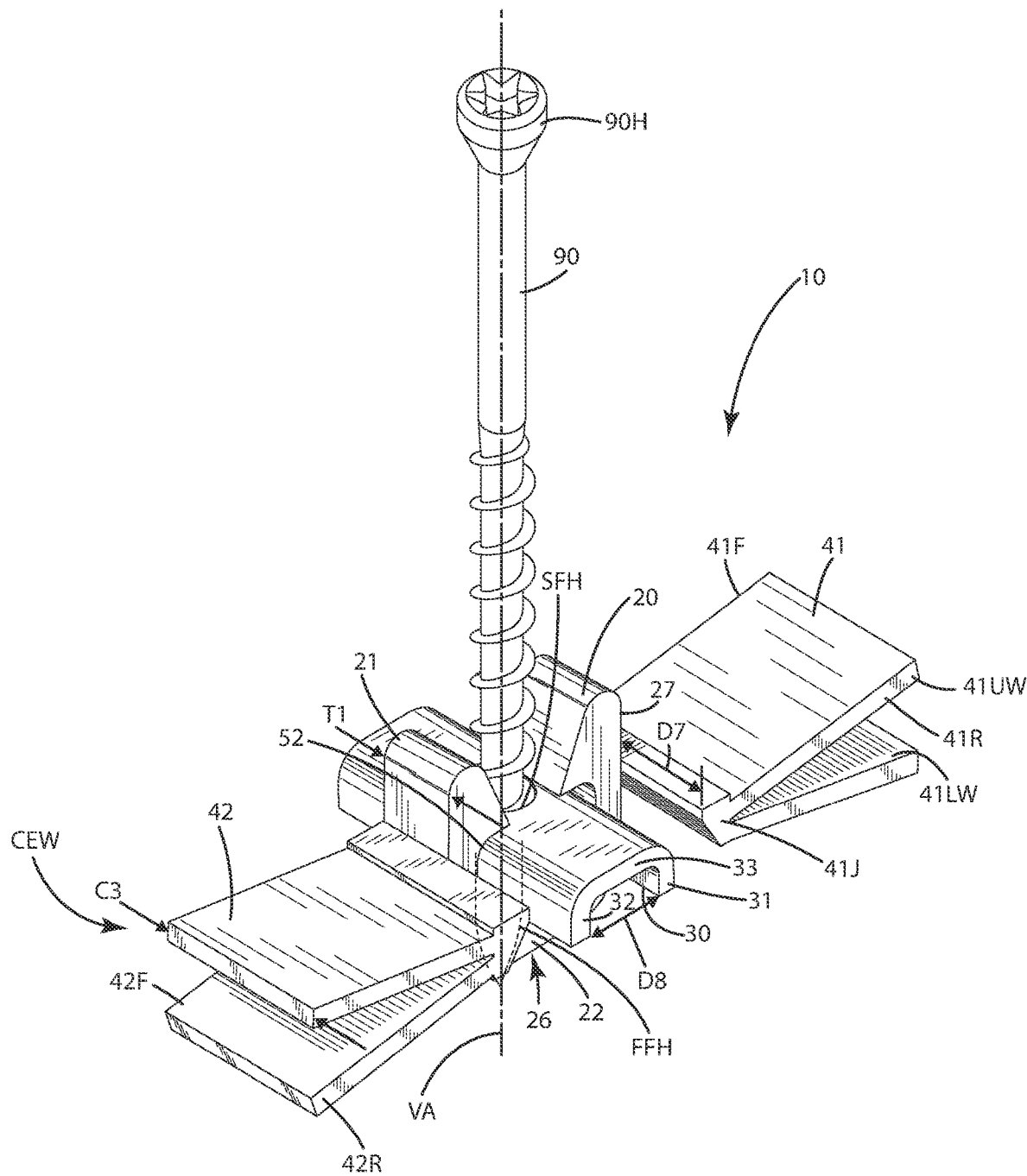
FIG. 1 is a perspective view of a current embodiment of the fastener unit with a fastener associated with the unit.

A current embodiment of the fastener unit is illustrated in FIGS. 1-7, and generally designated 10. The fastener unit 10 can generally include a spacer body 20, a grip element 30 protruding forwardly and rearwardly from the spacer block, also referred to as a spacer body herein, and one or more board engagement elements, such as a first resilient compression element 41 and a second resilient compression element 42. These compression elements can be joined with the spacer body optionally via respective fracturable joints 48 and 49. A fastener 90 can be at least partially disposed through the spacer body 20 and/or the grip element 30 when the unit is in an uninstalled state as shown in FIG. 1.

The current embodiments of the fastener unit 10 are well suited for a variety of building and construction projects, such as commercial, residential and other construction projects. The fastener units, however, can be modified for use in other applications, such as automotive, marine, industrial and/or consumer products. As described herein, the fastener units can be used in the application of grooved boards or lap boards that are fastened to an underlying support structure. The boards can be constructed from wood, plastic, composites, metal, ceramic, tile, masonry or other materials depending on the application.

Figure 2:
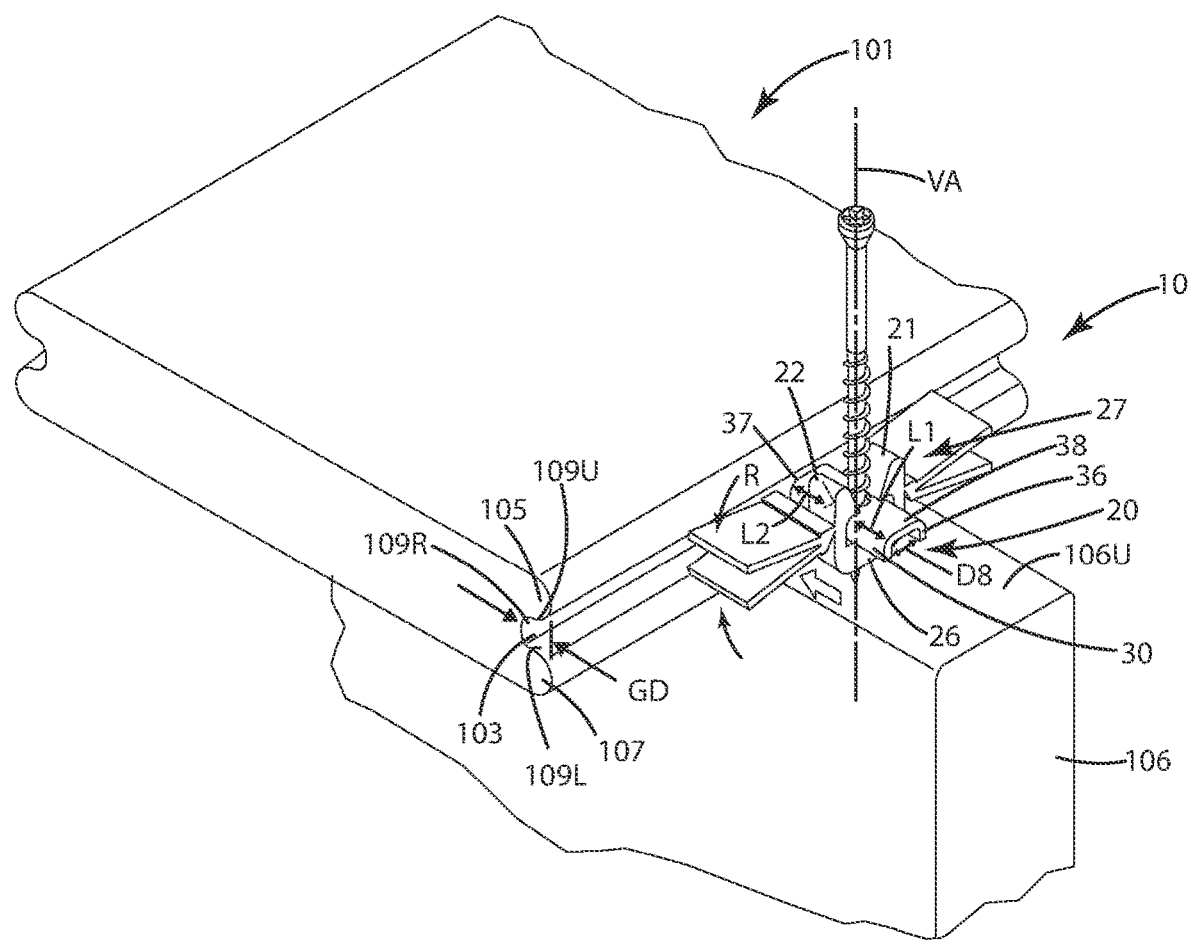
FIG. 2 is another perspective view of the fastener unit about to be installed in a first groove of a first board.
Figure 6:
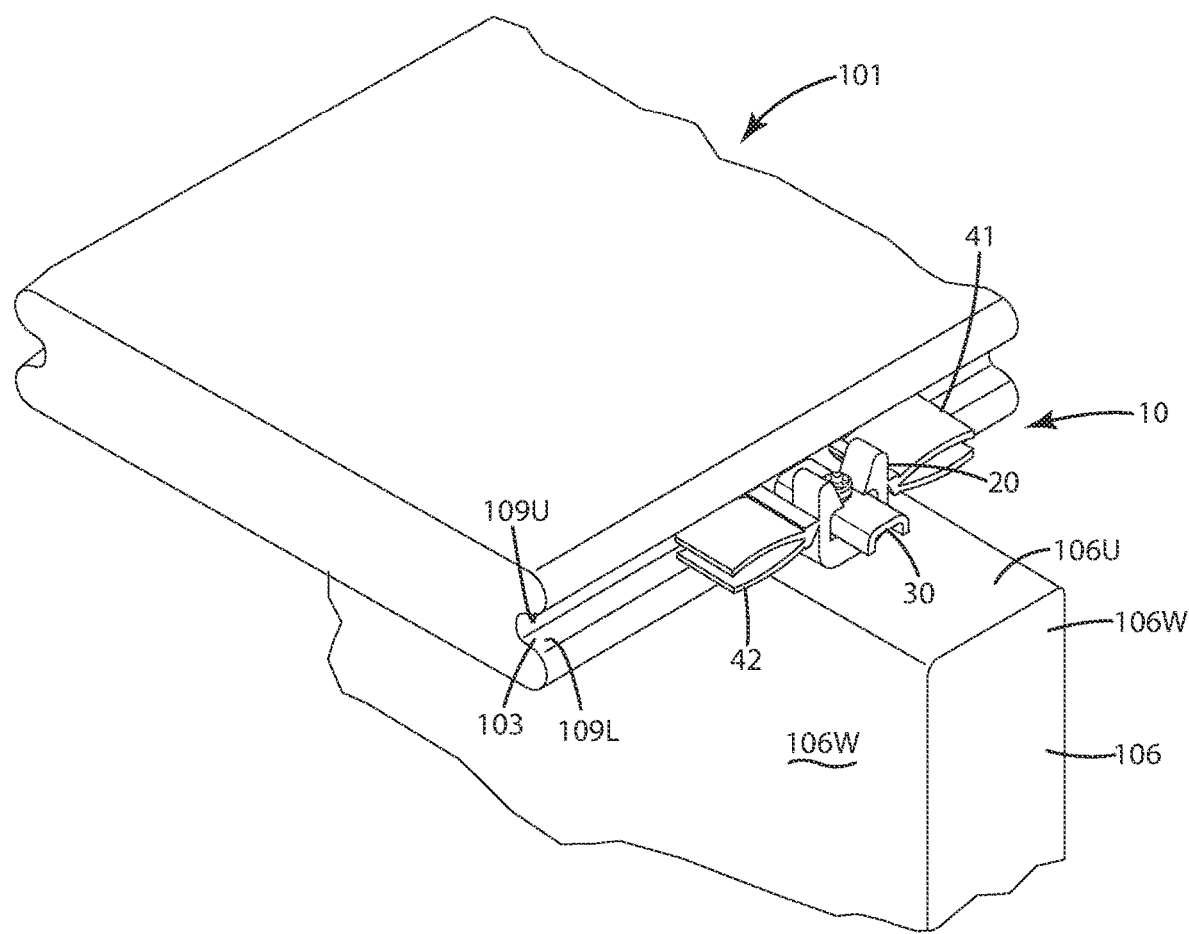
FIG. 6 is a perspective view of the resilient compression elements installed in a groove and holding the fastener unit adjacent the board.

As shown in FIGS. 2 and 6, the boards 101, 102 can include respective grooves 103 and 104. These grooves can include a groove depth GD of optionally 1/16 inch, further optionally 1/8 inch, even further optionally 1/4 inch, yet further optionally 1/2 inch or other depths depending on the particular application. Further, as shown in FIG. 2, the groove can be bounded by upper 105 and lower 107 lobes or projections that transition to the upper and lower surfaces of the board 101. Although shown as a continuous groove, each of the respective grooves 103 and 104 can be intermittent and/or discontinuous, depending on the particular application and board construction. Each groove 103 also can include a lower wall 109L, a rearward wall 109R and an upper wall 109U. These walls can be radiused and can transition smoothly or cleanly to one another as shown. Alternatively, they can be joined at right angles, depending on the application.

The fastener unit 10 of the current embodiment will be described generally in connection with joining boards 101, 102 to an underlying joist 106, where the deck boards lay across an upper surface 106U of the joist. The joist 106 of course can be any support structure or element and can be constructed from any type of material, such as wood, plastic, composites, metal, ceramic, tile, masonry or other materials depending on the application. Further, it will be appreciated that the fastener unit can be used in conjunction with any type of decking, flooring, covering, roofing or other components.

Turning now to the fastener unit 10, each of the respective components, such as the spacer block 20, board engagement elements or resilient compression elements 41, 42, grip element 30 and fastener 90 will now be described in more detail. Referring to FIGS. 1-4, the spacer block 20 includes a front surface 21 and an opposing rear surface 22. These surfaces are on opposite sides of the vertical axis VA of the spacer body 20. This vertical axis VA can correspond to a longitudinal axis of the fastener 90. As described further below, a first fastener hole FF1 is aligned with this vertical axis VA. The spacer body 20 can include a first side surface 23 and an opposing second side surface 24.

The spacer block can define a thickness T1 that extends between the front surface 21 and the opposing rear surface 22. This thickness corresponds to a preselected gap G (FIG. 7) that to be located between adjacently placed boards 101, 102. This gap and thickness can be optionally at least 0.180 inches, further optionally at least 0.200 inches, further optionally at least 0.250 inches, even further optionally at least 0.300 inches, yet further optionally at least 0.350 inches, further optionally at least 0.400 inches, yet further optionally at least 0.450 inches, even further optionally at least 0.500 inches, or wider or increments thereof, depending on the application and the desired spacing between adjacent deck boards. Alternatively, the gap and thickness can be optionally less than 0.180 inches, further optionally less than 0.200 inches, still further optionally less than 0.250 inches, even further optionally less than 0.300 inches, yet further optionally less than 0.350 inches, further optionally less than 0.400 inches, yet further optionally less than 0.450 inches, even further optionally less than 0.500 inches, or narrower or increments thereof, depending on the application and the desired spacing between adjacent deck boards. Optionally, the thickness T1 and corresponding gap G set by the spacer body can be equal to and/or greater than the diameter DF of the fastener head 90H. In this manner, the fastener head can fit between and not excessively mar board surfaces that are placed adjacent the spacer body.

Figure 7:
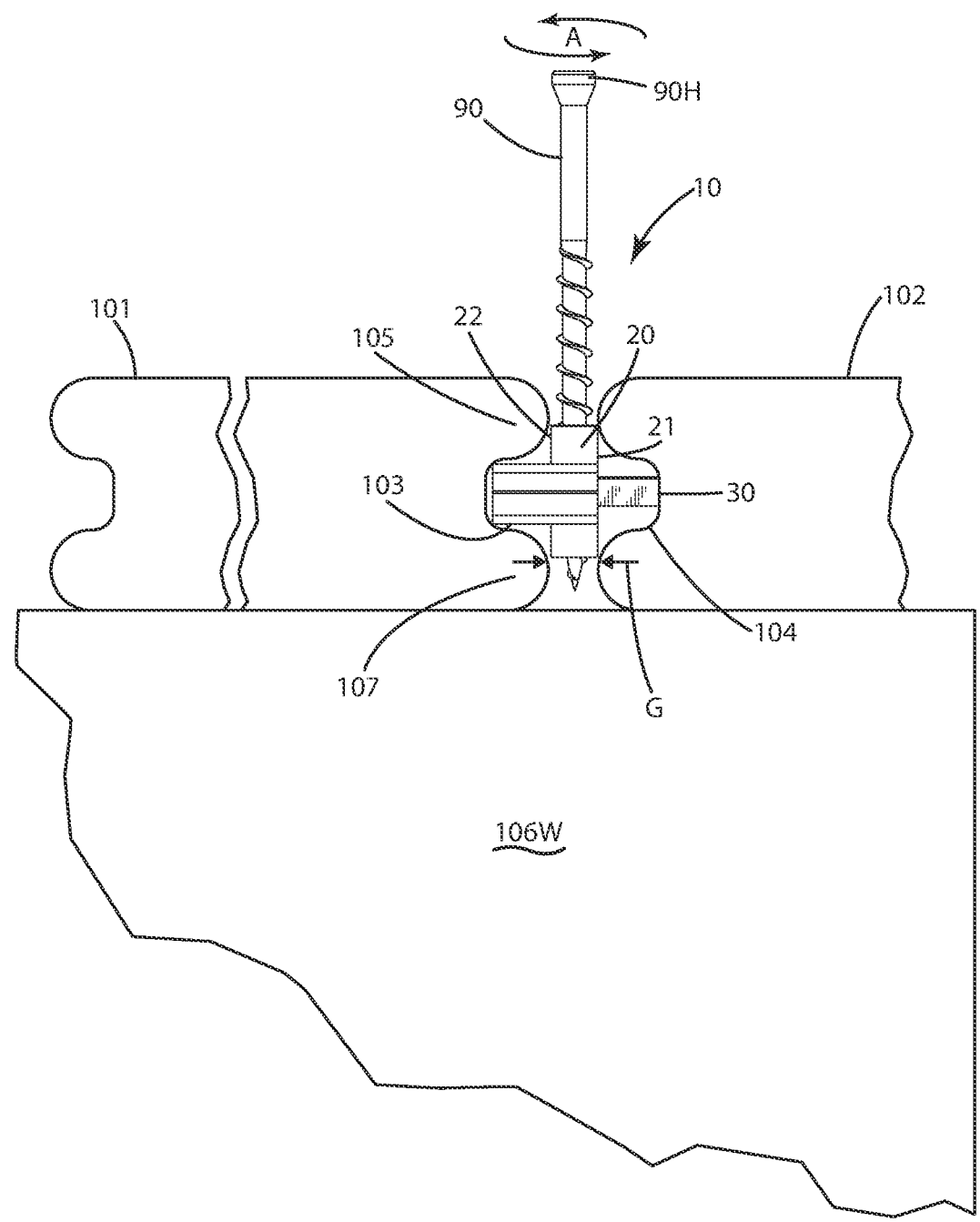
FIG. 7 is a side sectional view of the fastener unit installed within grooves of adjacent boards and establishing a gap with a spacer body between those adjacent boards.
Figure 8:
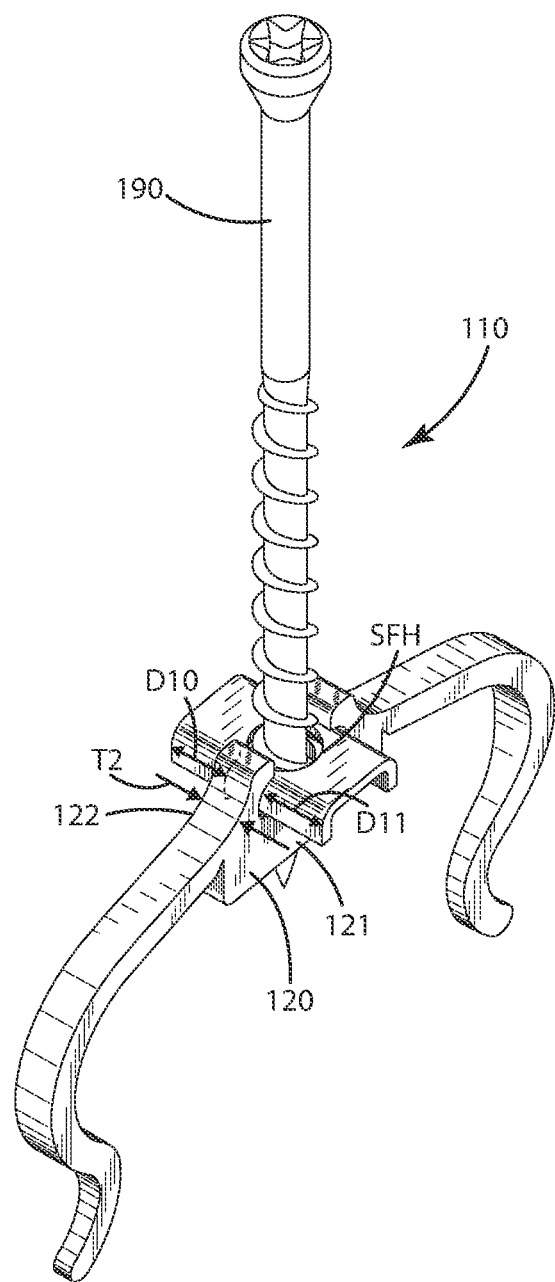
FIG. 8 is a perspective view of a first alternative embodiment of the fastener unit.

The spacer body 20 can set this gap G by way of the front surface 21 engaging in adjacent board, for example, board 102 in FIG. 7, and the rearward opposing face 22 engaging the board 101 as shown in FIG. 7. With this spacer body being disposed generally between the upper and lower lobes or projections 105, 107 that straddle the respective grooves 103 and 104, the spacer body effectively prevents those boards 101 and 102 from being placed any closer to one another than the gap G due to the thickness T1 of the spacer body 20 there between. As illustrated, the spacer body front surface 21 can engage the upper lobe 105 of a board above the groove 104. A lower portion of the spacer body 26 can engage the lower lobe 107 of the board, generally below the groove. Optionally, the spacer body can engage portions of the side surface of the board in the regions of the lobes 105 and 107 above and below the groove 103.

Figure 3:
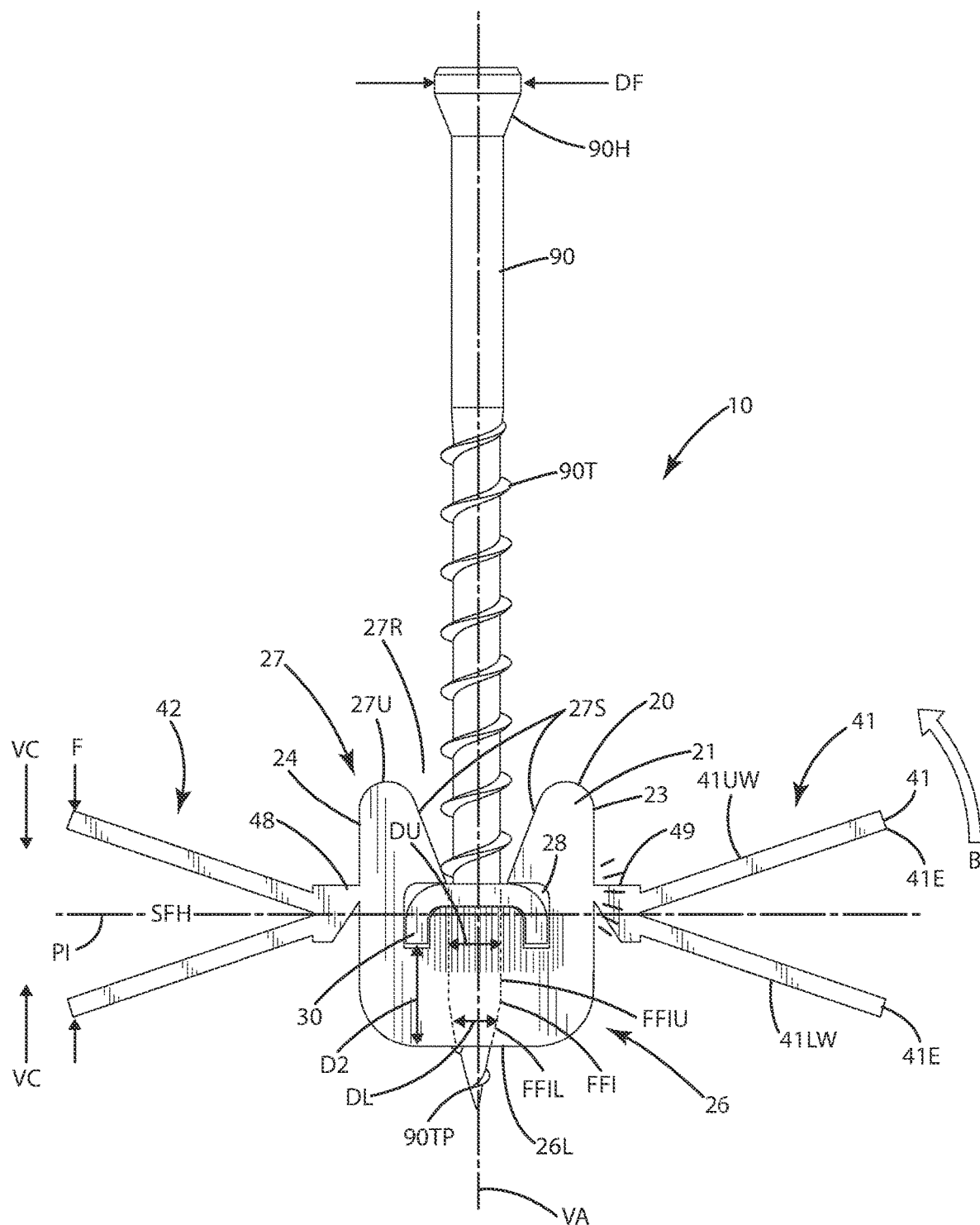
FIG. 3 is a front view of the fastener unit.
Figure 4:
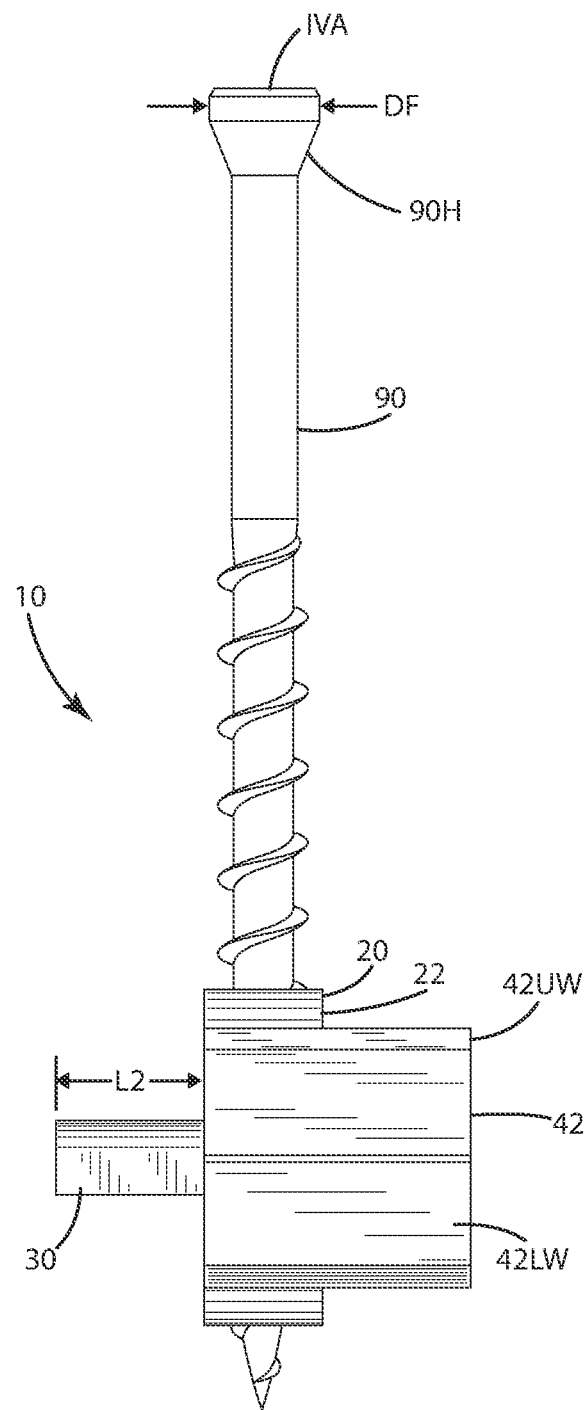
FIG. 4 is a side view of the fastener unit.

As shown in FIGS. 1 and 3, the spacer body upper portion 27 can include or define a recess 27R that extends from an upper most surface 27U, to a location adjacent the grip element 30. This recess 27R can be flanked by opposing ramped surfaces 27S. These ramped surfaces 27S can facilitate insertion of the fastener 90 into the first fastener hole FF1 as described further below.

Figure 5:
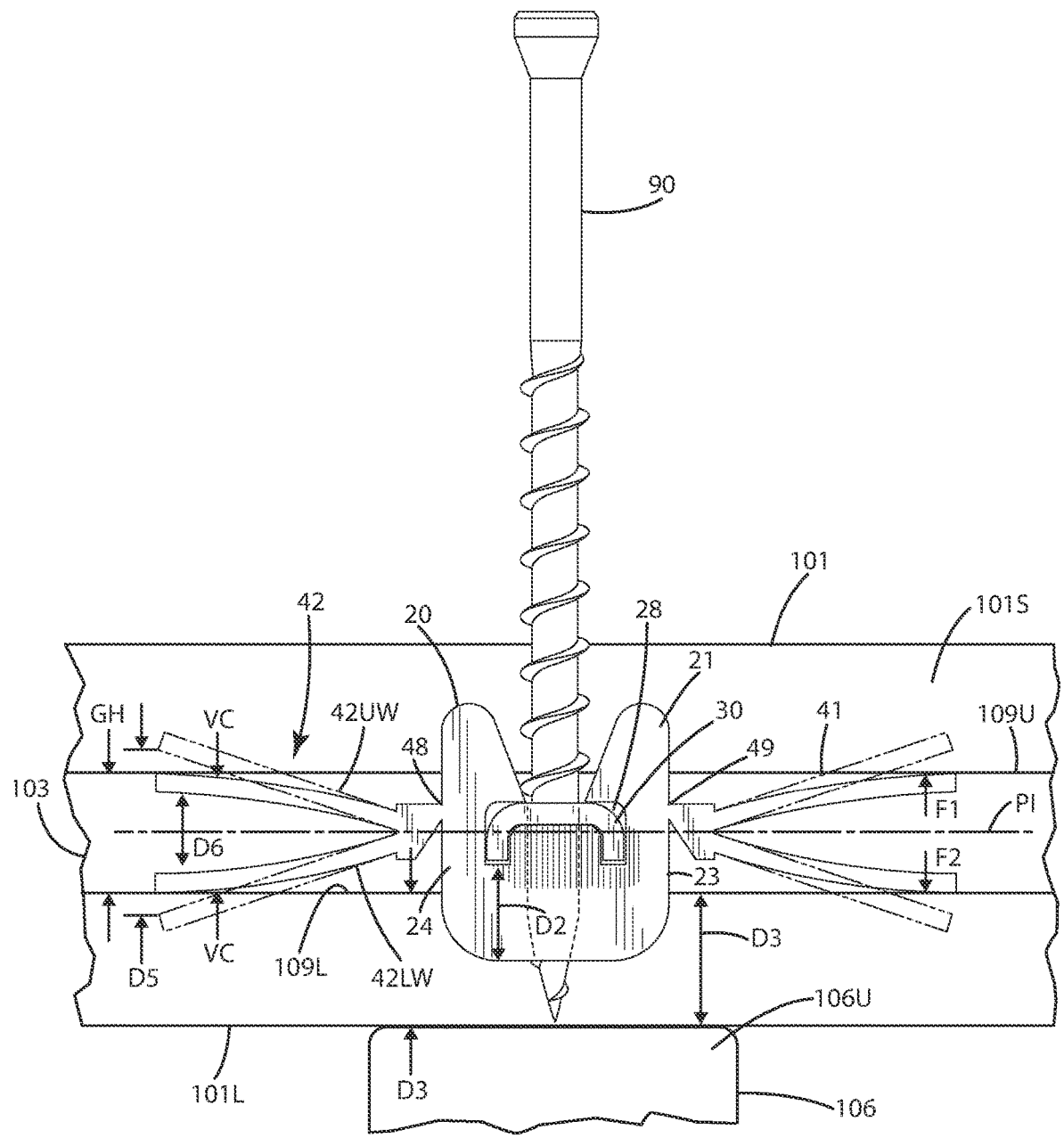
FIG. 5 is a front view of the fastener unit with the resilient compression elements being converted from an open mode to a compression mode.

As shown in FIGS. 1 and 3, the lower portion 26 can include a lower surface 26L that can be generally flat. The distance D2 between the lowermost portion of the grip element 30 and the lower surface 26L of the lower portion 26 can be less than the distance D3 between the lower wall 109L of the groove 103 as shown in FIG. 5. With this distance D2 less than D3, the spacer block 20 optionally will not interfere with the grip element 30 being brought into contact and engagement with the lower surface 109L of the groove. For example, if the distance D2 was optionally greater than D3, this might interfere with the engagement of the grip element 30 with the components of the groove 103. Of course, this alternative construction can be implemented for different applications where grip element engagement is irrelevant.

As shown in FIGS. 3 and 5, the spacer body 20 also can define a grip element recess 28. This grip element recess can extend generally through the spacer body, from the forward surface 21 to the opposing rearward surface 22. This grip element recess can be of a corresponding shape relative to the shape of the grip element 30. The recess 28 can be in the form of an inverted U- or C-shaped channel that opens downward toward a joist 106. This recess 28 can be sized to enable the grip element 30 to be inserted through the spacer body and in some cases, friction fit and held in place relative to the spacer body. Of course, there can be some gaps between the sides of the recess and the grip element 30 so that the spacer body does not hold that grip element well. In such constructions, the fastener 90, extending through a grip element aperture, also called a second fastener hole SFH defined by the grip element 30 and into the first fastener hole FF1 of the spacer body 20. Due to the engagement of the threads 90T of the fastener with the first fastener hole FF1, the fastener can secure the grip element in place relative to the spacer body. Optionally, the grip element 30 can be overmolded or 3-D printed over with material that forms the spacer body. In such a case, the grip element can be at least partially encapsulated by the spacer body and held in place accordingly.

As shown in FIG. 3, the first fastener hole FF1 can include an upper portion FF1U and a lower portion FF1L. The upper portion and lower portion can be of similar geometric shapes. For example, the upper and lower portions can both be cylindrical. In some cases, however, one can be frustoconical and the other can be cylindrical. In yet other applications, the shape can be rectangular, square, polygonal, ellipsoid, rounded or other geometric shapes. These respective portions can have different diameters or dimensions. For example, the upper portion can include a diameter DU and the lower portion can include a diameter DL. The lower portion diameter DL can be less than the upper portion diameter DU. This can enable the tip 90TP of the fastener 90, which can be pointed or frustoconical to be inserted into and have its threads partially bite into the lower portion FF1L. This in turn, can enable the fastener 90 to be slightly threaded into the spacer body so that it is secured thereto via those threads and the interaction of the threads with the first fastener hole FF1. It will be noted that although referred to herein as a diameter, that phrase encompasses any dimension of the first fastener hole, regardless of whether the respective portions of the hole are circular, elliptical, rounded or instead are polygonal.

Turning to FIGS. 1-5, the grip element 30 can be in the form of a C-, V- or U-shaped channel. The grip element can be joined with the spacer body and optionally disposed within a spacer grip element recess or aperture 28. The grip element can include a base 33 and optional first 31 and second 32 downwardly extending protrusions, cleats or gussets. These cleats can optionally be integrally formed with the base 33. The cleats can be spaced a distance from one another and relative to the second fastener hole SFH, and thus the fastener 90 and the fastener head 90H. In particular, the cleats can be spaced so that when the head 90H is tightened and engages the grip element, first and second portions on opposite sides or ends of the head or its diameter respectively can exert forces downward directly over and on the first and second cleats 31, 32, without bending the grip element. The cleats can function as reinforcing members to the base in this manner, particularly when the fastener head 90H is pressing down on the base, to optionally prevent buckling of that base. Optionally, as shown in FIG. 2, the cleats 31, 32 can be spaced so their interior facing surfaces are a distance D8 of optionally less than 0.500 inches from one another, further optionally less than 0.250 inches from one another, even further optionally less than 0.200 inches from one another, yet further optionally less than 0.180 inches from one another, and still further optionally about 0.208 from one another. The diameter DF of the fastener can be equal to, less than or greater than this distance D8. Optionally, the diameter DF can be equal to or slightly greater than the distance D8. In turn, this can maintain the cleats under or immediately adjacent the lower portions of the head 90H when those portions engage the grip element. Again, this can add rigidity and support closer to the fastener as it is tightened so the base and grip element in general do not deform, bend or buckle due to the downward force exerted by the fastener in the middle of the grip element.

These cleats can be configured to engage the grooves 103 and 104 of the respective boards with which the fastener unit 10 is used. As shown, the cleats can include flat lower edges, however these edges can be sharpened so that they are angled and come to points. Although not shown, the cleat lower edges can be serrated and/or include teeth to better bite into the groove of the board when the fastener unit is secured in place with the fastener 90.

As mentioned above, the grip element 30 includes a grip element aperture or second fastener hole SFH. This fastener hole can be aligned with the first fastener hole FF1 of the spacer body 20 so that the fastener can fit through both simultaneously. This second fastener hole SFH can be disposed in the center of the base 33, and optionally centered halfway between the forward edge 36 and rearward edge 37 of the grip element 30 as shown in FIG. 2.

Optionally, the second fastener hole SFH can be a circular hole drilled through the base 33. In other cases, the second fastener hole SFH can be a recess ground through the base and one or more of the cleats 31 or 32, but only from a single side. This can enable the grip element to retain enough material so that the head 90H of the fastener 90 will engage the grip element and pull it toward the underlying joist 106. The second fastener hole can be large enough to accept the threads of a fastener therethrough, but smaller than the diameter of the fastener head so that the head engages and pulls the grip element when tightened.

The grip element can also include a forwardly extending portion 38 that extends forwardly of the forward surface 21 of the spacer body 20. The grip element can also include a rearward portion 37 that extends rearwardly of the rearward face 22 of the spacer body. The forward portion and rearward portions of the grip element can be of lengths L1 and L2, which can be equal extending from the respective forward and rearward faces of the spacer body. Of course, in some applications the distances and lengths can vary.

The grip element 30 can be constructed from a variety of materials, such as metal, composites, polymers, ceramics, reinforced composites, polymers and the like. The grip element can be strong enough so that it does not buckle or collapse when the fastener head 90H engages it and pulls the grip element 30 into the lower surface 109L of the board groove 103. In this manner, the fastener 90 pulls the grip element 30 into tight engagement with that lower surface 109L or other components of the groove 103. This in turn, clamps the board 101 down to the underlying support structure 106. Due to this clamping, the board 101 effectively can be prevented from moving upon expansion and contraction of that board when subjected to different environmental conditions, such as heating and cooling. This can prevent the board from creeping in one direction or the other or generally becoming uneven.

Optionally, although shown as an inverted channel, the grip element can be in the form of a small tube with corresponding teeth, a single flat piece of high-strength steel, optionally with serrations or knurling on its lower surface, or other forms, depending on the application and the materials from which the boards are constructed and/or as well as the desired holding strength.

As mentioned above, the fastener unit 10 can include first 41 and second 42 resilient compression elements. These resilient compression elements can be similar in structure and therefore only one will be described in detail here. It also will be appreciated that one of the resilient compression elements can be eliminated from the design in certain applications. In further applications, that area of the fastener unit can be occupied by a simple flange or leg that extends outwardly from the side surface of the spacer body 20, where that component is not compressible or movable from an open mode to a compressed mode as with a resilient compression element.

The first resilient compression element 41 can extend outwardly from the first side surface 23 of the spacer body 20. The second resilient compression element 42 can extend outwardly from the second side surface 24 of the spacer body, which is opposite the side 23. Thus, the resilient compression elements optionally can be symmetric about the vertical axis VA as shown in FIG. 3. Generally, the resilient compression elements 41 and 42 can be joined on opposite sides of the vertical axis VA. In this manner, they can engage the groove distal from one another to provide two or four points of engagement and contact between the fastener unit and the groove, not counting the engagement by the grip element 30.

The first resilient compression element can include a vertically compressible upper wing 41UW and a vertically compressible lower wing 41LW. These wings can be joined at a junction 41J. The wings as illustrated are generally in the form of flat pates angled relative to another and joined at apex at the junction 41J. Of course, in other applications these wings can be curved, rounded, or of other shapes. These upper and lower wings can be designed to be vertically compressed in direction VC as shown in FIGS. 3 and 5. By vertically compressible, it is meant that the a wing or component or portion of the resilient compression element can be moved in direction of the arrows VC, generally toward a pane P1 that is orthogonal to or otherwise transverse to the vertical axis VA of the spacer body 20. Due to their resilient nature, however, these portions resiliently deform and are urged to expand and re-attain their previous configuration in an open mode of those elements as shown in FIGS. 1 and 3. After application of forces F to move the wings toward one another and/or generally toward the plane P1, due to the resilient nature of the wings, those wings are self-urged to open back up to the configuration shown in FIGS. 1 and 3.

The resilient compression elements 41, 42 are operable in an open mode, as shown in FIG. 3 and a compressed mode as shown in FIGS. 5-7. In the open mode, the fastener unit 10 is not yet installed relative to a groove of a board. In that configuration, the ends or outermost portions of the wings, farthest from the spacer body 20, are disposed a distance D5 from one another. This distance D5 in the open mode can be less than the height GH of the groove. Because of the vertically compressible nature of the resilient wings 42UW and 42LW of the resilient compression element 42, these wings can be moved toward one another or generally toward a spacer body horizontal reference plane, that is, the first plane P1. Optionally, this plane P1 can pass through the grip element recess 28 and/or the portions of the grip element 30. When these wings are vertically compressed under a vertical compression force F, the distance D6 between them decreases. This distance D6 can be less than the groove height GH. Optionally, the compression elements upper and lower portions can be separated by a variable distance. This distance can be varied so that the resilient compression elements can fit within a particular groove of a board.

Referring to FIG. 3, the outer ends 41E of the wings, and generally the resilient compression element 41, are free ends that extended the space. That is, they are not connected to one another. Optionally, in some applications, these elements and the ends can be connected to one another, provided that the connection allows vertical compression in direction VC. As an example, the upper and lower wings can be joined with corresponding wings, in the shape of "V" that extend outwardly from the ends 41E. In turn, this allows these components to be compressed. In other constructions, the vertically compressible wings can be in the form of elongated elliptical or circular shapes that are structured to enable them to be compressed and reduce their overall vertical dimension, optionally to some dimension that is less than the groove height GH of the groove 103.

With reference to FIG. 5, in operation, a user can manually apply a force F to vertically compress the wings 41 and 42 in direction VC toward the plane P1 and/or generally toward one another. This converts the wings from the open mode shown in broken lines to a compressed mode as shown in solid lines. The resilient wings or portions of the compression elements bend, flex or otherwise move toward one another so that the distance between them is reduced from the distance D5 to the distance D6. This reduction in distance can be approximately 5%, 10%, 15%, 25%, 30%, 35%, 40%, 50% or more, depending on the application and amount of vertical compression. Generally, the first wing and second wing or other portions of the resilient compression element are resiliently moveable toward one another and/or the first plane P1 such that the vertical distance between the wings decreases upon the application of a compressive force by a user.

With the resilient compression elements in the compressed mode, a user can install those elements 41 and 42 into the groove 103. Because the distance D6 is less than the groove height GH, these elements will now fit within the groove. When the user releases or reduces the force F applied in the compressed mode to the respective portions of the resilient compression element, those wings want to go back to the configuration of the open mode. Due to the upper 109U and lower 109L surfaces of the groove, engagement of those wings with the resilient compression elements and the respective wings or other portions thereof, exert forces F1 and F2 on the board 101 in the groove, and against the upper and lower surfaces of the groove. These forces can optionally be at least 0.0001 pounds, further optionally at least 0.001 pounds, even further optionally at least 0.05 pounds, yet further optionally between 0.0001 pounds and 0.5 pounds. Of course, other forces can be exerted by the compression elements against the surfaces of the groove depending on the application and configuration of the resilient compression elements.

Due to the forcible expansion of the resilient compression elements within the groove, the resilient compression elements secure the spacer block in a position adjacent the first groove. In this manner, the spacer block can be disposed in and effectively form the gap G between the side surfaces of the boards 101 and 102 when the second board is installed, as shown in FIG. 7.

The resilient compression elements 41, 42 can include respective front edges 41F, 42F and rear edges 41R, 42R. The rear edges 41R are configured to fit within the groove 103 of the board 101. In some cases, the rear edges can be disposed entirely within the groove and located adjacent the rear wall 109R. The front edges, however, can extend outward from the groove, and beyond the site surface of the board, and in particular the lobes 105 and 107.

Optionally, the front edge and rear edge are separated by a compression element width CEW. This compression element width CEW can be greater than the thickness T1 of the spacer block 20. Put another way, the thickness T1 of the spacer block 20 can be less than the compression element width CEW. Thus, the resilient compression elements can extend forward and/or rearward from the front and rear surfaces of the spacer block. As illustrated, the front edge 42F can lay within a common plane with the front surface 21 of the spacer block 20. The rearward edges 41R, 42R can extend beyond and outwardly from the spacer block rear surface 22 a distance D7 as shown in FIG. 1.

In some cases, there can be spatial relationships between the grip element, spacer block and resilient compression elements. For example, the grip element can have a grip element length L3 that extends from the front edge to the rear edge of the grip element 30. As mentioned, above the spacer block 20 can include a spacer block thickness T1 and the resilient compression elements can each include compressible element widths CEW. As illustrated, the grip element length L3 can be greater than the compressible element width CEW. The resilient compression element width CEW can be greater than the spacer block thickness T1. In some cases, both the grip element length L3 and the compression element width CEW can be greater than the thickness T1. This can enable the respective grip element and resilient compression elements to fit within the groove of one board yet not interfere with fitment of another board adjacent the first board. Indeed, the compression element width CEW can be less than the sum of the groove depth GD plus the thickness T1 of the spacer block. This can enable the resilient compression elements to be disposed within the groove to hold the spacer block in place, yet not extend beyond the spacer block to interfere with the setting of a gap between adjacent boards. With this decreased width, the resilient compression elements also might not interfere with or engage another groove 104 of an adjacent board 102. Instead, only the grip element 30 optionally extends into and is engaged against that groove 104 to secure the boards to another.

The resilient compression elements 41, 42 can be joined with the spacer body 20 at respective fracturable joints 48 and 49. As shown in FIGS. 3 and 5, these fractional joints can be effective zones of weakness where the material joining the spacer body and the resilient compression elements is thinned so that those resilient compression elements can be bent in direction B and effectively break off at that joint. This is illustrated in FIG. 3 where the joint 49 has been fractured. In some cases, the fractional joint can be a portion of plastic that has perforations or holes extending therethrough. With this fracturable a joint, a user can selectively and manually remove one of the resilient compression elements 41, 42 to fit in a particular confined space or over a combination of abutting underlying support joists.

A related method of using the fastener unit 10 of the current embodiment will now be described. In general, the fastener unit can be provided including its spacer body 20, grip element 30, and resilient compression elements 41 and 42. The fastener 90 can be installed therein or can be installed by the user generally extending through the fastener holes as described above and engaging different portions of those holes as also described above. A user can apply a force F as shown in FIG. 3 to vertically compress in direction VC the wings of the resilient compression element toward one another and/or generally toward a plane P1. This in turn, changes the distance between the ends of the wings from a distance D5 to a lesser distance D6. When so compressed, the fastener unit transforms from an open mode, shown in broken lines, to a compressed mode, shown in solid lines, in FIG. 5. The wings of the resilient compression elements as well as the rearward portion 37 of the grip element 30 can be inserted into the groove 103 as shown in FIG. 6. These elements can be pushed in direction R as shown in FIG. 2 into the groove. The wings can be released to remove the manually applied compressive force F on the wings. In turn, the wings resiliently deform back toward their configuration in the open mode from the compressed mode. This in turn, exerts forces F1 and F2 by the resilient compression elements against the upper and lower surfaces of the groove. This fixes the fastener unit in place adjacent that groove. The spacer body 20 is thus held adjacent the first side surface 101S of the board 101 that is adjacent the groove 103.

As mentioned above, in some cases, two joists may be immediately adjacent one another. To center the fasteners and associated grip elements over each of the joists, one resilient compression element can be broken off each of the adjacent fastener units. This can be achieved by the user manually bending in direction B one of the resilient compression elements 41 to snap that component off from the spacer body as shown in FIG. 3.

With the fastener unit property installed relative to the first board 101, a second board 102, as shown in FIG. 7, can be placed immediately adjacent the first board 101, but separated by a gap G established by the thickness of the spacer body 20 of the fastener unit 10. Due to the grip element 30 extending outwardly from the forward face 21 of the spacer block, that grip element can be installed in the second groove 104 of the second board 102. With the boards so installed on the joist 106, the fastener 90 can be rotated in direction A. As a result, the fastener advances through the spacer body 20, the grip element 30 and into the underlying support or joist 106. As it does so, the head 90H eventually engages the grip element 30. This in turn pulls the grip element downward toward the joist 106. As a result, the grip element and, for example, its cleats or protrusions bite into the lower surfaces of the respective grooves of the boards. This in turn provides enhanced holding force of the boards against the joist 106. With the fastener unit of the current embodiments, the overall length of the unit from end to end is generally sufficient to cover all of the top of the joist 106 that may otherwise be exposed through the gap G established between the boards.

A first alternative embodiment of the fastener unit is illustrated in FIGS. 8-11 and generally designated 110. The fastener unit of this embodiment is similar in structure, function and operation to the embodiment described above with several exceptions. For example, this unit 110 includes a fastener 190 similar to the fastener 90 above. It also includes a grip element 130 that is disposed in a recess 128 defined by a spacer body 120. The spacer body can have a spacer body width SW. The grip element can have a grip element width GW. The grip element width can be less than the spacer body width. For example the grip element width can be optionally less than ¾ the spacer body width, further optionally less than ½ the spacer body width.

The spacer body can be configured to establish a gap between adjacent boards, and sized with a thickness T2 similar to the thickness T1 described in the embodiment above. The grip element 130 can define a second fastener hole SFH' that is aligned with a first fastener hole FFH' of the spacer body 120 similar to that described above. The first fastener hole FFH' also can include upper and lower portions FF1U' and FF1L' that have different diameters, the lower one having a diameter less than the upper one's diameter. The grip element 130 optionally can extend from the forward 121 and rearward 122 surfaces of the spacer body 120 by equal distances D10 and D11. Of course, in some applications, these distances can vary.

In this embodiment, the unit 110 can include first and second compression elements which are in the form of first and second joist legs 141 and 142 that extend downward and outward from the spacer body 120. These first and second joist legs are configured to straddle and clampingly engage a joist. The joist legs are similar in construction, so only the first joist leg 141 will be described here. The joist leg 141 includes an outwardly extending portion 143 that extends outward from a side of the spacer body 120. That outwardly extending portion 143 transitions to a rounded or curved portion 145 that extends downwardly, away from a bottom 126L of the spacer body 120. The curved portion 145 is generally concave, opening toward the vertical axis VA. That curved portion 145 extends to a lower engagement portion 146. This lower engagement portion is generally convex relative to the vertical axis VA and opens away from that vertical axis VA. The engagement portion includes an inner engagement surface 146S which is configured to engage and slide over a portion of the outer walls 106W of the joist 106. This surface 146S again is generally curved and convex away from the vertical axis to facilitate sliding of this portion over the walls 106W.

Optionally, each of the joist legs 141 and 142 can be joined with the spacer body 120 at fracturable joints 148, 149 similar to those described above. In this manner, at least one of the first and second joint legs can be manually broken off from the spacer body to accommodate double joists or other confined spaces.

Figure 10:
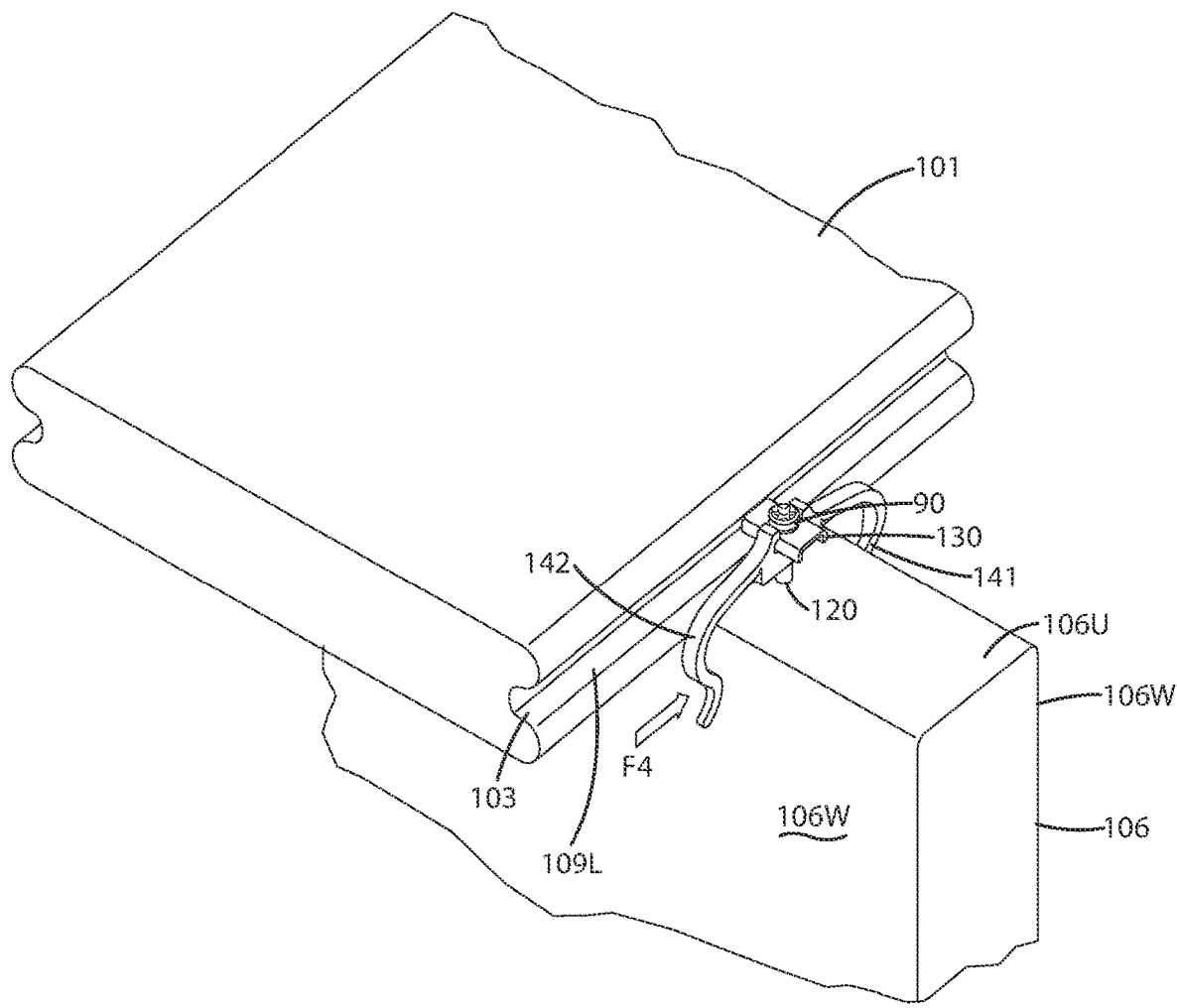
FIG. 10 is a perspective view of the first alternative embodiment of the fastener unit being installed relative to a groove of a board and an underlying support.
Figure 11:
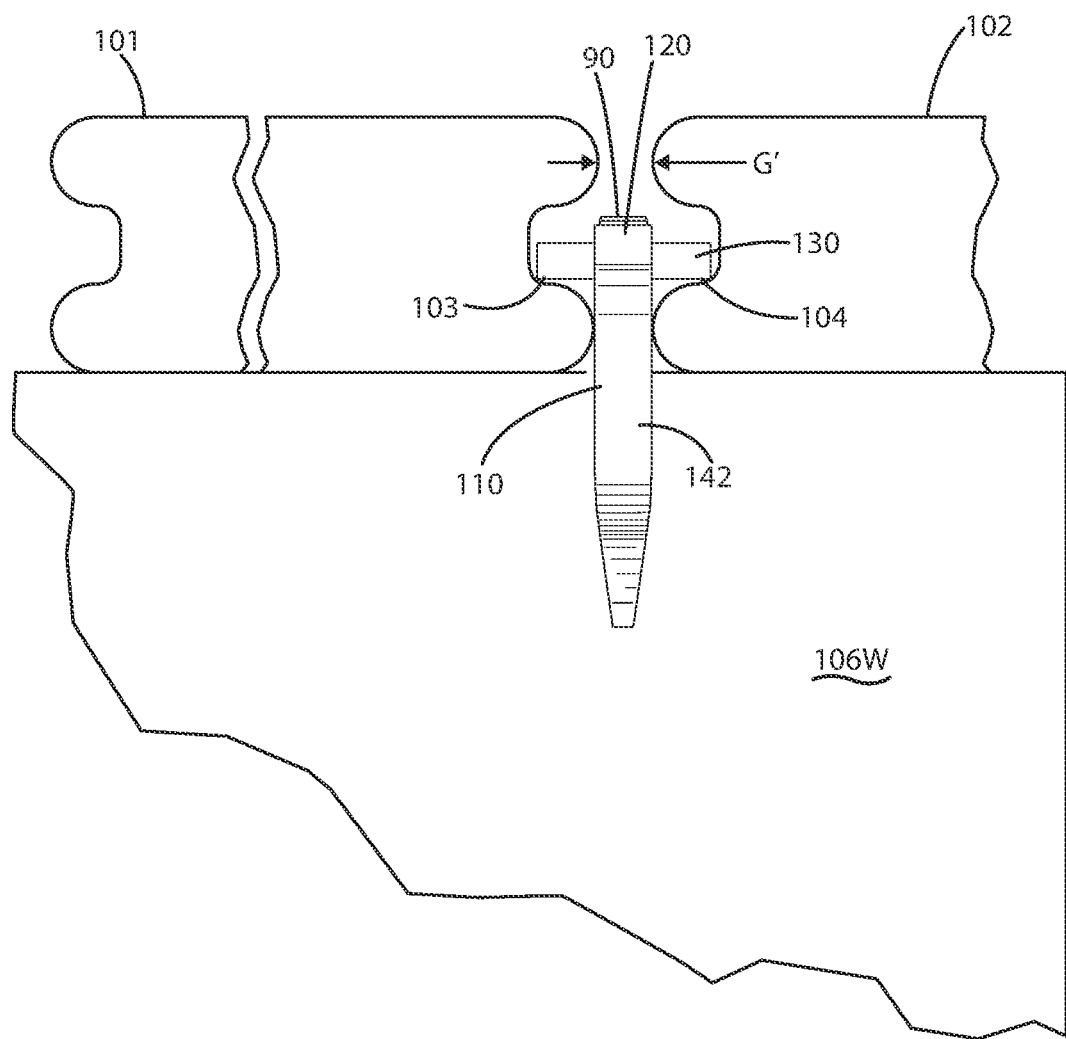
FIG. 11 is a side sectional view of the first alternative embodiment of the fastener unit installed within grooves of adjacent boards and establishing a gap with a spacer body between those adjacent boards.

A method of installing the fastener unit 110 will now be described in connection with FIGS. 9-11. The fastener unit 110 can be disposed adjacent a joist 106 and board 101 as illustrated in FIG. 10. In particular, the joist legs 141 and 142 can be resiliently deformed outward by sliding the engagement surfaces 146S into engagement with the walls 106W of the joist 106. Due to the rounded nature, the joist legs can be resiliently flexed or moved outward and can slide over those walls. Before the lower surface 126L of the spacer body engages the upper surface 106U of the joist 106, the grip element 130 can be inserted into the groove 103 and engage the groove lower surface 109L. Due to the spatial relationship of the spacer body, its lower surface 126L and the lower surface 109L of the groove, the lower surface of the spacer body can be placed at a level lower than a lower surface of the first groove, for example, the lower surface 126L of the spacer body can be below the lower surface 109L of the groove.

As illustrated, the joist legs can exert a compressive or clamping force F4 on the joist 106 to hold the grip element 130 at the elevation above the joist shown in FIG. 10, generally protruding into the groove 103. With the grip element in this location, as shown in FIG. 11, a second board 102 can be moved in place adjacent the fastener unit 110. Due to the thickness T2 of the spacer body 120 separating the two boards, a gap G' can be established between those boards. The grip element 130 also extends into both of the respective gaps of the two boards. With the grip element so placed, and the gap G' established, a user can advance the fastener 90 into the underlying joist. In turn, this causes the grip element 130 and its corresponding cleats to bite into the respective grooves, thereby securing the board in a fixed location over the joist 106.

Figure 9:
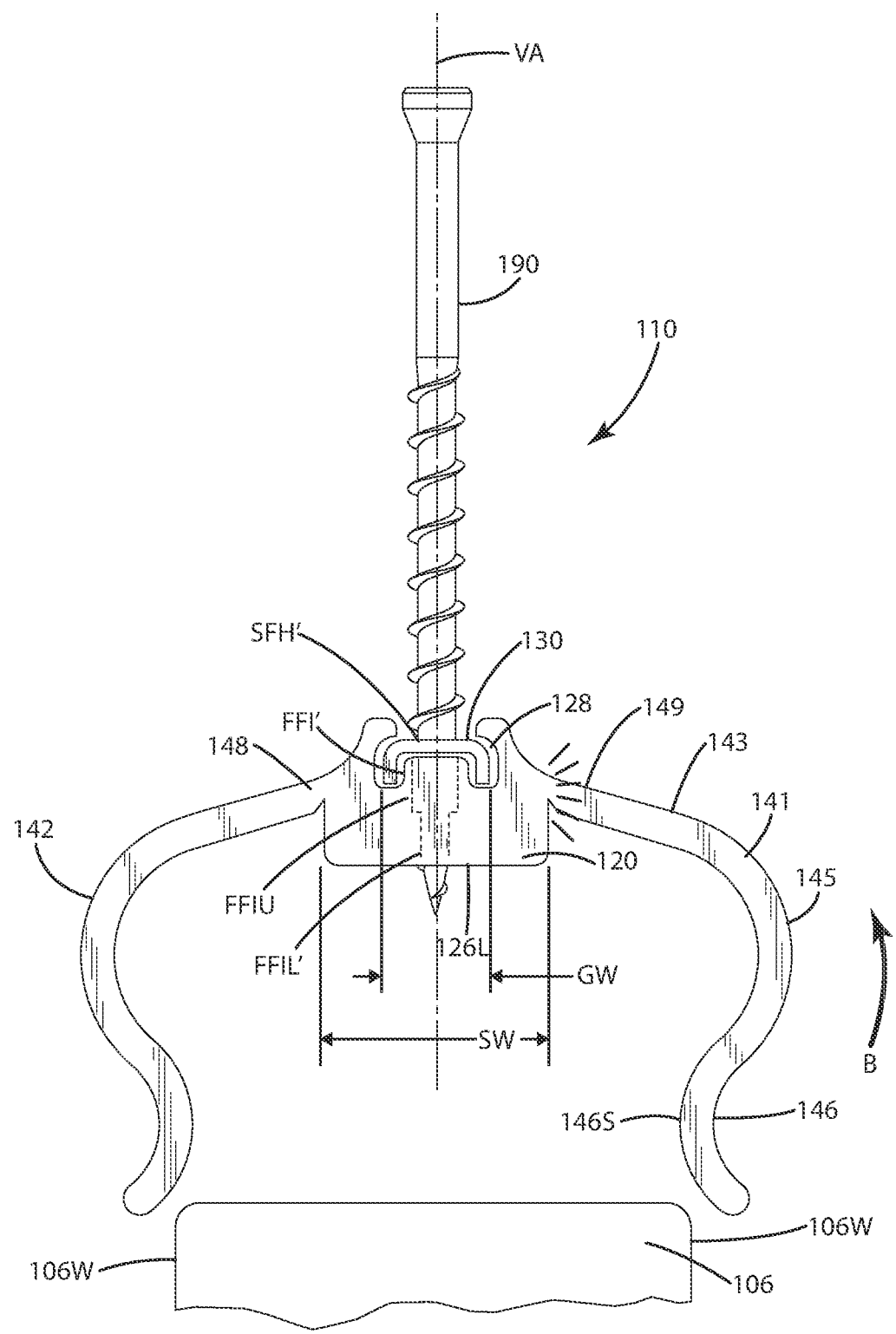
FIG. 9 is a front view of the first alternative embodiment of the fastener unit.

Optionally, in confined spaces, with reference to FIG. 9, one of the joist legs 141 can be bent in direction B to resiliently break off that leg at the fracturable joint 149.

Figure 12:
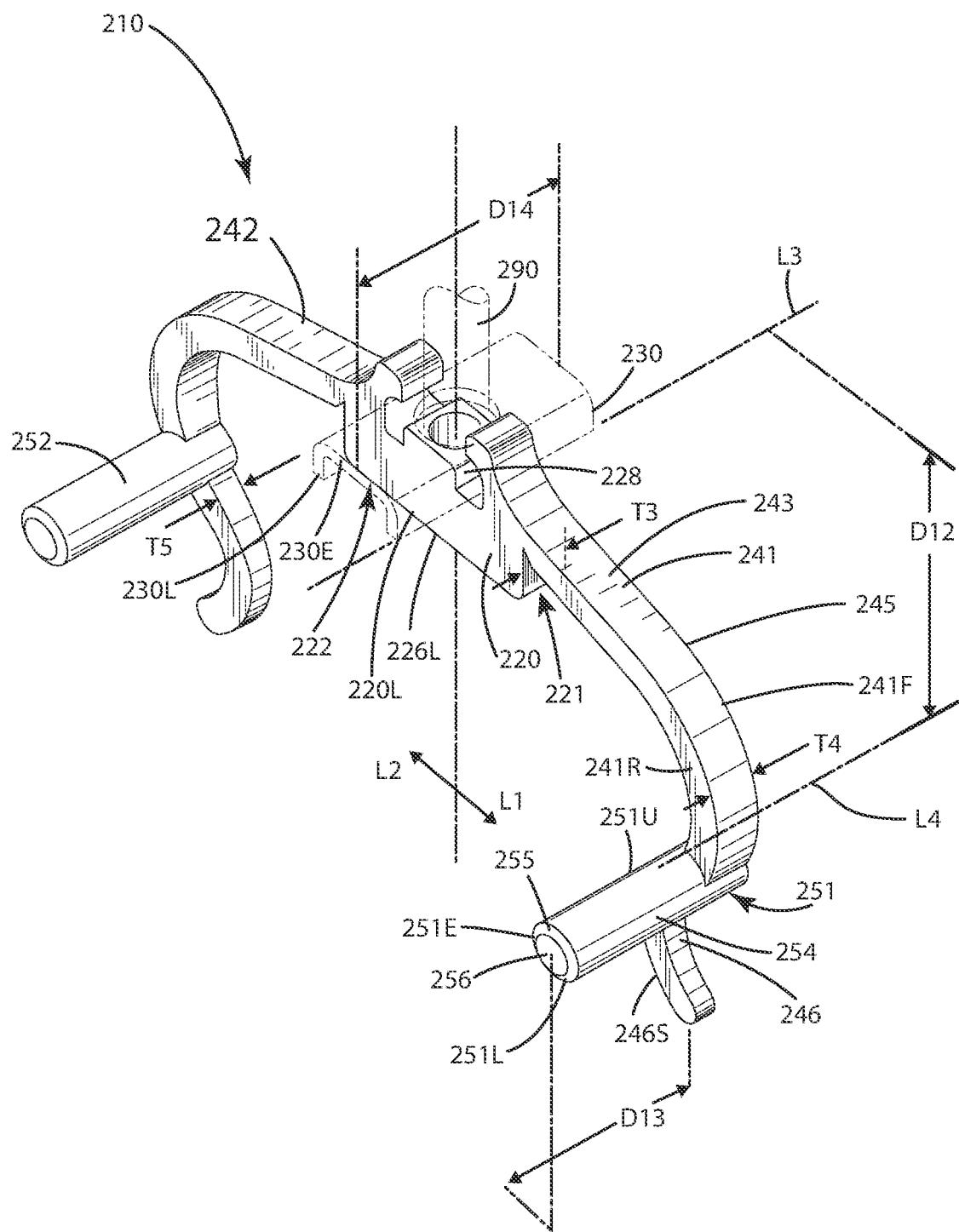
FIG. 12 is a perspective view of a second alternative embodiment of the fastener unit including one or more stabilizer bars.
Figure 13:
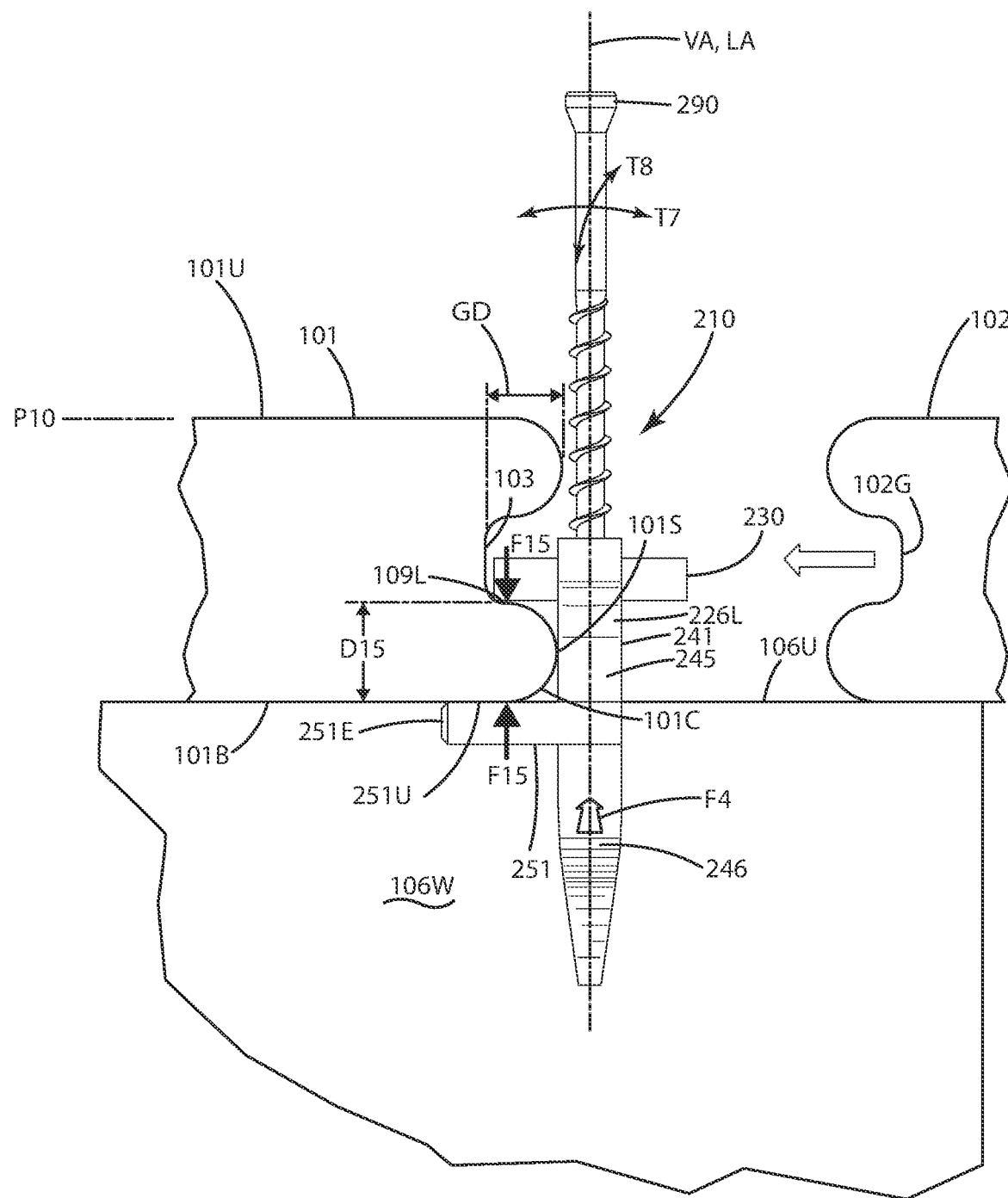
FIG. 13 is a side sectional view of the second alternative embodiment of the fastener unit installed with a grip element in groups of adjacent boards, and with the one or more stabilizer bars engaging a lower surface of a board to provide further stabilization of the fastener unit

A second alternative embodiment of the fastener unit is illustrated in FIGS. 12-13 and generally designated 210. The fastener unit of this embodiment is similar in structure, function and operation to the embodiments described above with several exceptions. For example, this unit 210 can include a fastener 290 similar to the fasteners 90 and 190 above. It also can include a grip element 230 that is disposed in a recess 228 defined by a spacer body 220. The grip element 230 optionally can extend from and beyond the forward 221 and rearward 222 surfaces of the spacer body 220. As above, the spacer body can be configured to establish a gap between adjacent boards, and sized with a thickness T3 similar to the thicknesses T1 and T2 described in the embodiments above.

In this embodiment, the unit 210 includes first and second joist legs 241 and 242, also referred to as resilient compression element in some cases, that extend downward and outward from the spacer body 220. These first and second joist legs are configured to straddle and clampingly engage a joist. The joist legs are similar in construction, so only the first joist leg 241 will be described here. The joist leg 241 includes an outwardly extending portion 243 that extends outward from a side of the spacer body 220. That outwardly extending portion 243 transitions to a rounded or curved portion 245 that extends downwardly, away from a bottom 226L of the spacer body 220. The curved portion 245 is generally concave, opening toward the vertical axis VA of the spacer body 220, which can be coincident and/or parallel to the longitudinal axis LA of the fastener 290. That curved portion 245 extends to a lower engagement portion 246. This lower engagement portion 246 can be convex relative to the vertical axis VA and can open away from that vertical axis VA. The engagement portion can include an inner engagement surface 246S configured to engage and slide over a portion of the outer walls 106W of the joist 106. This surface 246S can be curved and convex away from the vertical axis VA to facilitate slicing of this portion over the walls 106W. Of course, in other constructions, that surface 246S can be flat, planar, rough, ridged, triangular, or can have other geometric configurations depending on the configuration of the joist or the workpiece against which the leg is to be engaged.

As shown in FIG. 12, the first joist leg 241 can extend from a first lateral side L1 of the spacer block 220 on a first side of the vertical axis VA, and the second joist leg 242 can extend from a second lateral side L2 of the spacer block 220. The first and second joist legs can extend outwardly and downwardly from the spacer block. Each of the joist legs can include a forward surface and a rearward surface, and one or more of the joist legs can include a stabilizer bar extending from the joist leg a predetermined distance. In general, the opposing stabilizer bars 251, 252 on the opposing joist legs 241 and 242 can be disposed at a common level L4 relative to one another and relative to another level L3 of the bottom or lower surface 230L of the grip element 230. Due to the similarities of the legs and the stabilizer bars in the embodiment illustrated, only the first joist leg 241 and its corresponding stabilizer bar 251 will be described here.

The first joist leg 241 can include a front surface 241F and a rear surface 241R. The rear surface optionally can be planar and/or rounded. The rear surface can further include the stabilizer bar 251 projecting rearward from it in a direction opposite the front surface 241F of the joist leg 241. As illustrated, the stabilizer bar 251 can be integrally formed and joined with the leg at a transition location between the curved portion 245 and the lower engagement portion 246 of the joist leg. The stabilizer bar can project from the rear surface 241R a distance D13. This distance D13 can be equal to a distance D14 from which an end 23OE of the grip element 230 extends away from the rearward surface 241R of the leg and/or of the rear surface 222 of the spacer body. The distance D13 optionally can be 1/32 inches, further optionally 1/8 inches, further optionally 1/4 inch, yet further optionally 1/4 inch, even further optionally 3/4 inches, or other distances depending on the application. In some cases, D13 can be greater than, less than or equal to D14. In cases where a bottom of the board with which the fastener unit 210 is utilized, the distance D13 is greater than the distance D14 by at least 10% to 25%, such that the stabilizer bar 251 can adequately extend beyond a curved lower corner of the board and engage the under surface or bottom surface of the board as described below.

Referring to FIG. 12, the stabilizer bar 251 can include an upper surface 251U and a lower surface 251L. The upper surface 251U and lower surface 251L optionally can be part of a continuous cylindrical wall 254 where the stabilizer bar 251 is of a cylindrical shape. Of course, where the stabilizer bar 251 is of another geometric shape, for example, a square shape, a polygonal shape an ellipsoid shape, or some other rounded or irregular shape, the upper and lower surfaces can be formed by different portions of a wall or different walls altogether.

The wall 254 can extend to the rear surface 241R of the leg 241. In some cases, the stabilizer bar can alternatively extend also from the forward surface 241F of the joist leg. It may extend the distance D13, or some lesser or greater distance, depending on the application and the type of board utilized with the fastener unit. The stabilizer bar also can be configured such that the stabilizer bar 251 terminates at a free end 251E that projects out into space, in which case the stabilizer bar is cantilevered. This end 251E can include a ramped portion 255 and a flattened end portion 256. The ramped portion 255 can be a frustoconical shape or angled or rounded. In some cases, the ramp 255 and end 256 can be merged into a hemispherical or otherwise rounded end. The end can be rounded or ramped as shown so that that end easily traverses past a corner or other side surface or bottom of a board when the fastener unit is installed. The ramp and/or rounded surface easily rides over the corner of the board and/or the bottom surface of the board for rapid installation.

As further shown in FIG. 12, the stabilizer bar can be disposed a distance D12 below the lower surface 230L of the gripping element 230. For example, the lower surface 230L can be disposed at a level L3, while the upper surface 251U of the stabilizer bar 251 can be disposed at a second level L4. The distance D12 between these different levels can be equal to a distance between a bottom of a groove, and a bottom surface of that same board. In this manner, the board can be pinched or clamped between the bottom surface 230L of the gripping element 230 and the upper surface 251U of the stabilizer bar. Optionally, the portion of the board between the bottom of a groove of the board and the bottom surface of the board can be pinched or clamped between the gripping element 230 and the stabilizer bar 251 on the joist leg 241. Via this interaction with the board, as described further below, the fastener unit 210 can be secured to and joined temporarily with the board optionally to maintain the fastener 290 longitudinal axis LA in a vertical, upright position before installation of the fastener 290 into an underlying joist.

Although shown as a generally cylindrical bar, the stabilizer bar 251 also can have other shapes. In some cases, the stabilizer bar 251 can be a portion of the joist leg 241 below the curved portion 245 at a distance D12, where that leg becomes a greater thickness (not shown) from its rear surface 241R to its front surface 241F. For example, above the stabilizer bar, the thickness T4 of the joist leg 241 can be approximately 1/4 inch. Starting at the upper surface 251U of the stabilizer bar (although not shown) the leg can be of a substantially greater thickness T5 such that the leg is 2, 3, 4, 5 or more times as thick as the thickness T4. This greater thickness T5 can extend all the way to the tip of the engagement portion 246. In other cases (although not shown) the stabilizer bar can extend in this manner to taper from the thickness T5 back toward the thickness T4 or some other thickness of the joist leg 241 toward the tip of the joist leg.

A method of installing the fastener unit 210 will now be described in connection with FIG. 13. The fastener unit 210 can be disposed adjacent a joist 106 and board 101 as illustrated in FIG. 13. In particular, the joist legs 241 and 242 can be resiliently deformed outward by sliding the engagement portions 246, and their respective surfaces 246S into engagement within and along the opposing walls 106W of the joist 106. Due to the rounded nature, the joist legs can be resiliently flexed or moved outward and can slide over those walls. Before the lower surface 226L of the spacer body engages the upper surface 106U of the joist 106, the grip element 230 can be inserted into the board groove 103 and engage the groove lower surface 109L. The joist legs 241, 242 can exert a compressive or clamping force F4 on the joist 106 to hold the grip element 230 at the elevation above the joist 106 shown in FIG. 13, with the element protruding into the groove 103.

In addition, as shown in FIG. 13, the stabilizer bar 251 can be disposed below the bottom surface 101B of the board 101. In particular, the upper surface 251U of the stabilizer bar 251 can engage the bottom surface 101B adjacent the corner 101C of the board. The end 251E of the stabilizer bar optionally projects a distance that is greater than the depth GD of the groove 103 inward from the side surface 101S of the board 101. This distance can be the distance D13 shown in FIG. 12. Thus, the distance D13 can be greater than groove depth GD, and optionally greater than the distance D14 by which the grip element 230 extends from the rear surface of the fastener unit.

The lower surface 230L of the grip element as mentioned above can be a distance D12 from the upper surface 251U of the stabilizer bar 251. This distance can be less than the distance D15 below the groove lower surface 109L, between the groove lower surface 109 and the bottom surface 101B of the board. Accordingly, the grip element 230, in cooperation with the stabilizer bar 251, can exert a force F15 on the board with the grip element 230 exerting the force F15 on the lower surface 109L of the groove, and the upper surface of the stabilizer bar exerting the force F15 on the bottom surface 101B of the board 101. This in turn exerts a slight clamping or pinching force on the board within that region. Accordingly, the stabilizer bar can assist in further holding and maintaining the vertical axis VA of the fastener unit and the longitudinal axis LA of the fastener 290 in a generally vertical, upright orientation. This vertical, upright orientation can refer to an orientation that optionally is perpendicular to the plane P10 of the board 101, in particular, its upper surface 101U, which optionally can lay in a horizontal plane. The upright vertical orientation can be perfectly vertical, or can be slightly offset from vertical by up to 5° or up to 10°, depending on the application.

With the stabilizer bar cooperating with the grip element 230, the fastener unit exerts both a force on the board 101 and another force on the joist 106, the latter, by virtue of the forces exerted by the legs 241 and 242 against opposing sides of the joist. Thus, the joist legs exert clamping force F4 on the joist, and the stabilizer bars exert another force F15 on the board, between the groove and the bottom surface of the board. Optionally, the force F15 is a vertical force, while the force F4 exerted by the joist legs is a substantially horizontal force. Of course, depending on the orientation of the joist in the board, the directions of the forces can change relative to horizontal and vertical planes.

The fastener unit 210 so installed can provide multiple points of contact between the fastener unit and the board, and thereby stabilize the fastener unit in a particular orientation, optionally holding the fastener associated with the unit in an upright, vertical orientation, ready for engagement by a tool. Optionally, the fastener unit 210 can engage the board 101, and the joist 106 to prevent forward and aft tilting T7, generally in a direction toward or away from the side surface 101S of the board. The fastener unit also can prevent teetering in directions T8 which are generally into and out of the plane of FIG. 13, such that the fastener and fastener unit do not slide along the side surface 101S of the board when in position. Thus, the fastener unit can provide multidirectional stability and support for the fastener 290, optionally holding it in an upright, vertical orientation as shown.

With the fastener unit oriented as shown in FIG. 13, a second board 102 can be moved in place adjacent the fastener unit 210. Due to the stabilization and forces exerted by the joist legs, the grip element and the stabilizer bars of the fastener unit 210, the fastener unit can remain in position, with the other end of the grip element 230 sliding into the groove 102G of board 102, and the fastener 290 staying in a generally upright and vertical orientation. With the grip element in position in the opposing gaps of the boards, and the appropriate gap set by the spacer body, the user can advance the fastener 290 into the underlying joist. In turn, this causes the grip element 230 and its corresponding cleats to bite into the respective grooves, thereby securing the board in a fixed location over the joist 106.

Figure 14:
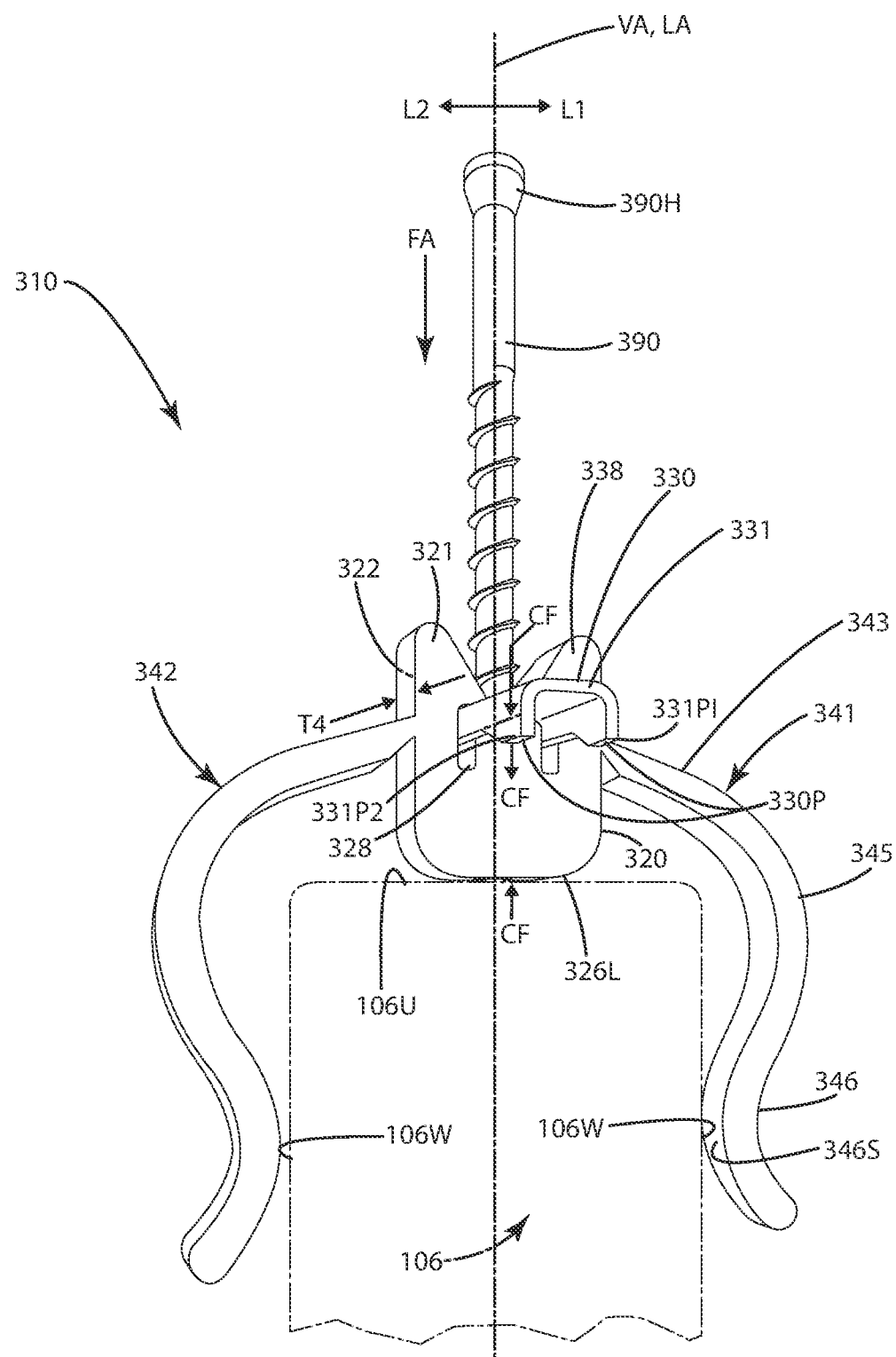
FIG. 14 is a perspective view of a third alternative embodiment of the fastener unit including a grip element with one or more pressure feet and a timing spacer block.
Figure 15:
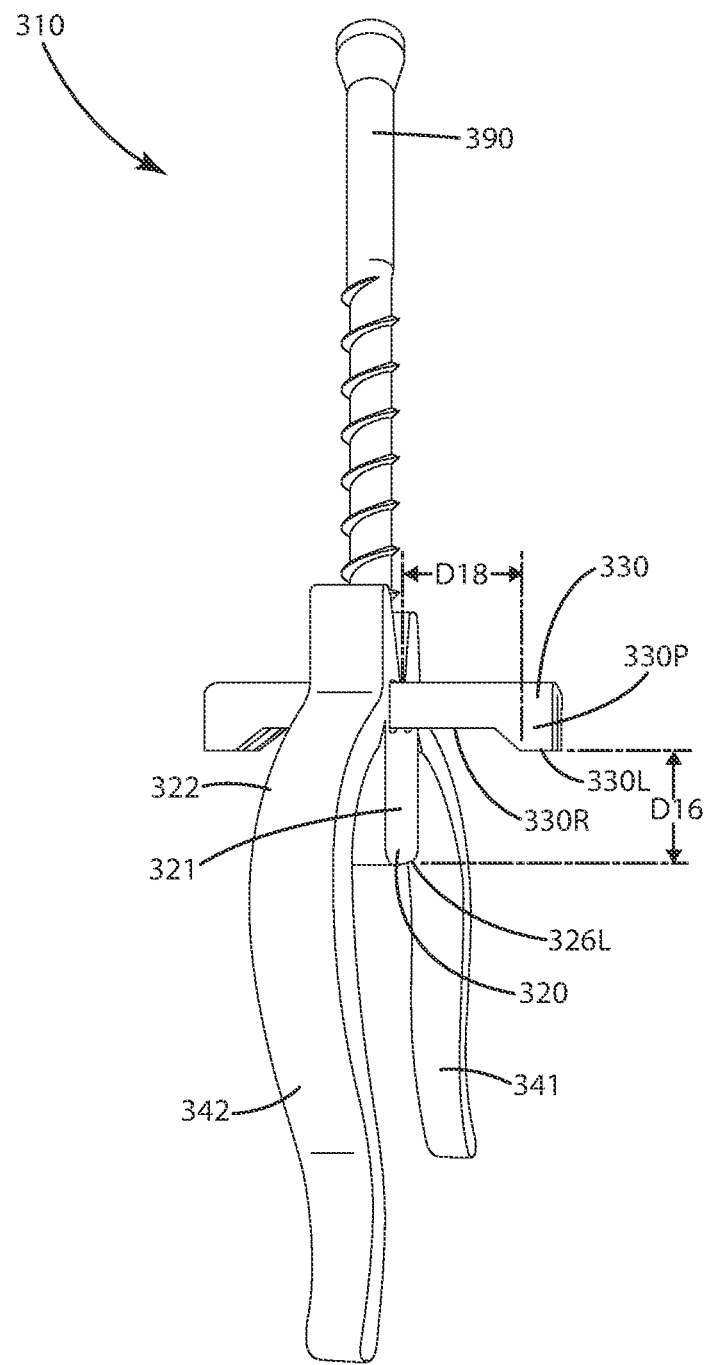
FIG. 15 is a perspective view of the third alternative embodiment of the fastener unit installed on an underlying joist and at least partially installed in a groove of a board.
Figure 16:
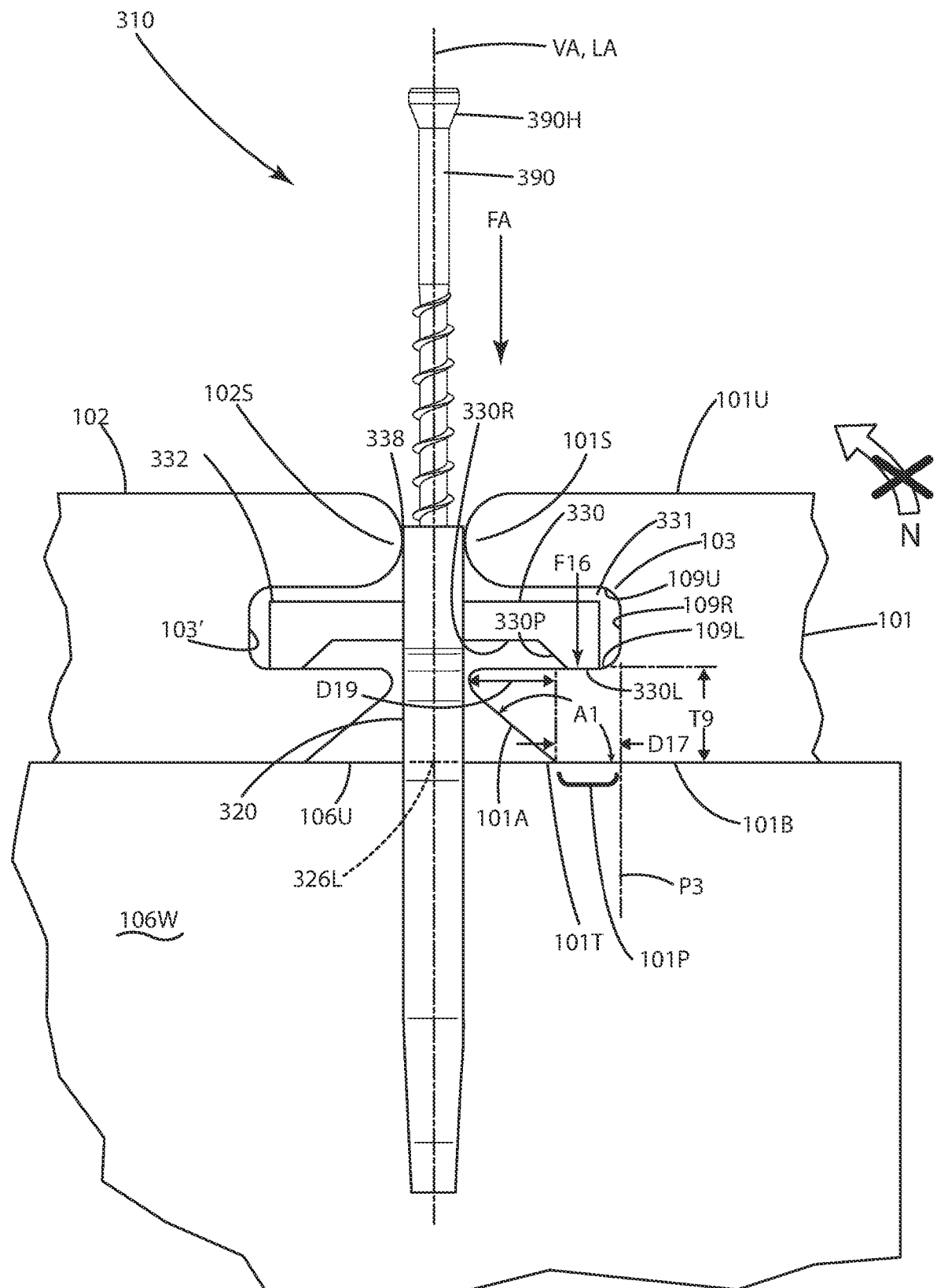
FIG. 16 is a side sectional view of the third alternative embodiment of the fastener unit installed within grooves of a boards and the fastener installed to apply force well within the grooves via the one or more pressure feet, and the timing spacer block bottomed out against the underlying joist.

A third alternative embodiment of the fastener unit is illustrated in FIGS. 14-16 and generally designated 310. The fastener unit of this embodiment is similar in structure, function and operation to the embodiments described above with several exceptions. For example, this unit 310 can include a fastener 390 similar to the fasteners 90,190 and 290 above. It also can include a grip element 330 that is disposed in a recess 328 defined by a spacer body 320. The grip element 330 optionally can extend from and beyond the forward 321 and rearward 322 surfaces of the spacer body 320. As above, the spacer body can be configured to establish a gap between adjacent boards, and sized with a thickness T4 similar to the thicknesses T1, T2 and T3 described in the embodiments above.

In this embodiment, the unit 310 includes first and second joist legs 341 and 342, also referred to as resilient compression legs in some cases, that extend downward and outward from the spacer body 320. These first and second joist legs are configured to straddle and clampingly engage a joist. The joist legs are similar in construction, so only the first joist leg 341 will be described here. The joist leg 341 includes an outwardly extending portion 343 that extends outward from a side of the spacer body 320. That outwardly extending portion 343 transitions to a rounded or curved portion 345 that extends downwardly, away from a bottom 326L of the spacer body 320. The curved portion 345 is generally concave, opening toward the vertical axis VA of the spacer body 320, which can be coincident and/or parallel to the longitudinal axis LA of the fastener 390. That curved portion 345 extends to a lower engagement portion 346. This lower engagement portion 346 can be convex relative to the vertical axis VA and can open away from that vertical axis VA. The engagement portion can include an inner engagement surface 346S configured to engage and slide over a portion of the outer walls 106W of the joist 106. This surface 346S can be curved and convex away from the vertical axis VA to facilitate slicing of this portion over the walls 106W. Of course, in other constructions, that surface 346S can be flat, planar, rough, ridged, triangular, or can have other geometric configurations depending on the configuration of the joist or the work piece against which the leg is to be engaged.

As shown in FIG. 14, the first joist leg 341 can extend from a first lateral side L1 of the spacer block 320 on a first side of the vertical axis VA, and the second joist leg 342 can extend from a second lateral side L2 of the spacer block 320. The spacer block 320 itself can be formed as a timing spacer block such that the lower surface 326L of the spacer block of this embodiment engages the upper surface 106U of the joist as the fastener 390 is tightened to install the fastener unit 310. This lower surface 326L can be disposed below the lower surface 330L of the grip element, optionally at least ¼ inch below, further optionally at least M inch below that surface. Optionally, the lower surface 326L can engage the upper surface 106U of the joist 106 when the grip element 330 engages the groove 103, for example the lower wall 109L of the groove 103 upon the application of a force F16 as described below.

With reference to FIGS. 15-16, the timing spacer block 320 can be configured so that it has a relationship relative to a thickness T9 between the lower surface 109L of the groove and the bottom surface 101B of the board 101, or other boards, such as board 102 on the opposite side of the fastener unit 310. This thickness T9 can be optionally ¼ inch, further optionally ½ inch, or other dimensions depending on the particular board. The fastener unit 310 can be configured so that the bottom 326L of the timing spacer body is spaced a distance D16 from the lowermost surface 330 L of the grip element 330, whether or not that grip element has one or more pressure feet 330P. This distance D16 can be equal to or less than the thickness T9 mentioned above. In some applications, the distance D16 relative to the thickness T9 can be expressed in a ratio, for example optionally 1:1, further optionally 0.99:1, yet further optionally less than 1:1, even further optionally between 0.9:1 and 1:1, inclusive.

These ratios and the general relationship between the thickness T9 and D16 can be established so that the spacer block 320 (and in particular its lower surface 326L) is 'timed' to engage the upper surface 106U of the joist 106 when the predetermined force F16 is applied by a pressure foot 330 against the board 101, and in general against the lower surface 109L of the groove 103. Optionally, the lower surface 326L of the timing spacer block 320 can engage the upper surface 106U of the joist 106 after or at the same time as the pressure foot 330P engages the lower surface 106L of the groove. This can enable the fastener unit 310 to apply a predetermined force F16 through the pressure foot 330P and the grip element 330 in general. When the spacer body, however, bottoms out against the upper surface of the joist, the amount of additional force added to the predetermined force F16 can be limited and/or cut off completely because the spacer body prevents the fastener from being tightened further, and thus prevents the fastener from advancing farther, which otherwise would increase or otherwise add to the predetermined force F16 applied to the board via the feet in the groove. In this manner, the timing spacer block 320 can be constructed to assist in limiting or otherwise controlling the predetermined force F16 that is applied to the boards 101 and 102 when and as the fastener unit 310 is secured in place. In some cases, where the board is weak, thin or undercut below the groove, this can prevent the grip element from damaging or breaking the part of the board adjacent or under the groove. Also, it will be appreciated that although only a force F16 is illustrated in the groove 103 of board 101, another force, substantially equal to force F16 is being applied in the groove 103' of the other board 102 via the feet at the other end 332 of the grip element 330.

Optionally, the portion of the board 101 between the lower surface 109L of the groove and the bottom 101B of the board can be pinched or clamped between the bottom surface 330L of the gripping element 330 and the upper surface 106U of the joist with the predetermined force F16 as the fastener unit 310 is tightened, that is when the fastener 390 is advanced into the joist 106 and the head 390H of the fastener 390 engages the gripping element 330 to pull the gripping element downward, upon the application of the predetermined force F16 through the gripping element 330. Again, this predetermined force F16 can be limited by way of the lower surface 326L of the timing spacer block 320 engaging the upper surface 106U of the joist 106 to prevent and/or impair the fastener 390 from further advancing into the joist 106, which would thus pull the gripping element 330 farther toward the joist and produce more clamping force F16.

Further optionally, it will be appreciated that when the timing spacer block 320 engages the upper surface 106U of the joist 106, and the fastener 390 is further advanced in direction FA toward and into the joist 106, the spacer block 320 itself is placed under a compressive force CF between the upper surface of the joist and the gripping element 330, when the gripping element is engaged by the head 390H of the fastener 390. This compressive force CF can be greater than, equal to or less than the force F16. In many cases, the compressive force can be greater than the force F16.

In the embodiment illustrated in FIGS. 14-16, the fastener unit 310 also can be outfitted with a gripping element 330 that is similar to the gripping elements 30, 130 and 230, with several exceptions. For example, this gripping element 330 can be constructed for use with a particular type of board 101, 102. As one example, this board can be a TIMBERTECH or other composite deck board commercially available from AZEK Building Products of Skokie, Illinois. Such a board 101 can be constructed to include a groove 103 that is defined inward from side surface 101S. In such a board, this groove also can be duplicated and defined on both opposing sides of the same board 101 (although the second opposing groove is not shown). The groove 103 can transition inward from the side surface 101S. The groove can include an upper surface 109U that transitions to a rear wall 109R which further transitions to a lower wall 109L. The upper and lower walls of the groove are opposite one another and can be generally planar. The lower wall 109L can transition out to the side surface 101S.

In some constructions, below the lower wall 109L, the side surface 101S can transition to a slanted wall 101A. This slanted wall 101A differs from the portion of the side surface 101S above the upper wall 109U of the groove 103, in that the slanted wall 101A angles back toward the plane P3 within which the rear wall 109R can at least partially lay. The slanted wall 101A can transition to the bottom surface 101B of the board 101 a preselected distance D17 from the plane P3. The slanted wall 101A can be disposed at an angle A1 relative to the bottom wall 101B. This angle A1 can be an obtuse angle, optionally greater than 90°. This slanted wall 101A can be rounded or slightly curvilinear, rather than linear as illustrated. The slanted wall 101A can transition to the bottom wall 101B at a transition region 101T, which can form part of the angle A1. This transition region 101T can be disposed the distance D17, closer to the side surface 101S than the rear wall 109R of the groove 103. The region 101P between the transition region 101T and the plane P3 within which the rear wall 109R of the groove lays can be configured to transfer the force F16 applied by the grip element 330 in particular the predetermined force F16 when this force is applied through the pressure foot 330P as described below. Optionally, the slanted wall 101A can be disposed between the side surface 101S and the transition 101T. The slanted wall can extend a distance D19 from the side surface 101S horizontally away from that surface. This distance D19 can be less than the depth of the groove, that is the distance from the side surface 101S to the rear wall 109R of the groove 103.

The grip element 330 can be similar to the grip elements 30, 130 and 230 described above, with several exceptions. For example, the grip element 330 optionally can be in the form of a C- or U-shaped channel, with the channel opening downward relative to the vertical axis VA or longitudinal axis LA. The grip element can be disposed in a recess defined by the spacer body 71 similar to force noted above. The grip element can be constructed to include downwardly extending cleats, which optionally can be portions of the channel or an elongated metal or composite bar. The grip element can include one or more feet or teeth, formed as part of the channel, the cleats or as additional protrusions extending from the grip element. As an example, the grip element 330 can include one or more pressure feet 330P. These pressure feet 330P can be disposed at the first 331 and second 332 ends of the grip element. These pressure feet can each form at least a portion of the lower surface 330L of the grip element 330. The pressure feet also can come in pairs, for example a pair of pressure feet 331P1 and 331P2 can be disposed at the first end 331. The second end 332 can include a similar pair of pressure feet.

The pressure feet can include the lower surface 330L of the grip element, with each of the pair of the pressure feet forming a portion of that lower surface 330L. The pressure feet can extend all the way to the very end 331 of the grip element. Although shown as flat of the lower surface 326L, the feet can be pointed or rounded at that lower surface. The individual ones of the pairs of pressure feet also can form opposing sides of the U-channel that extend downward from the grip element. In this manner, each end can include two opposing pressure feet. Optionally, the pairs can distribute the predetermined force F16 evenly and spread out between those two pressure feet. Optionally, where the grip element is not C or U-shaped, and is in the form of a bar (not shown), there can be single pressure feet located at the opposing ends. These pressure feet can also include larger lower surfaces of a particular geometric shape to provide more surface contact with the interior of the groove.

The pressure feet of grip element can be spaced a particular distance from the respective front 321 and rear 322 surfaces of the fastener unit 310. For example, as shown in FIG. 15, the pressure feet 330P of one end 331 of the grip element 330 can be disposed a distance D18 from the front surface 321 of the spacer block 320. Of course, the pressure feet at the second opposing end 332 can be disposed a similar distance from the rear surface 322 of the spacer block. This distance D18 can be greater than the distance D19 mentioned above with regard to the slanted wall 101A. Within this distance D18 away from the spacer block 20, the grip element can be recessed upward from the lower surface 330L. For example, as shown in FIGS. 15 and 16, the pressure feet 330P can transition upward to a recessed surface 330R of the grip element. This recessed surface 330R can be disposed at a level above the lower surface 330L of the grip element 330 such that the recessed surface 330R generally does not substantially contact the lower surface 109L of the groove 103 when the fastener unit 310 is installed relative to the grooves and the boards. In this manner, substantially only the lower surface 330L of the grip element associated with the pressure feet 330P engage that lower surface 109L of the groove.

The pressure feet 330P, when spaced the distance D18 on the spacer block 320, can be configured to enable the predetermined force F16 to be distributed downward into the preselected pressure region 101P. Substantially all of the force F16 can be distributed to this region 101P. Optionally, little to no portion of the force F16 is distributed by the pressure feet 330P to the slanted wall 101A and/or the transition region 101T. Accordingly, with the force F16 distributed this far from the spacer block 320 and in general the side surface 101S, which can engage the spacer block directly, the force F16 is not distributed in a manner so as to urge the board 101 to rotate in direction N. Thus, the board 101 is prevented from tipping or angling when the fastener unit 310 is advanced to pull the board downward against the joist 106.

Optionally, the pressure feet 330P can be disposed the distance D18 from the spacer body 320 to ensure that the predetermined force F16 administered through the pressure feet 330P is not administered directly vertically over the slanted wall 101A, but rather in pressure region 101P that is farther away from the side surface 101S than the slanted wall 101A. Where the region 101P forms a portion of the bottom surface 101B of the board 101, the pressure feet and the grip element thus can exert the predetermined force F16 downward, directly to the bottom surface 101B which is in contact and generally parallel to the upper surface 106U of the joist 106. The flat generally planar bottom surface 101B of the board 101 can engage the flat generally planar upper surface 106U of the joist and the two can be pressed together under the predetermined force F16. And as mentioned above, this predetermined force F16 can be limited by the spacer body 320 engaging the joist.

A method of installing the fastener unit 310 will now be described in connection with FIGS. 14 and 16. The fastener unit 310 can be disposed adjacent a joist 106 as illustrated in FIG. 14. In particular, the joist legs 341 and 342 can be resiliently deformed outward by sliding the engagement portions 346, and their respective surfaces 346S into engagement within the and along the opposing walls 106W of the joist 106. Due to the rounded nature, the joist legs can be resiliently flexed or moved outward and can slide over those walls. The lower surface 326L of the spacer body 320 can be move toward and optionally can engage the upper surface 106U of the joist 106. The joist legs 341, 342 can exert a compressive or clamping force on the joist 106 to hold the grip element 330 at the elevation above the joist 106 shown in FIG. 16, with the element protruding into the groove 103.

The grip element 330 can be inserted into the board groove 103, for example, into the respective grooves 103 of both of the opposing boards 101 and 102. These boards can be pushed toward one another so that the spacer body 320 and an upper portion 338, above the gripping element, can be contacted by and engaged by the respective side surfaces 101S, 102S of the opposing boards 101 and 102. The grip element can be positioned in the respective groups of the boards 101 and 102 such that the lower surface 330L of the respective pressure feet 330P engage the groove lower surface 109L. When the boards are pushed together, the pressure feet 330P are disposed at the distance D18 from the spacer body 320. Accordingly, the pressure feet are disposed over the pressure region 101P that corresponds to the bottom, generally planar surface 101B of the board. The pressure feet also can be positioned at a location within the distance D17 between the rear wall 109R and the transition 101T. Optionally, the pressure feet are not disposed directly vertically above the slanted wall 101A. Further optionally, the pressure feet 330P can be disposed farther into the groove, closer to the rear wall 109R than to the side surface 101S of the board. As a further example, the pressure feet can be disposed at or greater than the distance D19 away from the side surface of the board. The pressure feet that the opposing end 332 can be disposed in the groove 103' and oriented relative to its surfaces in a similar manner.

The lower surface 330L of the grip element, and in particular the pressure feet, as mentioned above can be a distance D18 from the spacer body. This distance can place the pressure feet 330P directly over the pressure region 101P. When the fastener unit is installed relative to the boards 101 and 102 as shown in FIG. 16, the fastener 390 can be advanced in direction FA, through the spacer body and the grip element, advancing into the underlying joist 106. Upon this advancement, the head 390H of fastener 390 eventually engages the upper surface of the grip element 330. The fastener continues to be advanced into the joist 106. If the lower surface 326L was not in direct engagement with the upper surface 106U of the joist 106, it can begin to be so engaged as the fastener is advanced. As the advancement of the fastener 390 continues, the head 390H pulls the grip element 330 downward. This engages the pressure feet 330P and the lower surface 330L of the grip element 330 against the lower surfaces 109L of the grooves 103. This exerts the force F16 directly downward onto to the pressure region 101P along the bottom surface 101B of the board. Due to the recessed surface 330R not engaging the remainder of that lower surface, closer to the side surface, the force F16 is not distributed toward or through the slanted wall 101A Accordingly, the board 101 does not tip in direction N due to the force F16 creating a moment about the transition region 101T.

As the fastener continues to advance, the timing spacer body 320 is placed under a compressive force CF between the head 390H of the fastener and the portion of the fastener pulling the head into the joist 106. When this occurs, the timing spacer body generally bottoms out the fastener and in general the fastener unit 310 so the fastener will not advance farther. As a result, timing spacer body limits the amount of additional force added to the predetermined force F16 to push the boards 101 and 102 into further contact with the joist 106. This in turn, can prevent the groove from being damaged or otherwise deforming the board 101 near the groove.

Another alternative embodiment of the fastener unit is illustrated in FIGS. 17-28 and generally designated 1010. The fastener unit of this embodiment is similar in structure, function and operation to the embodiments described above with several exceptions. For example, this unit 1010 can include a fastener 1090 similar to the fasteners described above. It also can include a grip element 1030 that is disposed in an aperture or recess 1028 defined by a spacer block 1020, similar to the embodiments described above. The grip element 1030 optionally can extend from and beyond the front and rear surfaces 1021, 1022 of the spacer block 1020. The spacer block 1020 can be configured to establish a gap between adjacent boards, and sized with a thickness T11, which can correspond to a preselected gap G10 (FIG. 28) that is to be established between adjacently placed first board 101 and second board 102, similar to the thicknesses T1-T10 above. The unit 1010 can include first and second resilient compression elements 1041,1042 joined with the spacer block 1020. It is noted that the grip element 1030 and fastener 1090 of the fastener unit 1010 are not shown in FIGS. 57-61 to more clearly show details of the spacer block 1020 and compression elements 1041, 1042.

Generally, the resilient compression elements 1041, 1042 can be disposed on opposite sides of the vertical axis VA of the spacer block 1020. The compression elements 1041, 1042 can be similar in structure, and therefore only the first compression element 1041 will be described in detail here. It also will be appreciated that one of the resilient compression elements 1041,1042 can be eliminated from the design in certain applications.

The first resilient compression element 1041 can include a fixed wing 1041F and a moveable wing 1041M. These wings can be joined at a transition region or junction 1041J. In a typical installation, an example of which is shown in FIG. 67, the fixed wing 1041F defines an upper wing and the moveable wing 1041M defines a lower wing. Thus, the moveable wing 1041M can depend or extend downwardly from the fixed wing 1041F.

The moveable wing 1041M can be movable, bendable, and flexible about the transition region or junction 1041J where it is joined with the fixed wing 1041F. All or a part of the moveable wing 1041M can bend, flex, deform, hinge or otherwise translate (all interchangeably referred to as 'bend' herein) about or relative to this junction 1041J. In other cases, the moveable wing 1041M can bend to different degrees along its length so that it becomes more arched or angled as it bends. The fixed wing 1041F can be substantially non-movable, non-bendable, and non-flexible relative to the spacer body 1020 and the moveable wing 1041M. Thus, in this embodiment, vertical compression or expansion of the resilient compression element 1041 can be solely, or substantially solely, accomplished by movement of the moveable wing 1041M relative to the fixed wing 1041F. In being 'substantially' non-movable, non-bendable, and non-flexible, the fixed wing 1041F may move by small degrees during installation of the fastener unit 1010, but by a far smaller degree than the moveable wing 1041M.

The moveable wing 1041M is disposed at an angle to the fixed wing 1041F. The wings as illustrated are generally in the form of flat plates angled relative to another and joined at a vertex 1041V at the junction 1041J, which can define said angle. Optionally, in some applications, the wings can be joined in the shape of 'V', that extend outwardly from the junction 1041J. Of course, in other applications these wings can be curved, rounded, or of other shapes. The fixed wing 1041F can transition to the movement wing 1041M at the junction 1041J, with the moveable wing 1041M formed as an extension of the same flat element or plate as the fixed wing 1041F.

The wings can include respective first ends 1061F, 1062F and second ends 1061S, 10628. The first ends 1061F, 1062F are joined together at the junction 1041J. The second ends 1061S, 1062S of the wings are free ends and are not connected to one another. The second ends 1061S, 1062S of the wings are configured to fit within the groove 103 of the first board 101. The first ends and junction 1041J are configured to fit within the groove 104 of the second board 102. The second end 1062S of the moveable wing 1041M comprises a terminal edge 1041E of the moveable wing 1041M. The moveable wing 1041M also can be configured such that the moveable wing projects out into space from the junction 1041J and terminates at a free second end comprising the terminal edge 1041E in which case the moveable wing 1041M is cantilevered.

Figure 20:
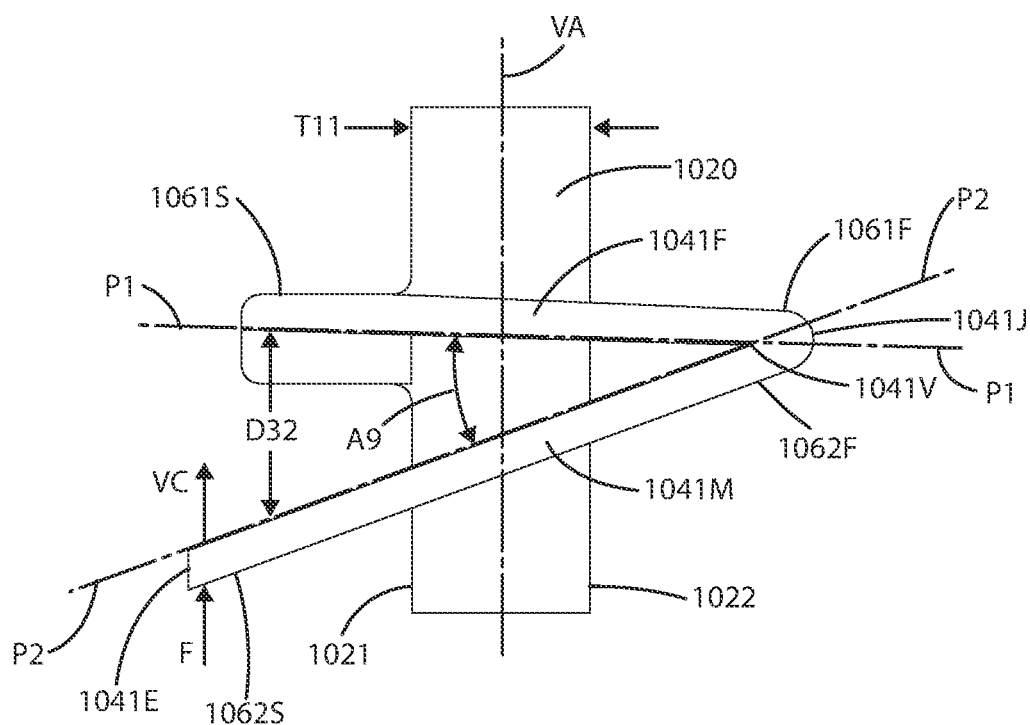
FIG. 20 is a side view of the fastener unit in an open mode.
Figure 21:
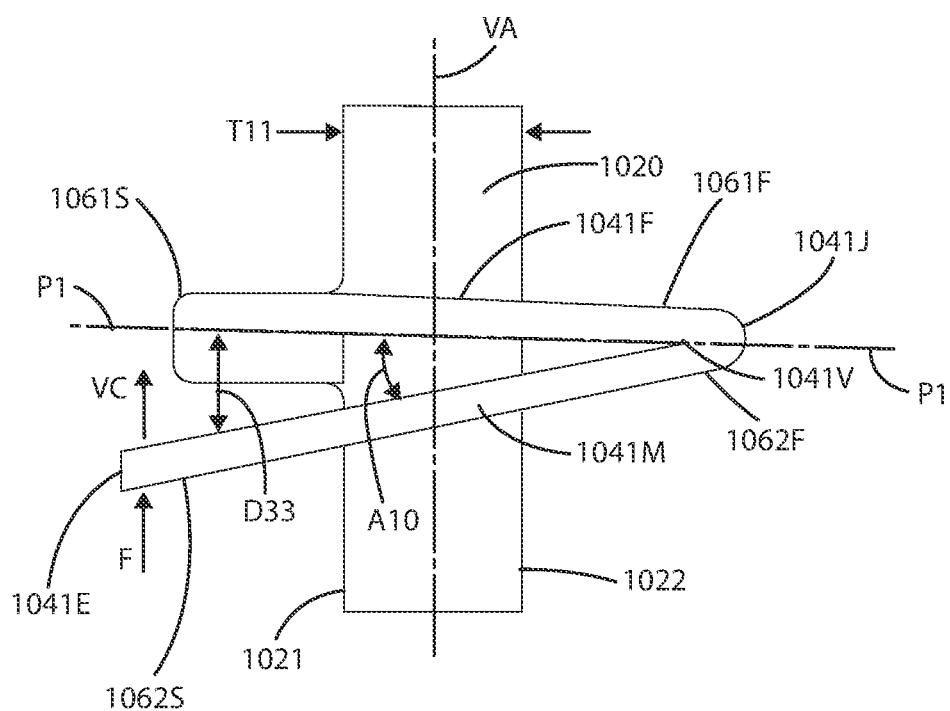
FIG. 21 is a side view of the fastener unit in a compression mode.

The moveable wing 1041M can be designed to be vertically compressed in direction VC as shown in FIGS. 20-21. By vertically compressible, it is meant that the wing 1041M can be moved in direction of the arrow VC, generally toward a plane P1 that is orthogonal to or otherwise transverse to the vertical axis VA of the spacer block 1020, from an open mode shown in FIG. 20 to a compression mode shown in FIG. 21. Due to its resilient nature, however, the wing 1041M resiliently deforms and is urged to expand and re-attain its previous configuration, relative to the fixed wing 1041F, in the open mode. The moveable wing 1041M can be constructed so as to form a biasing leg or spring. After application of force F to compress the moveable wing 1041M toward the fixed wing 1041F and/or generally toward the plane P1, due to the resilient nature of the moveable wing 1041M, the moveable wing 1041M is spring back open.

The fixed wing 1041F can be parallel to or lie in the first plane P1 that is orthogonal to the vertical axis VA, and can substantially remain in the first plane P1 in the open mode and in the compression mode. In the open mode, the moveable wing 1041M lies within a second plane P2 which is oblique to the vertical axis VA and oblique to the first plane P1, i.e. neither perpendicular nor parallel to the vertical axis VA and the first plane P1. Optionally, the first and second planes P1, P2 can intersect at the junction 1041J, such as at the vertex 1041V of the junction 1041J. Optionally, the first plane P1 can pass through the grip element recess 1028 and/or the portions of the grip element 1030.

Figure 22:
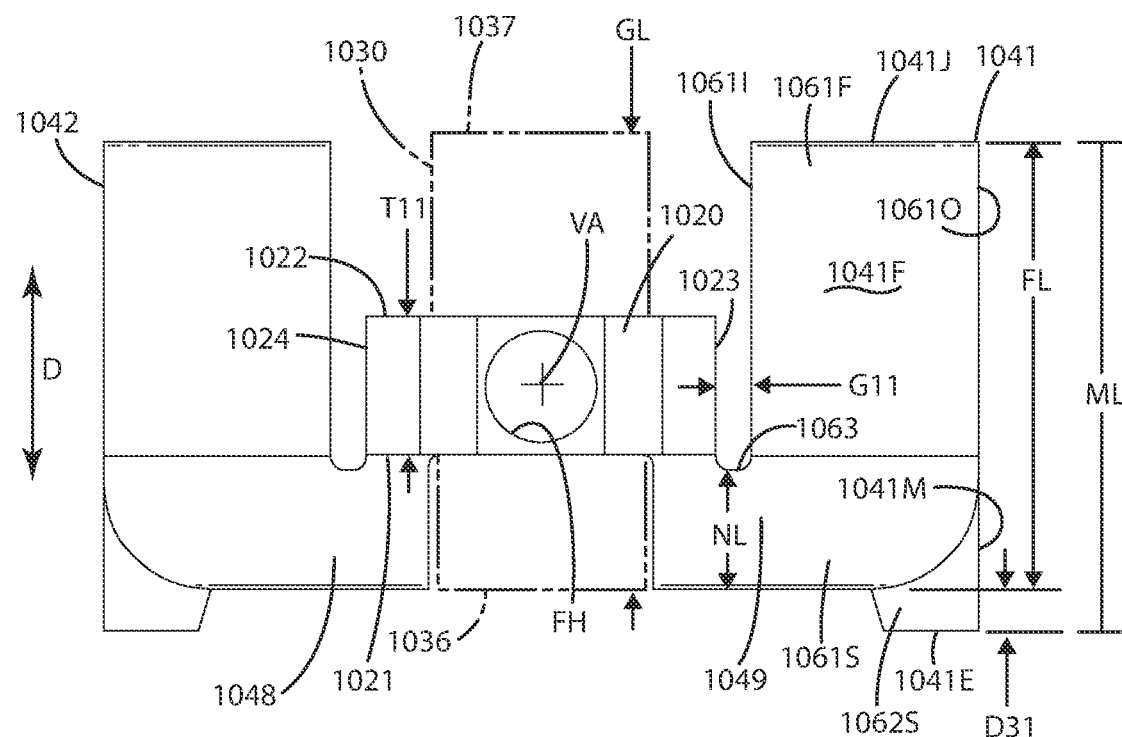
FIG. 22 is a top view of the fastener unit.
Figure 23:
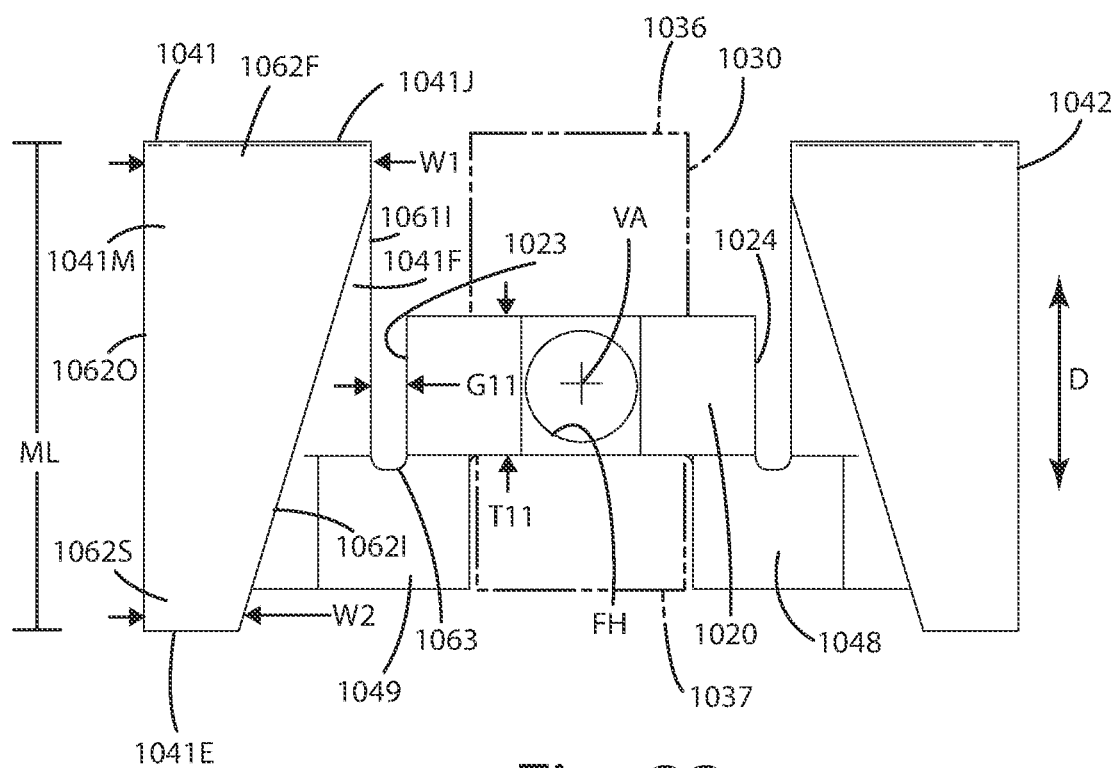
FIG. 23 is a bottom view of the fastener unit.

Referring to FIGS. 22-23, optionally, the first and second ends 1061F, 1061S of the fixed wing 1041F are separated by a fixed wing length FL and the first and second ends 1062f, 1062S of the moveable wing 1041M are separated by a moveable wing length ML. These wing lengths FL, ML can be greater than the thickness T11 of the spacer block 1020. Thus, the wings can extend beyond the front and rear surfaces 1021, 1022, respectively, of the spacer block 1020. With the first and second ends 1061F, 1062F, 1061S, 1062S of the wings extending beyond the spacer block 1020, at least a portion of the wings can fit within the grooves 103, 104 of the first and second boards 101, 102, thereby securing the spacer block 1020 and establishing a gap between adjacent boards as described below.

The moveable wing length ML can be greater than the fixed wing length FL. Thus, with the first end 1062F of the moveable wing 1041M joined with the first end 1061F of the fixed wing 1041F at the junction 1041J, the second end 1062S of the moveable wing 1041M can extend beyond the fixed wing 1041F a distance D31 as shown in FIG. 21. As illustrated, the terminal edge 1041E of the moveable wing extends forwardly of the second end 1061S of the fixed wing. In some cases, the terminal edge 1041E is parallel to the front surface 1021 of the spacer block 1020 and/or parallel to a forward edge of the second end 1061S of the fixed wing.

The junction 1041J can be spaced from the spacer block 1020, such that the moveable wing 1041M is resiliently compressible independent from the spacer block 1020. In the embodiment shown, the fixed wing 1041F is joined with the spacer block 1020 by a neck portion 1063. The neck portion 1063 can be a narrow connector between the fixed wing 1041F and the spacer block 1020. The neck portion 1063 can have a neck length NL, which can be less than the fixed wing length FL. The neck length NL can be less than the thickness T11 of the spacer block 1020.

The neck portion 1063 can extend outwardly from the first side surface 1023 of the spacer block 1020, and the compression element 1041 can extend outwardly from the neck portion 1063, thereby being spaced from the spacer block 1020 by the neck portion 1063. The fixed wing 1041F can have an inner side surface 10611 facing the spacer block 1020 and an outer side surface 10610 opposite the inner side surface. At least a portion of the inner side surface 10611 of the fixed wing 1041F can be joined with the spacer block 1020 by the neck portion 1063. Another portion of the inner side surface 10611 is spaced from the spacer block 1020 by a gap G11.

Optionally, each of the resilient compression elements 1041 and 1042 can be joined with the spacer block 1020 at fracturable joints 1048, 1049 similar to those described above. In this manner, at least one of the compression elements 1041 and 1042 can be manually broken off from the spacer block 1020 to accommodate double joists or other confined spaces. In some cases. The fracturable joints 1048, 1049 of the embodiment illustrated are formed at the neck portion 1063.

The junction 1041J extends rearwardly beyond the rear surface 1022 of the spacer block 1020 to guide placement of the second board 102 adjacent the first board 101. Optionally, the junction 1041J can be parallel to the rear surface 1022 of the spacer block 1020. The junction 1041J is configured to fit within a groove of another board placed adjacent a first board, with the spacer block 1020 defining a gap between the boards. The junction 1041J can therefore can be more narrow than the groove. With the sloped angle of the moveable wing 1041M and the narrow junction 1041J, a board can be slid against the spacer block 1020 in at varying angles and still catch the junction 1041J within its groove.

As best seen in FIG. 23, the moveable wing 1041M can be tapered toward the second end 1062S, with the first end 1062F of the moveable wing defining a first width W1 and the second end 1062S of the moveable wing defining a second width W2. The widths can optionally be defined between first and second side edges 10621, 10620 of the moveable wing 1041M. The second width W2 can be less than the first width W1. With this tapered construction, the moveable wing 1041M can bend more easily. In some cases, at least one portion of at least one of the sides 10621, 10620 of the moveable wing 1041M can be disposed inwardly of a corresponding side 10611, 10610 of the fixed wing 1041F to define the taper of the moveable wing 1041M. In the embodiment shown, the first or outer side 10620 of the moveable wing is coplanar with the first or outer side 10610 of the fixed wing, and the second or inner side 10621 of the moveable wing is oblique to the first or inner side 10611 of the fixed wing so that the moveable wing is tapered. In another embodiment, both sides of the moveable wing can be oblique to the sides of the fixed wing.

As with previous embodiments, the grip element 1030 can include a first end 1036 and a second end 1037 extending in a first direction D to define a grip element length GL. The grip element length GL can be the same as, or substantially the same as, the fixed wing length FL. The direction D can be orthogonal to or otherwise transverse to the vertical axis VA of the spacer block 1020. The first end 1036 of the grip element 1030 projects forward of the front surface 1021 of the spacer block 1020 and the second end 1037 of the grip element 1030 projects rearward of the rear surface 1022 of the spacer block 1020. The wings 1041F, 1041M can extend in the same first direction D as the grip element 1030. With the grip elements and wings extending the same direction, the first ends of grip element and wings can be inserted in a common groove 103 of the first board 101, and likewise the second ends of the grip element and wings can be be inserted in a common groove 104 of the second board 102.

The grip element 1030 can be constructed from a first material, such as a metal and/or composite, while the spacer block 1020 and resilient compression elements 1041, 1042 can be constructed from a polymeric material, optionally with the compression elements 1041, 1042 integral with the spacer block 1020, and optionally with the neck portion 1063 integrally formed with and connecting the spacer block 1020 and the compression elements 1041, 1042.

Figure 26:
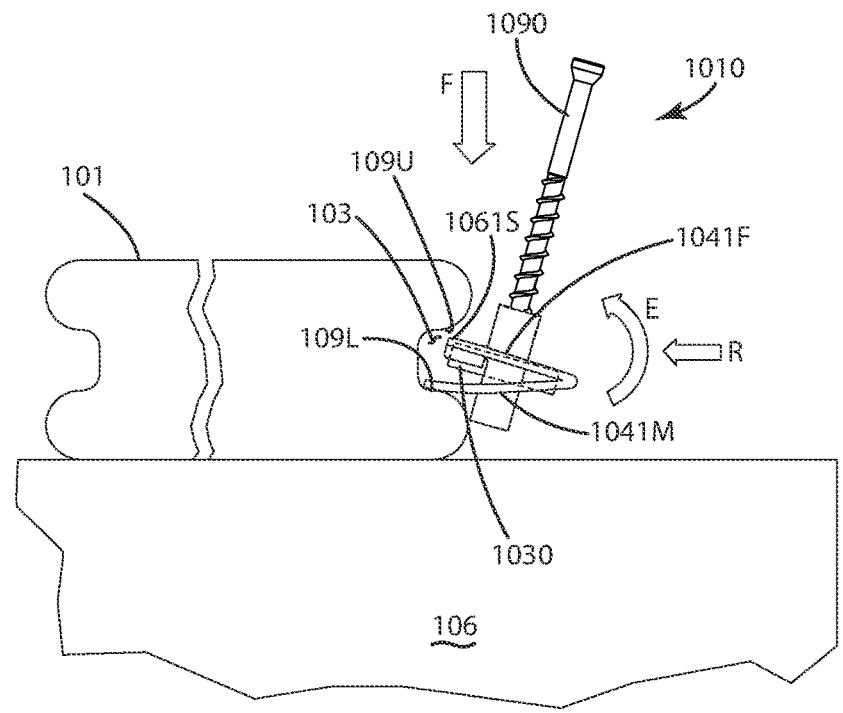
FIG. 26 is a side sectional view of the fastener unit in the compressed mode as the fixed is being inserted into the groove of the first board.

The compression elements 1041, 1042 are operable in an open mode, as shown in FIGS. 20 and 22, and a compression mode as shown in FIGS. 21 and 26. In the open mode, the fastener unit 1010 is not yet installed relative to the groove 103 of board 101. In that configuration, the terminal edge 1041E of the moveable wing 1041M is spaced from the fixed wing 1041F by a first vertical distance D32. This distance D32 in the open mode can be greater than the height GH of the groove 103. Because of the vertically compressible nature of the moveable wing 1041M, this wing can be moved in direction VC generally toward the fixed wing 1041F or first plane P1. Application of force F to vertically compress the moveable wing 1041M toward the fixed wing 1041F in direction VC toward the plane P1 converts the wings from the open mode to the compression mode, and the distance between the terminal edge 1041E and the fixed wing 1041F decreases to a second vertical distance D33. This distance D33 can be less than the groove height GH. In converting to the compression mode, the resilient wing 1041M bends, flexes or otherwise move toward the fixed wing 1041F so that the distance between them is reduced from the distance D32 to the distance D33. This reduction in distance can be approximately 5%, 10%, 15%, 25%, 30%, 35%, 40%, 50% or more, depending on the application and amount of vertical compression.

With the resilient compression elements 1041, 1042 in the compression mode, a user can install those elements into a groove of a board. Because the distance D33 is less than the groove height GH, the wings will now fit within the groove. When the user releases or reduces the force F applied in the compression mode to the respective portions of the resilient compression element, the moveable wing 1041M is urged back toward the configuration of the open mode, with the wings exerting forces on the against the upper and lower surfaces of the groove.

Optionally, the second vertical distance D33 in the compression mode can vary, depending on the application of force F and amount of vertical compression. With this variable distance, the resilient compression elements 1041, 1042 can fit within differently-sized grooves, i.e. grooves having different groove heights GH. Typical grooves may have a groove height GH of ⅛ inch to ⅜ inch, or another dimension depending on the application. In some cases, the moveable wing 1041M can be compressed to less than ⅛ inch to fit within a groove having a groove height GH of ⅛ inch, or compressed to less than ⅜ inch to fit within a groove having a groove height GH of ⅜ inch, or to another dimension less than the groove height GH of a particular groove. Thus, the second vertical distance D33 may be within a range of less than ⅛ inch to less than ⅜ inch. The first vertical distance D31 in the open mode can be greater than ⅜ inch.

The moveable wing 1041M is angled relative to the fixed wing 1041F when the compression element 1041 is in the open mode, i.e. not compressed or engaged with a board. This angle may be defined by the junction 1041J. This angle can be an acute angle, i.e. less than 90°. The angle defined by the junction 1041J can change as the moveable wing 1041M is vertically compressed toward the fixed wing 1041F. As shown in FIG. 20, in the open mode, the junction 1041J can define a first acute angle A9 between the fixed wing 1041F and the moveable wing 1041M, as measured at the vertex 1041V of the junction 1041J on the inwardly facing surfaces of the wings. The angle A9 can be optionally about 10° to about 60°, inclusive, about 15° to about 50°, inclusive, about 20° to about 45°, inclusive, or about 20° to about 35°, inclusive, or other angles, depending on the application. When the fastener unit 1010 is installed relative to a board and its groove, the moveable wing 1041M can move in direction VC shown in FIG. 21 so the angle between the wings decreases to a second acute angle A10, which can be less than the first angle A9. This second angle A10 can be optionally less than 90%, less than 80%, less than 75%, less than 50%, less than 25% of the first angle A9 when the compression element 1041 is in the open mode.

Figure 17:
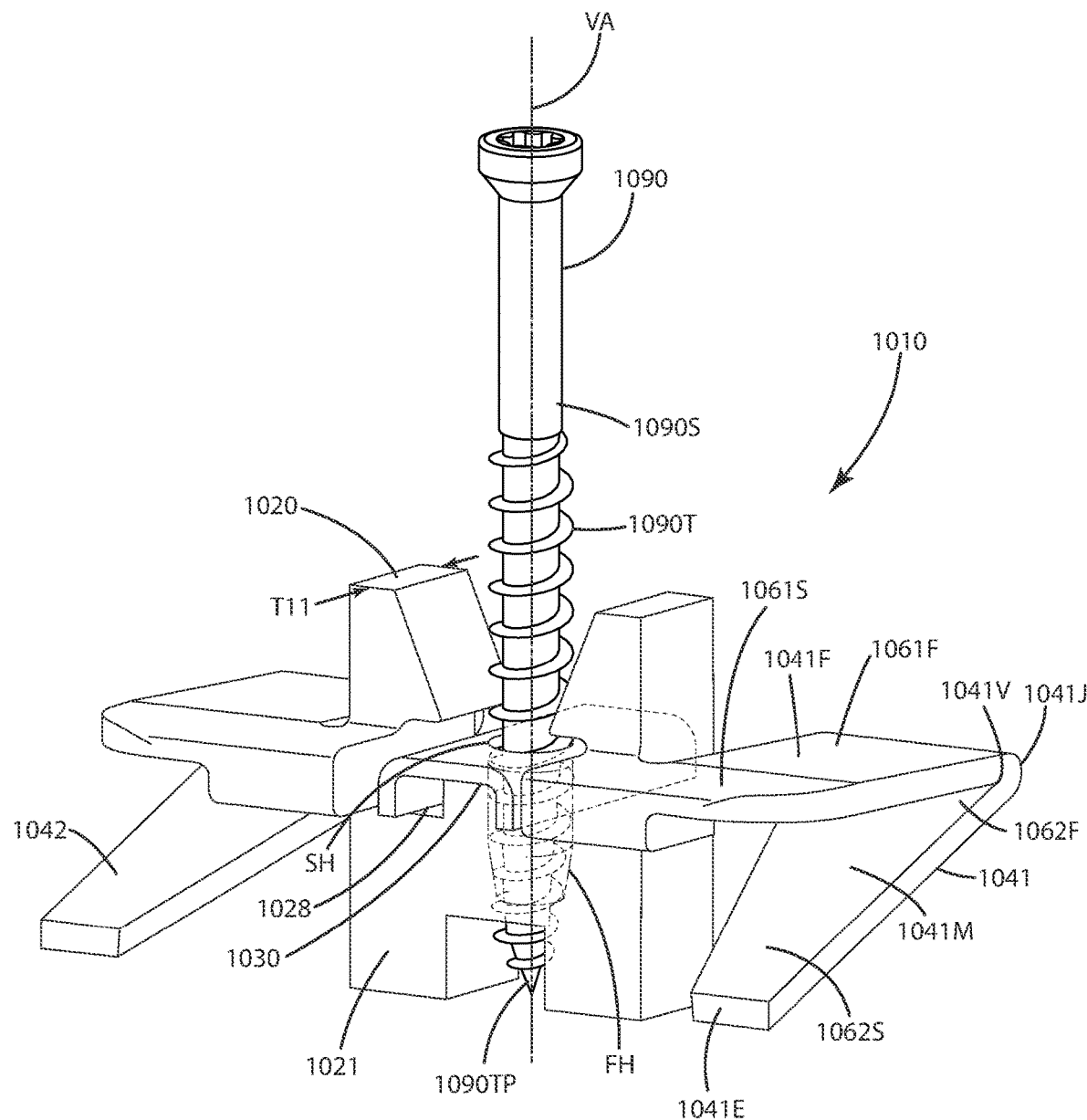
FIG. 17 is a perspective view of another alternative embodiment of the fastener unit including a fastener associated with the unit.
Figure 18:
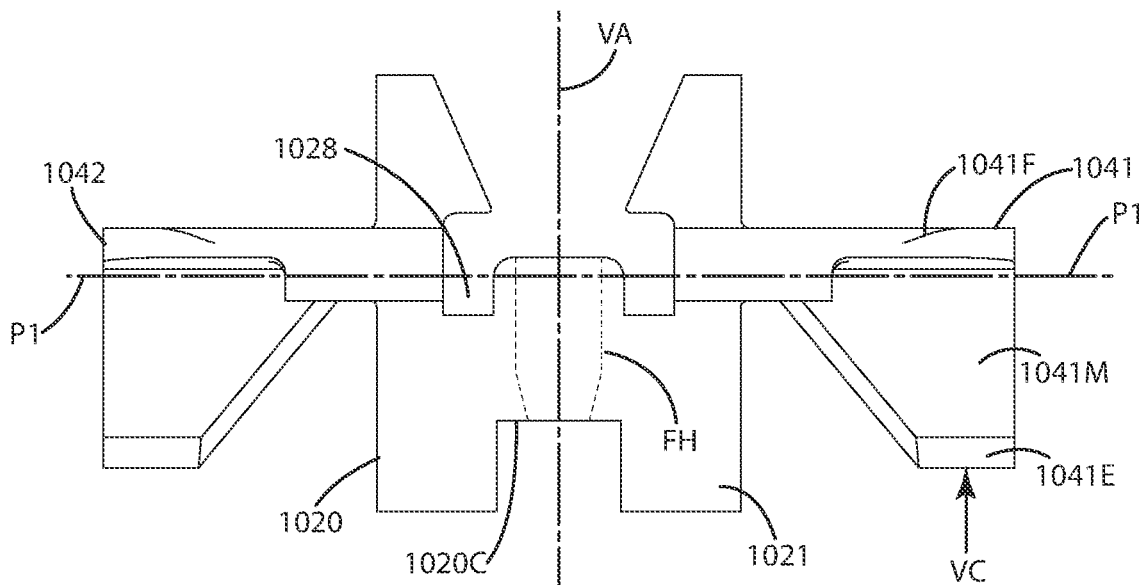
FIG. 18 is a front view of the fastener unit.
Figure 19:
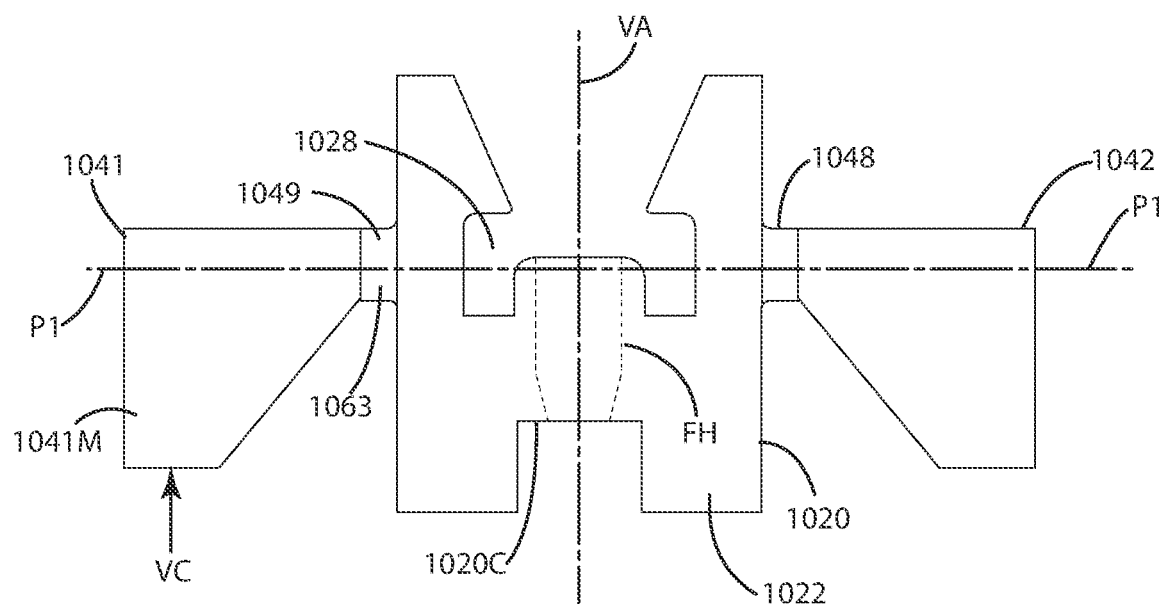
FIG. 19 is a rear view of the fastener unit.

Optionally, as shown in FIGS. 17-19, the spacer block 1020 can be generally of an H configuration, with a central bar or portion 1020C. At least a portion of the grip element recess 1028 can be defined by an upper side of the central bar 1020C. The central bar 1020C can define a first fastener hole FH below the grip element 1030. A second fastener hole SH of the grip element 1030 can be aligned with this first fastener hole FH. In some cases, the first fastener hole FH can include upper and lower portions of similar or different geometric shapes, and can have different diameters or dimensions, similar to the fastener holes described above for previous embodiments. Optionally, the fastener 1090 to be slightly threaded into the spacer body 1020 so that it is secured thereto via those threads and the interaction of the threads with the first fastener hole FH. Optionally, the second fastener hole SH can be larger than the largest dimension of the first fastener hole FH or the diameter of the threads 1090T and/or the shaft 1090S of fastener 1090, described above for previous embodiments.

Figure 24:
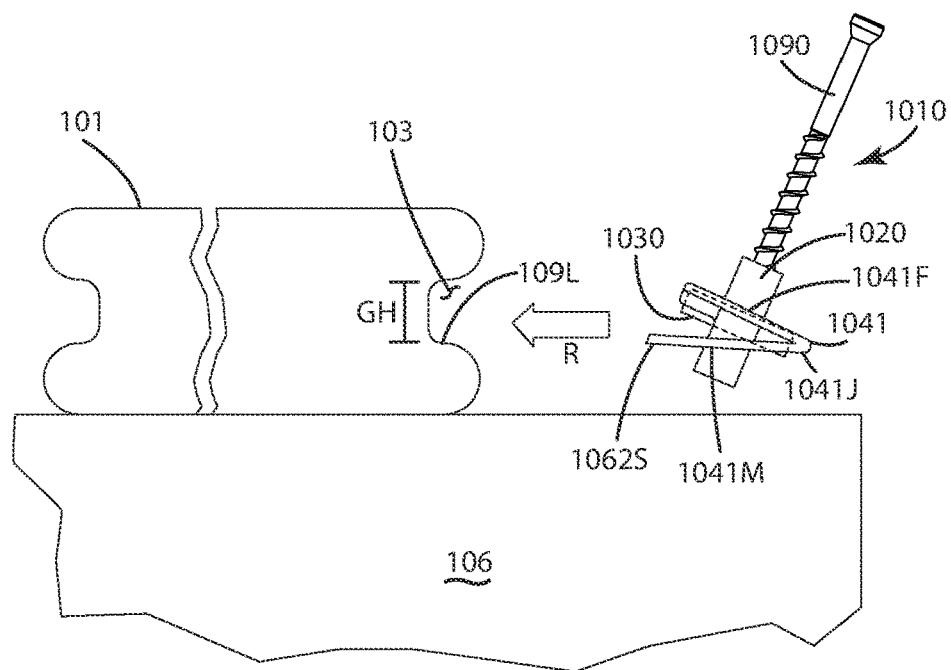
FIG. 24 is a side sectional view of the fastener unit as the moveable wing is being inserted into a groove of the a board.

A method of using the fastener unit 1010 of this alternative embodiment will now be described with reference to FIGS. 24-28. In general, the fastener unit 1010 can be provided including its spacer block 1020, grip element 1030, at least one resilient compression element 1041, and optionally a second resilient compression element 1042 (not visible in FIGS. 24-28). The fastener 1090 can be installed therein or can be installed by the user generally extending through the fastener holes of the spacer block 1020 and grip element 1030 as described above and engaging different portions of those holes as also described above. As shown in FIG. 24, at least the second end 1062S of the moveable wing 1041M can be inserted into the first groove 103 of the first board 101, generally by moving the unit 1010 in direction R toward the first board 101. This can be performed with the compression element 1041 in the open mode. The second end 1062S can be moved in direction R by sliding the moveable wing 1041M in a direction generally parallel to the lower surface 109L of the first groove 103. In the embodiment shown, where the distance between the wings 1041F, 1041M in the open mode is greater than the groove height GH, the moveable wing 1041M, and not the fixed wing 1041F, can be partially inserted into the groove 103 with this movement.

Figure 25:
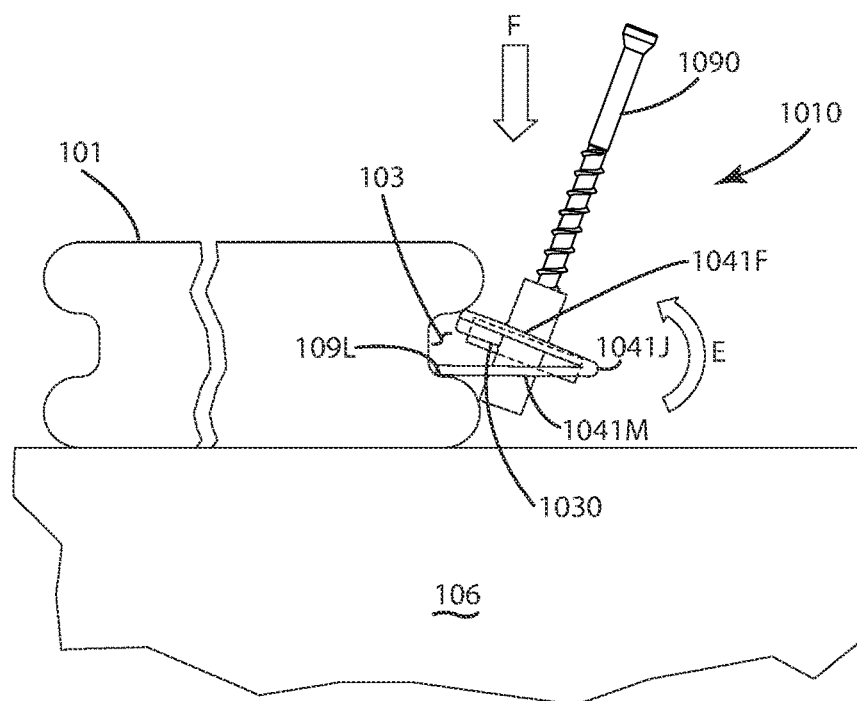
FIG. 25 is a side sectional view of the fastener unit as it is being transitioned from an open mode to a compressed mode.

With at least the second end 1062S of the moveable wing 1041M inserted into the groove 103 as shown in FIG. 25, a user can apply a force F as shown in FIG. 25 by pressing the moveable wing 1041M against the lower surface 109L of the groove 103 to vertically compress the moveable wing 1041M toward the fixed wing 1041F. When so compressed, the fastener unit 1010 transforms from the open mode to the compression mode. In some cases, the fastener unit 1010 can be simultaneously pivoted as the moveable wing 1041M is pressed against the lower surface 109L of the groove 103 for better leverage in compressing the moveable wing toward the fixed wing. As shown in FIG. 25, the fastener unit 1010 can be pivoted upwardly in direction E by moving the junction 1041J upwardly.

In the compression mode, at least a portion of the fixed wing 1041F can be inserted into the groove 103 of the first board 101 as shown in FIG. 26. The grip element 1030 may also be inserted into the first groove 103 with this movement. Both wings can be pushed in direction R further into the groove 103. In some cases, the fastener unit 1010 can be simultaneously pivoted further in direction E to bring the second end 1061S of the fixed wing into the groove 103. For example, the fastener unit 1010 can be pivoted until the fixed wing 1041F is generally parallel to upper surface 109U of the groove 102, and the fixed wing 1041F can be inserted by sliding the fixed wing 1041F in direction R, generally parallel to the upper surface 109U of the first groove 103.

The compressible element 1041 can be released to remove the manually applied compression force F. In turn, the moveable wing 1041M resiliently deforms back toward its configuration in the open mode from the compression mode, with the moveable wing 1041M pressing against the lower surface 109L of the groove 103 (i.e. exerting force F1) and the fixed wing 1041F pressing against the upper surface 109U of the groove 103 (i.e. exerting force F2). These forces F1, F2 can optionally be at least 0.0001 pounds, further optionally at least 0.001 pounds, even further optionally at least 0.05 pounds, yet further optionally between 0.0001 pounds and 0.5 pounds. Of course, other forces can be exerted by the compression element 1041, against the board 101, depending on the application and configuration of the resilient compression elements. This forcible engagement of the wings with the groove fixes the fastener unit 1010 in place adjacent that groove 103. The spacer block 1020 is thus held adjacent the groove 103 of the first board 101.

In some cases, the second ends 1061S, 1062S can be disposed entirely within the groove 103 and located adjacent the rear wall 109R. Releasing the compressible element 1041 can release the fixed wing 1041F into an orientation substantially parallel to the upper surface 109U of the first groove 103. The spring-like moveable wing 1041M can urge the fixed wing 1041F substantially flat against the upper surface 109U of the groove 103, with the second end 1062E pressing against the lower surface 109L.

Figure 27:
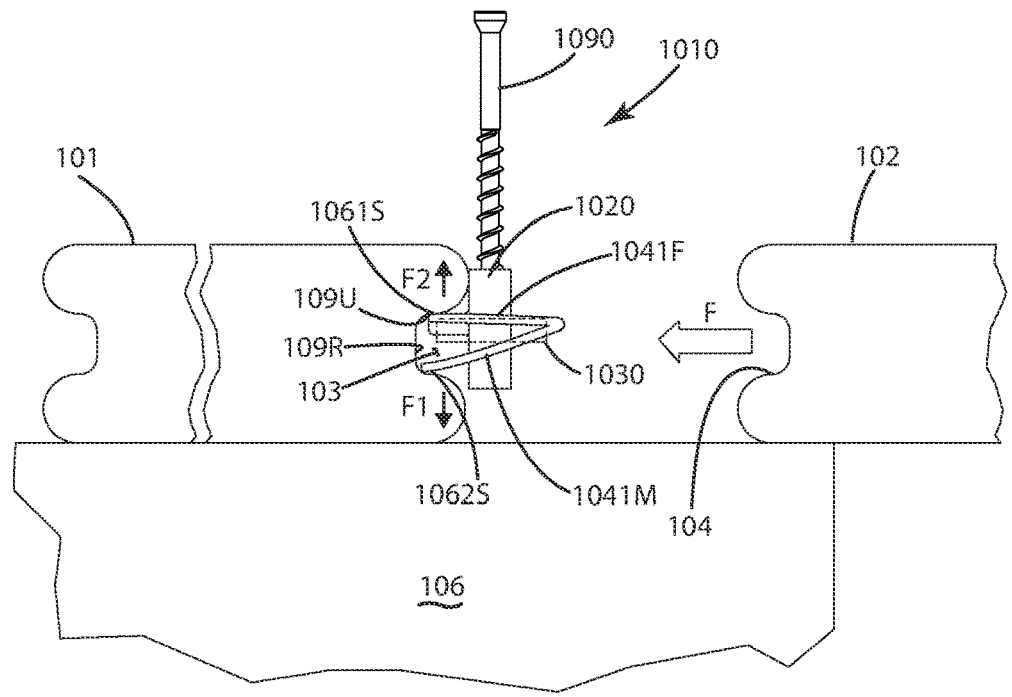
FIG. 27 is a side sectional view of the fastener unit with a second board being installed adjacent to the first board.
Figure 28:
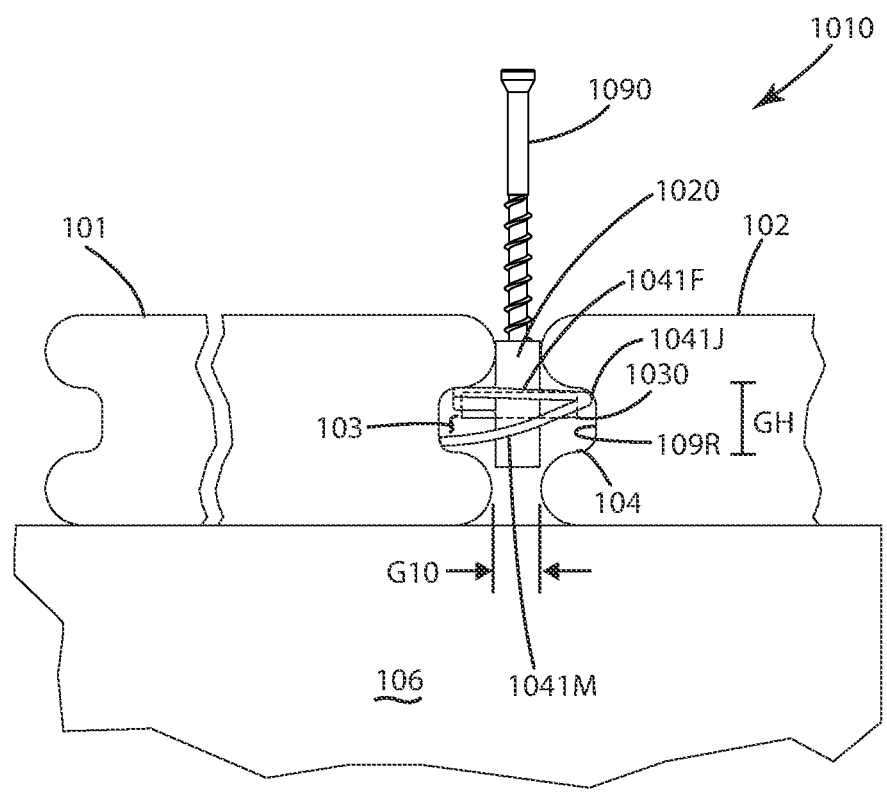
FIG. 28 is a side sectional view of the fastener unit installed within grooves of adjacent boards and establishing a gap with a spacer body between those adjacent boards.

With the fastener unit 1010 in place adjacent the board 101, the user can move a second board 102 in direction F as shown in FIG. 27 toward the first board 101 until the side surface of that board 102 engages the spacer block 1020 as shown in FIG. 28. The grip element 1030 is also inserted into the groove 104 of the second board 102 during this movement. The spacer block 1020 sets the gap G10 between the first board 101 and the second board 102 with its thickness. In some cases, the junction 1041J is located adjacent the rear wall 109R of the second groove 104, and can optionally abut the rear wall 109R in the configuration shown in FIG. 28 when the board 102 engages the spacer block 1020.

Due to the wings 1041F, 1041M extending beyond the rear surface 1022 of the spacer block 1020, the junction 1041J can guide the placement of the second board 102. The sloped angle of the lower wing 1041M and the overall narrow profile of the junction 1041J, in comparison to groove height GH, allows the second board 102 to optionally be slid in on an angle to the first board 101. Once the second board 102 meets the spacer block 1020, the second board 102 can be pivoted downwardly into alignment with the first board 101.

With the second board 102 placed adjacent the first board 101 as shown in FIG. 28, the fastener 1090 can be advanced into the underlying joist 106. As a result, the grip element 1030 pulls downward with forces on the respective adjacent boards 101, 102 to thereby clamp those boards to the underlying joist 106. The above steps and method can be repeated with multiple fastener units 1010 to install the boards relative to one or more joists.

Another alternative embodiment of the fastener unit is illustrated in FIGS. 29-32 and generally designated 1110. The fastener unit of this embodiment is similar in structure, function and operation to the embodiments described above with several exceptions. For example, this unit 1110 can include a fastener 1190 similar to the fasteners described above. It also can include a grip element 1130 that is disposed in an aperture or recess 1128 defined by a spacer block 1120, similar to the embodiments described above. The grip element 1130 optionally can extend from and beyond the front and rear surfaces 1121, 1122 of the spacer block 1120. The spacer block 1120 can be configured to establish a gap between adjacent boards, and sized with a thickness T12 similar to the thicknesses T1-T11 above. The unit 1110 can include first and second resilient compression elements 1141, 1142 joined with the spacer block 1120, the compression elements having fixed and moveable wings 1141F, 1141M similar to the embodiment described above. It is noted that the grip element 1130 is not shown in FIGS. 30-31 and the fastener 1190 is not shown in FIGS. 30-33 to more clearly show details of the spacer block 1120 and compression elements 1141, 1142.

Figure 32:
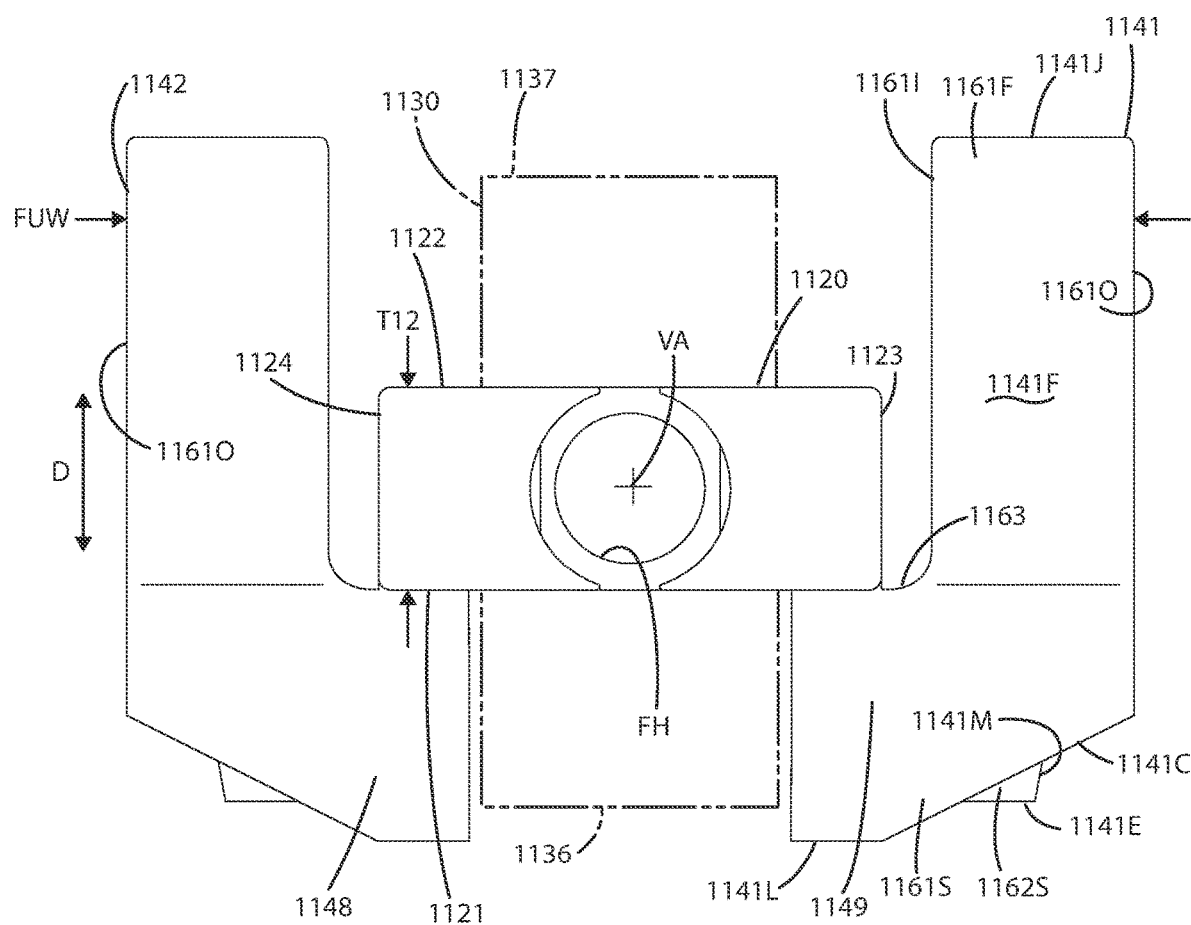
FIG. 32 is a top view of the fastener unit.
Figure 33:
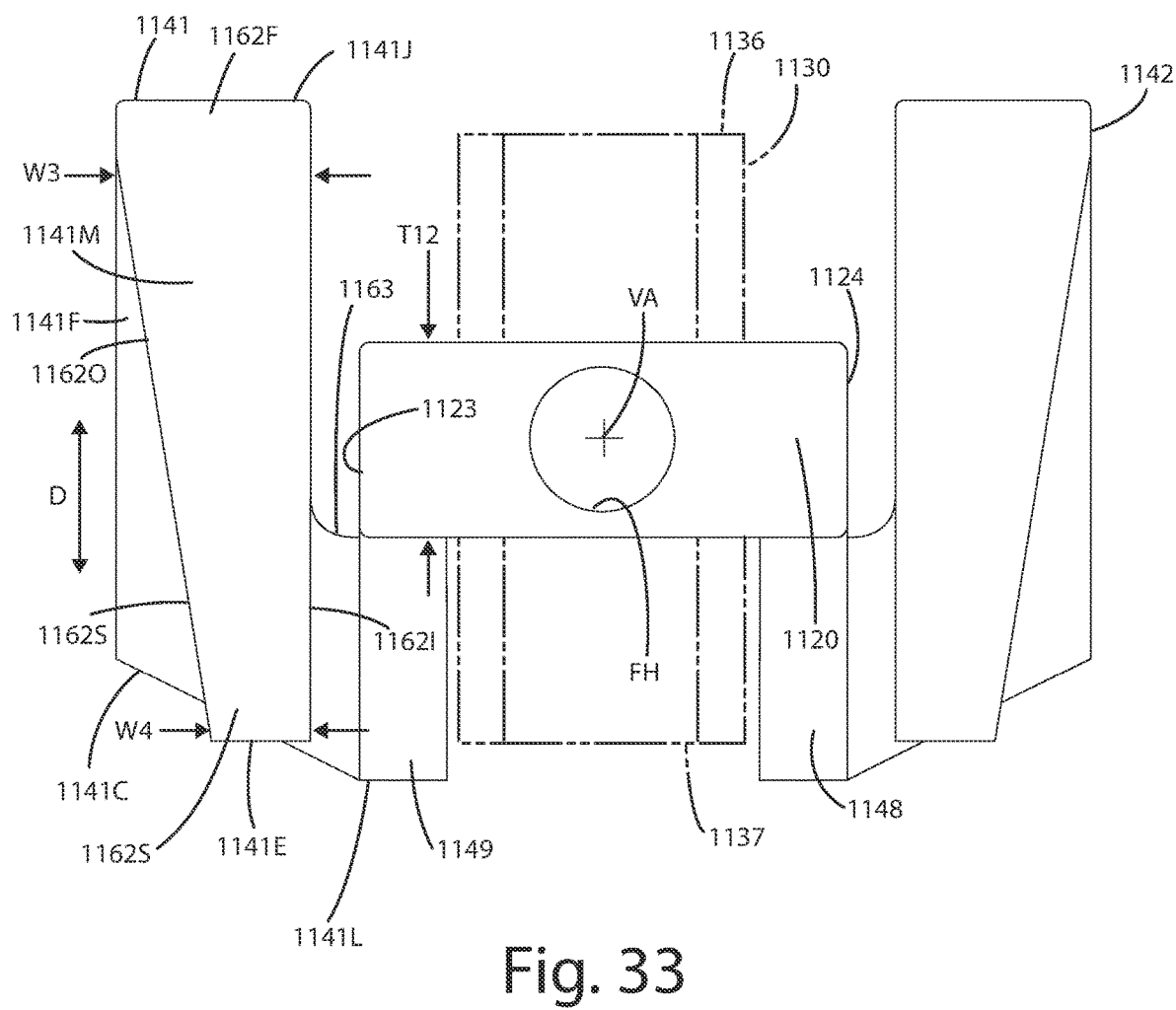
FIG. 33 is a bottom view of the fastener unit.

In this embodiment, the second end 1161S of the fixed wing 1141F is chamfered for better lead in when installing the fastener unit 1110 in a groove ofa board. The second end 1161S of the fixed wing 1141F comprises a leading edge 1141L of the fixed wing 1141F. The leading edge 1141L includes a chamfer 1141C comprising a sloping portion of the leading edge 1141L. The chamfer 1141C also exposes the lower moveable wing 1141M for easier placement into a groove. As can be seen in FIGS. 32-33, at least a portion of the second end 1162S of the moveable wing 1141M can extend beyond the chamfer 1141C of the fixed wing 1141F. As illustrated, at least a portion of the terminal edge 1141E of the moveable wing extends forwardly of the chamfer 1141C.

Figure 31:
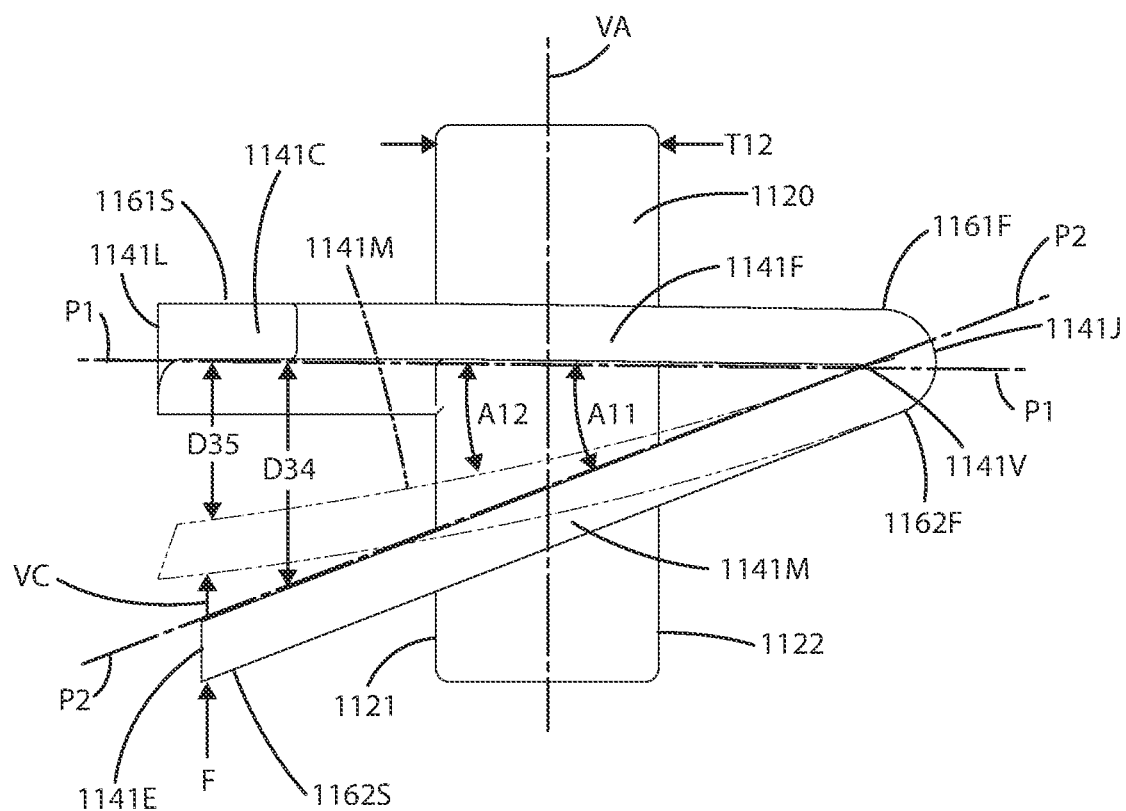
FIG. 31 is a side view of the fastener unit with the resilient compression elements being converted from an open mode to a compression mode.

Like the above embodiment, the compression elements 1141, 1142 are operable in an open mode, as shown in solid line in FIG. 31, and a compression mode as shown in phantom line in FIG. 31. In the open mode, the terminal edge 1141E of the moveable wing 1141M is spaced from the fixed wing 1141F by a first vertical distance D34, which can optionally be greater than the height of a groove. Because of the vertically compressible nature of the moveable wing 1141M, the wing can be moved in direction VC generally toward the fixed wing 1141F or first plane P1. Application of force F to vertically compress the moveable wing 1141M toward the fixed wing 1141F in direction VC toward the plane P1 converts the wings from the open mode to the compression mode, and the distance between the terminal edge 1141E and the fixed wing 1141F decreases to a second vertical distance D35. This distance D35 can be less than the groove height. In converting to the compression mode, the resilient wing 1141M bends, flexes or otherwise move toward the fixed wing 1141F so that the distance between them is reduced from the distance D34 to the distance D35. This reduction in distance can be approximately 5%, 10%, 15%, 25%, 30%, 35%, 40%, 50% or more, depending on the application and amount of vertical compression.

Still referring to FIG. 31, the moveable wing 1141M is angled relative to the fixed wing 1141F when the compression element 1141 is in the open mode, i.e. not compressed or engaged with a board, and can move in direction VC when force F is applied so the angle between the wings decreases from a first acute angle A11 to a second acute angle A12 when the compression element 1141 is in the compression mode. The first angle A11 can be optionally about 10° to about 60°, inclusive, about 15° to about 50°, inclusive, about 20° to about 45°, inclusive, or about 20° to about 35°, inclusive, or other angles, depending on the application. The second angle A12 can be optionally less than 90%, less than 80%, less than 75%, less than 50%, less than 25% of the first angle A11.

Like the above embodiment, the moveable wing 1141M can be tapered toward the second end 1162S, with the first end 1162F of the moveable wing defining a first width W3 and the second end 1162S of the moveable wing defining a second width W4. The widths can optionally be defined between first and second side edges 1162I, 1162O of the moveable wing 1141M. The second width W4 can be less than the first width W3. In the embodiment shown, the first or outer side 1162O of the moveable wing is oblique to the first or inner side 1161I of the fixed wing so a that the moveable wing is tapered on its outer side. The second or inner side 1162I of the moveable wing can be coplanar with the first or outer side 1161O of the fixed wing. In another embodiment, both sides of the moveable wing can be oblique to the sides of the fixed wing.

With the moveable wing 1141M tapered on its outer side, the moveable wing 1141M angles toward the center of the fastener unit 1110, the center being optionally defined by the vertical axis VA. The second end 1162S of the moveable wing is thereby disposed closer to f the fastener unit 1110, which focuses forces on the wing toward the center of the fastener unit, rather than dispersing forces at the outer portions of the unit.

Optionally, as best seen in FIG. 32, the outer side surfaces 1161O of the compression elements 1141, 1142 are separated by a fastener unit width FUW. This fastener unit width FUW can be selected to enable abutting two boards on one joist, without having to remove one of the resilient compression elements 1141, 1142, allowing for a stronger fastener unit 1110. The width FUW can be optionally 1.00 inch, or 0.5 inch from the center of the first fastener hole FH, optionally defined by the vertical axis VA, to either outer side surfaces 1161O.

Figure 29:
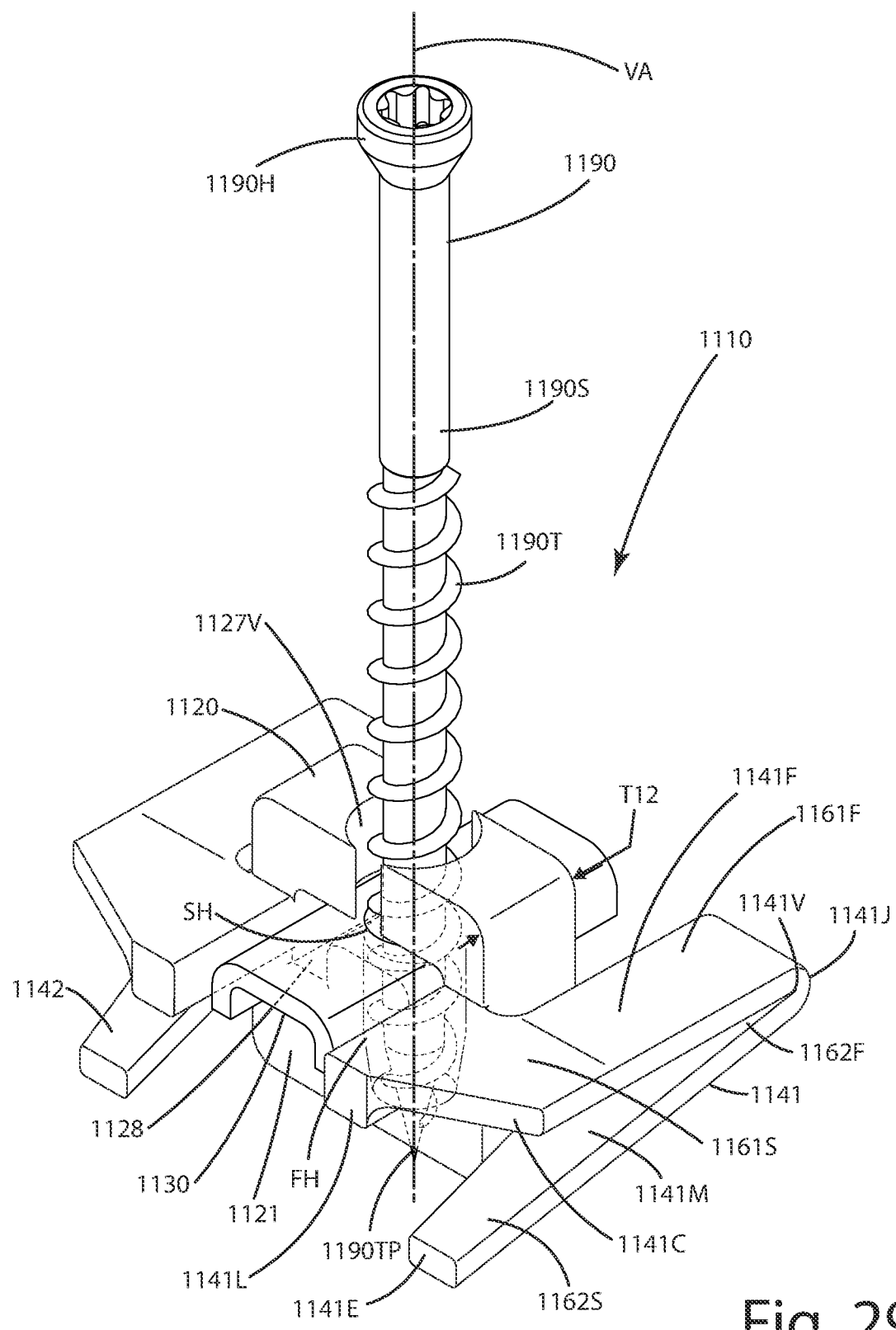
FIG. 29 is a perspective view of another alternative embodiment of the fastener unit including a fastener associated with the unit.
Figure 30:
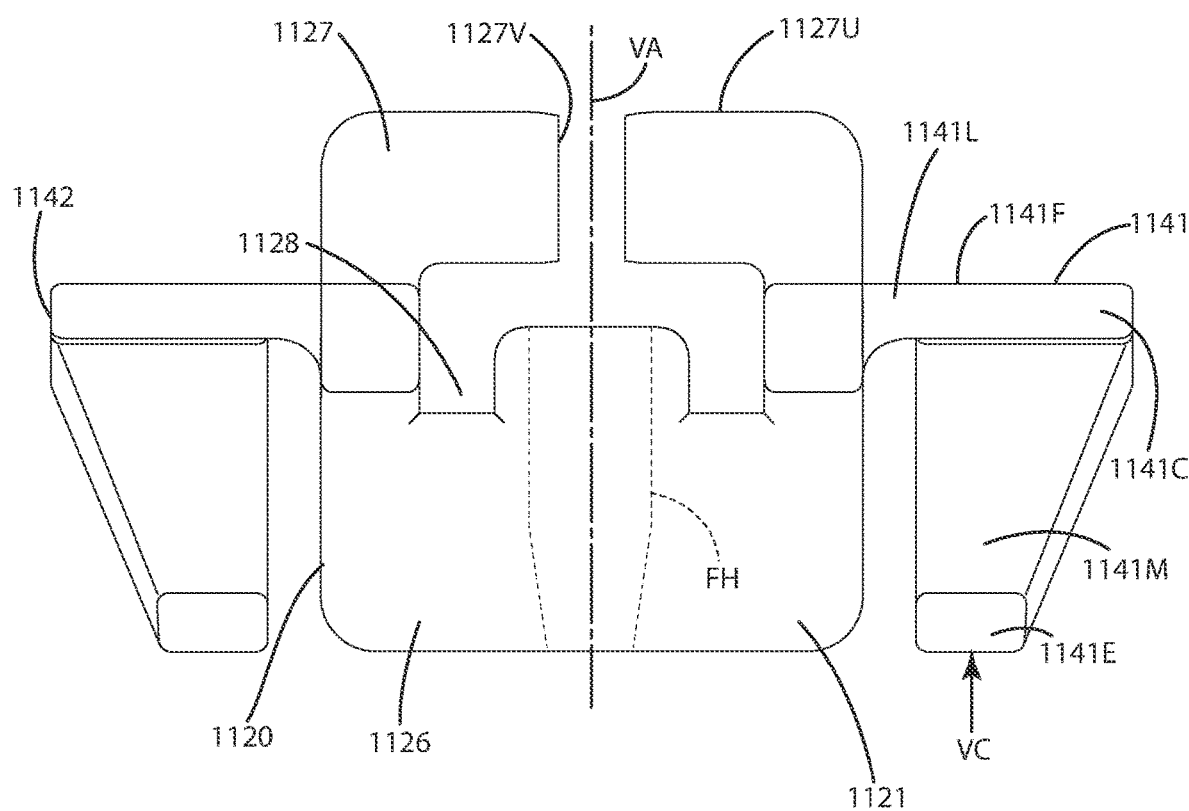
FIG. 30 is a front view of the fastener unit.

Referring to FIGS. 29-30, the spacer block 1120 can include a lower portion 1126 and an upper portion 1127. The upper portion 1127 can define a void 1127V which is open to the recess 1128. The void 1127V can be flanked by opposing flat surfaces which can collectively define the upper surface 1127U of the spacer block 1120. The lower portion 1126 can be generally free of any voids. The void 1127V can extend downward from the upper surface 1127U of the spacer block 1120 and can be sized to receive the head 1190H of the fastener 1190 when the fastener is fully installed. In some cases, the void 1127V can be of a depth sufficient to receive substantially the entire head 1190H such that the head is below the upper surface 1127U and optionally not visible from the side after the fastener 1190 is fully installed.

A method of using the fastener unit 1110 of this alternative embodiment is similar to the method of using the embodiment above. For example, the fastener unit 1110 can be placed adjacent a side surface ofa board, with the spacer block 1120 engaging that side surface and one end of the grip element 1130 placed in the groove of the board. A user can vertically compress the moveable wing 1141M toward the fixed wing 1141F in order to insert the ends of the compression elements 1141, 1142 into the groove, and then release the elements 1141, 1142 to remove the manually applied compression force. As a result, the compression elements 1141, 1142 secure the spacer block 1120 adjacent the groove. A second board can be moved adjacent the first board, with a gap between those boards being set by the thickness T12 of the spacer block 1120 and the other end of the grip element 1130 placed in the groove of the second board. The junction 1141J can guide the placement of the second board 102. Next, the fastener 1190 can be advanced into the underlying joist. The above method and steps can be repeated for additional fastener units to further secure the boards to underlying joists.

Yet another alternative embodiment of the fastener unit is illustrated in FIGS. 34-38 and generally designated 1210. The fastener unit of this embodiment is similar in structure, function and operation to the embodiments described above with several exceptions. For example, this unit 1210 can include a fastener 1290 similar to the fasteners described above. It also can include a grip element 1230 extending from a spacer block 1220. The grip element 1230 optionally can extend from and beyond the front and rear surfaces 1221, 1222 of the spacer block 1220. The spacer block 1220 can be configured to establish a gap between adjacent boards, and sized with a thickness T13 similar to the thicknesses T1-T12 above. The unit 1210 can include first and second resilient compression elements 1241, 1242, 1243 and 1244 joined with the spacer block 1220. The compression elements can include respective wings 1241W, 1242W, 1243W and 1244W. The wings can extend from the spacer block or a bisecting plane BP2 of the fastener unit on opposite front F and rear R sides of that bisecting plane BP2. The wings 1241W and 1243W can be opposite one another across the bisecting plane BP2, and the wings 1242W and 1244W also can be opposite one another across the bisecting plane BP2. Of course, the second set of wings 1243W and 1244W can be absent in some embodiments, or the wings can be mixed and matched in various combinations. As shown and described below, the opposing sets of wings can grip the surfaces of one or more grooves and secure the grip element 1230 one or more grooves of a first board 101 and a second board 102.

Figure 36:
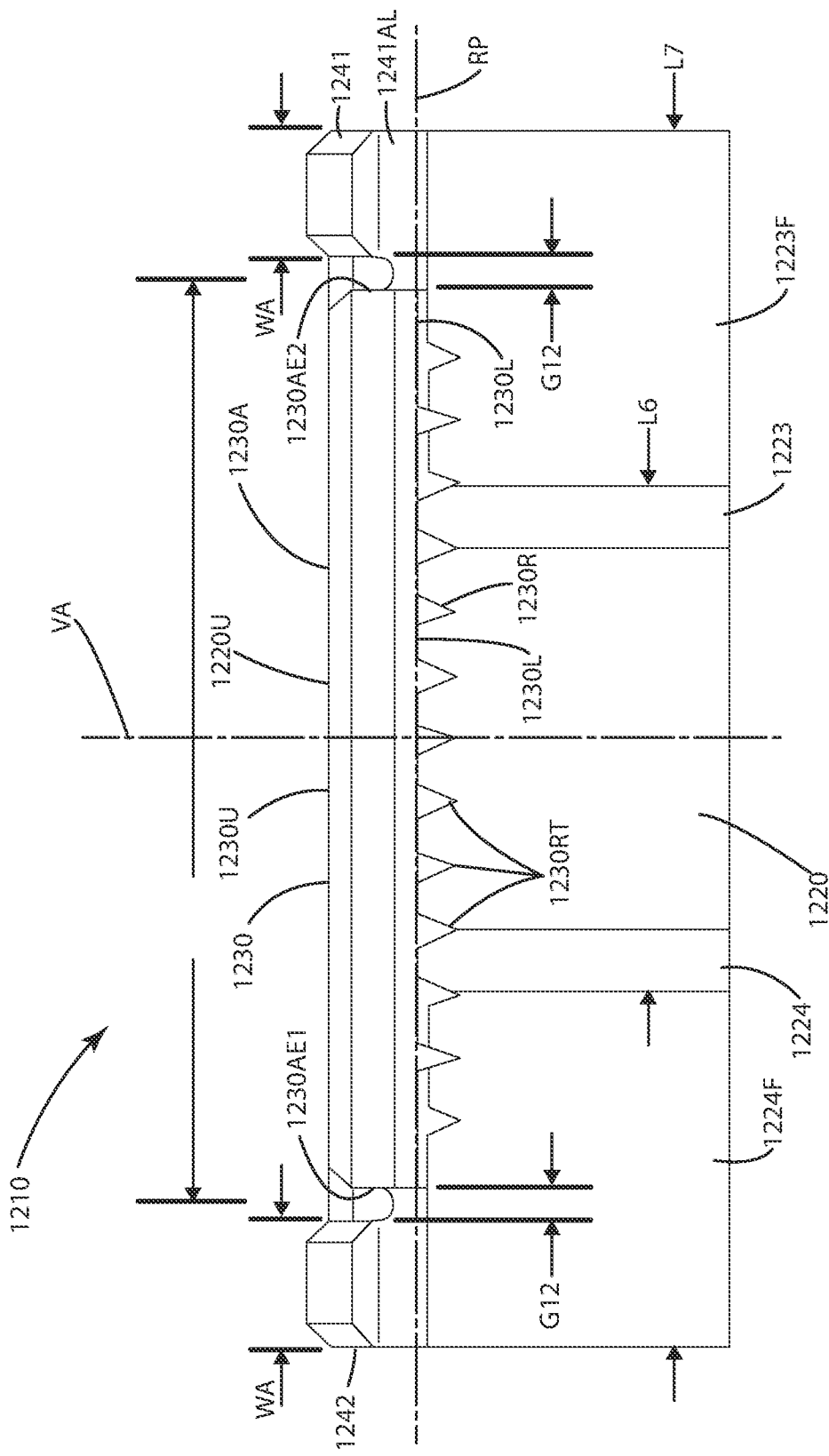
FIG. 36 is a front view of the fastener unit.
Figure 37:
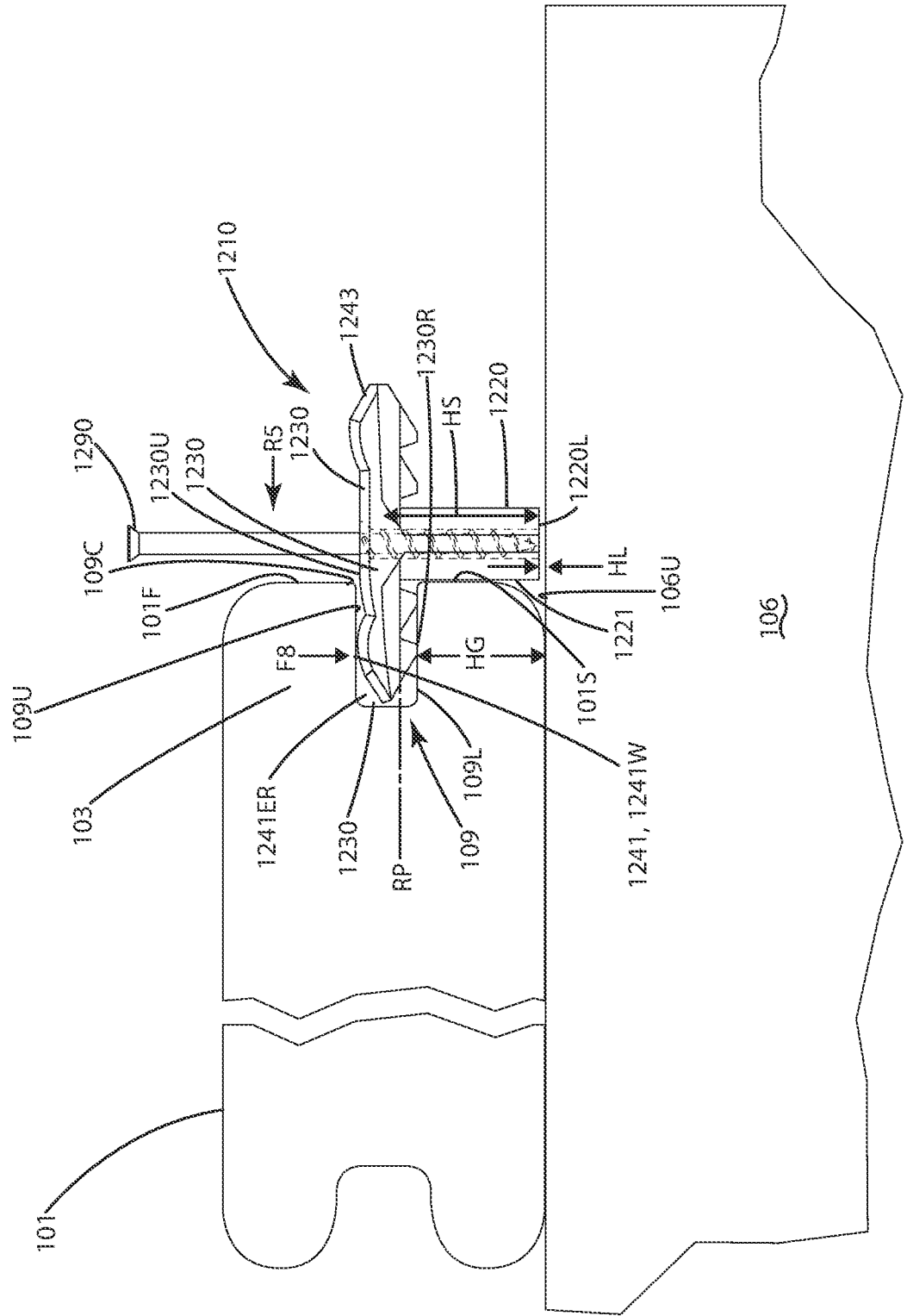
FIG. 37 is a side view of the fastener unit with the resilient compression elements being converted from an open mode to a compression mode, and gripping the fastener unit in a first groove of a first board so that the fastener unit is supported against the side surface of the board.
Figure 38:
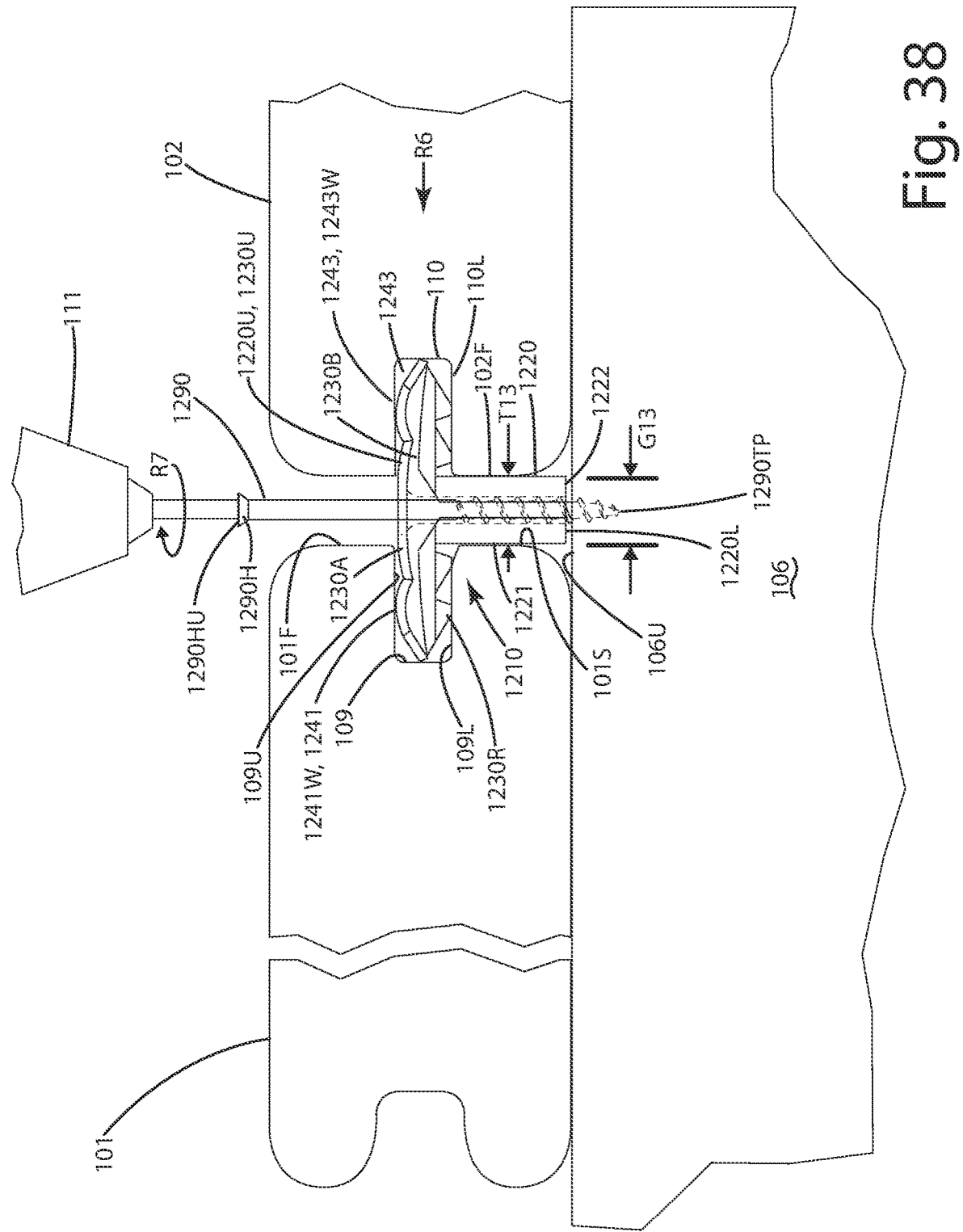
FIG. 38 is another side view of the fastener unit in the compression mode with a second board spaced from the first board by a gap and the opposing resilient compression elements further gripping a second groove of the second board so that the fastener unit is supported between the first and second boards.
Figure 39:
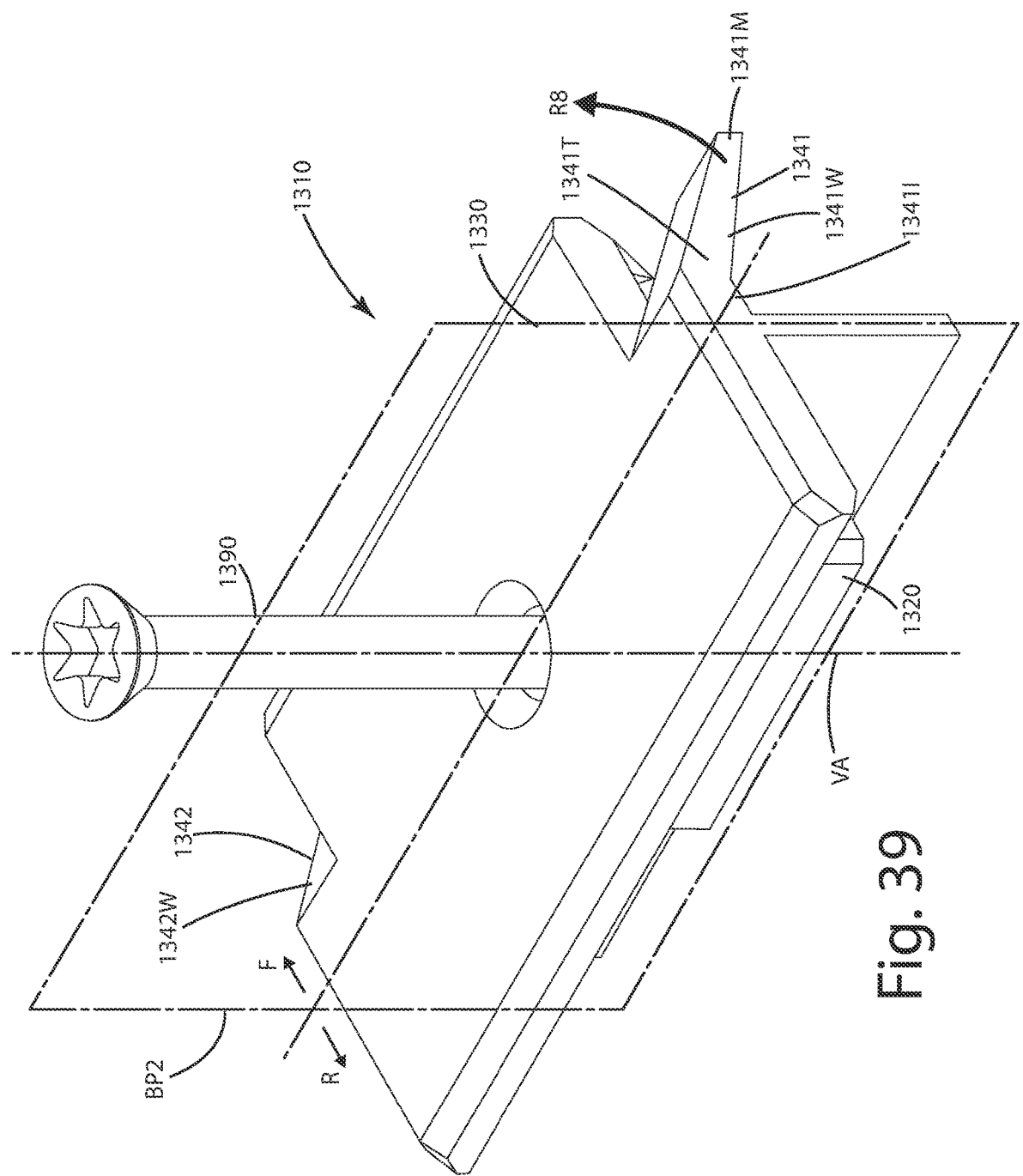
FIG. 39 is a perspective view of still another alternative embodiment of the fastener unit including a fastener associated with the unit.
Figure 40:
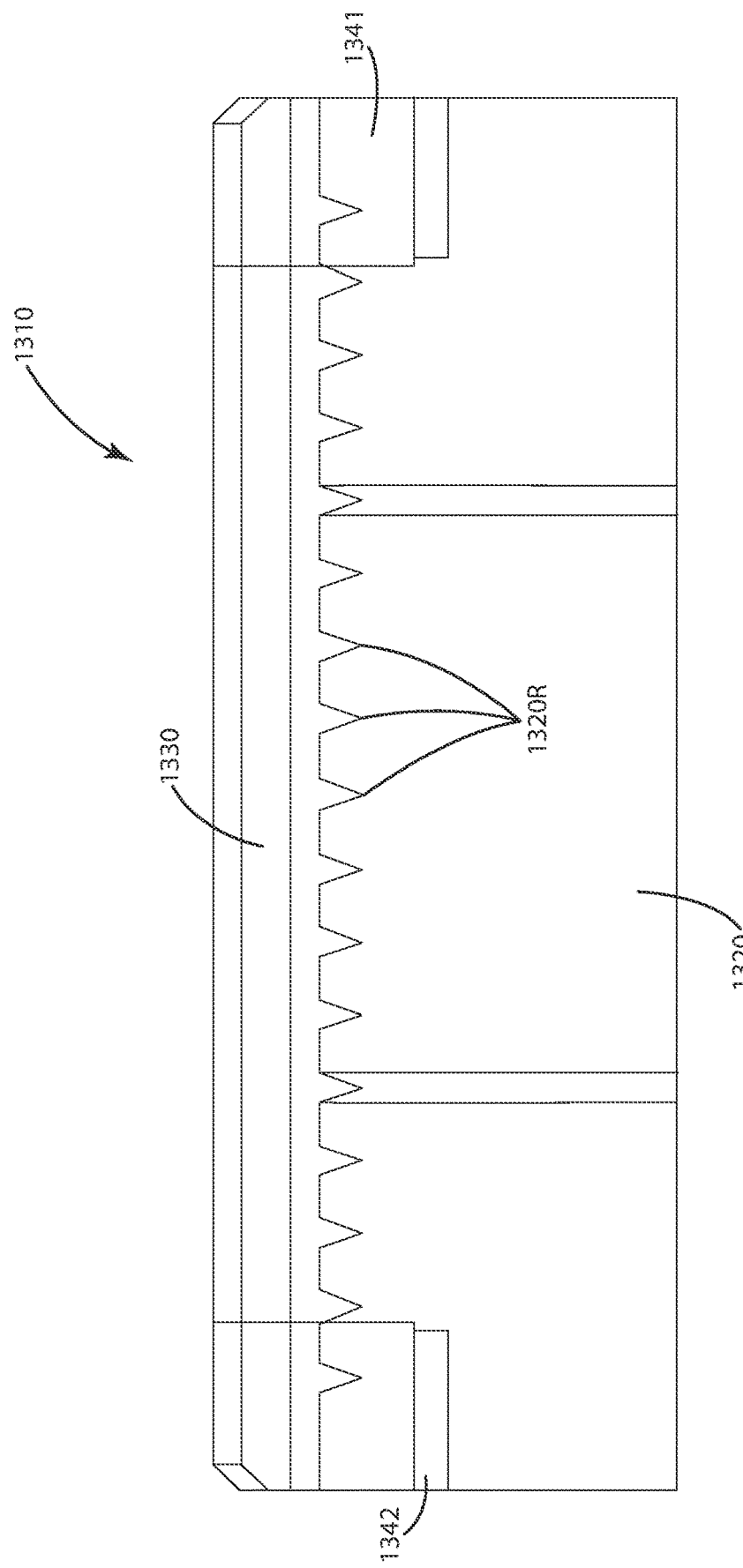
FIG. 40 is a right side front view of the fastener unit, the left side being a mirror image thereof.
Figure 41:
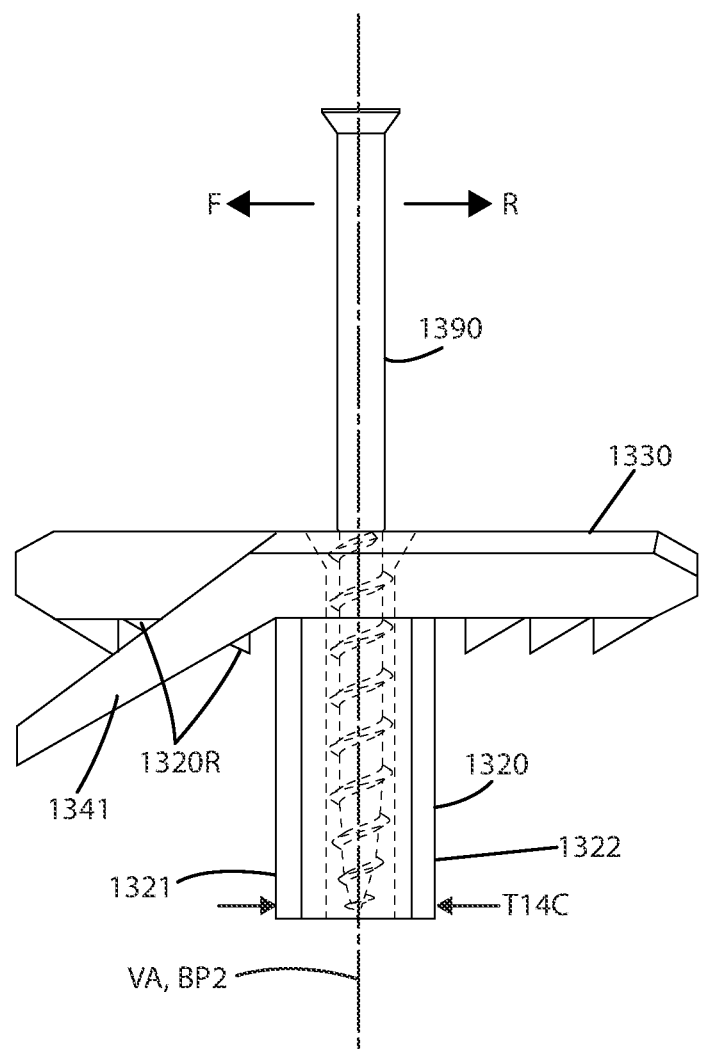
FIG. 41 is a front view of the fastener unit.

With reference to FIGS. 34-37, the spacer block 1220 and grip element 1230 of this embodiment will be described in more detail. The spacer block 1220 as mentioned above can include a first or front surface 1221 which can be configured to face the first board 101 (FIG. 37) and a second or rear surface 1222 which can be configured to face the second board 102 (FIG. 38). The spacer block 1220 can include a first side surface 1223 and a second side surface 1224 disposed on opposite sides of a vertical axis VA of the fastener 1290. These first and second sides of the spacer block can be disposed closer to, and inwardly relative to, the outermost side surfaces 1241O, 1243O, 1242O and 1244O of the respective resilient compression members and the fastener unit 1210 in general. The spacer block 1220 as mentioned can include a thickness T13 which can be similar to the thicknesses T1-T 12 as described in the embodiments above to set a specific gap between the first 101 and second 102 boards when they are placed adjacent one another. The spacer block optionally can transition at the respective sides 1223 and 1224 to respective flanges 1223F and 1224F. These flanges can extend outward to the outermost side surfaces of the fastener unit 1210 distal from the respective sides 1223 and 1224 of the spacer block. Of course, in some applications, the flanges can extend only part way to the outermost side surfaces of the fastener unit. Although not shown, the flanges can include openings and/or recesses to reduce material used in the fastener unit. The flanges 1223F and 1224F also can extend under and can be integrally formed with the grip element 1230, extending away from the side surfaces 1223 and 1224 of the spacer block toward the outermost side surfaces 1241O, 1243O, 1242O and 1244O of the respective resilient compression members and the fastener unit 1210 in general. The flanges also can extend under the respective resilient compression members 1241, 1242, 1243 and 1244.

Optionally, the flanges 1223F and 1224F can be thinner than the thickness T13 of the spacer block setting a gap. For example, the flanges can have a thickness T14, which can be optionally less than three quarters, less than one half, or less than one quarter the thickness T13 the spacer block. With this thinner thickness T14, the flanges typically will not contact the side surfaces of the respective first 101 and second 102 boards when the fastener unit is installed therebetween.

Figure 35:
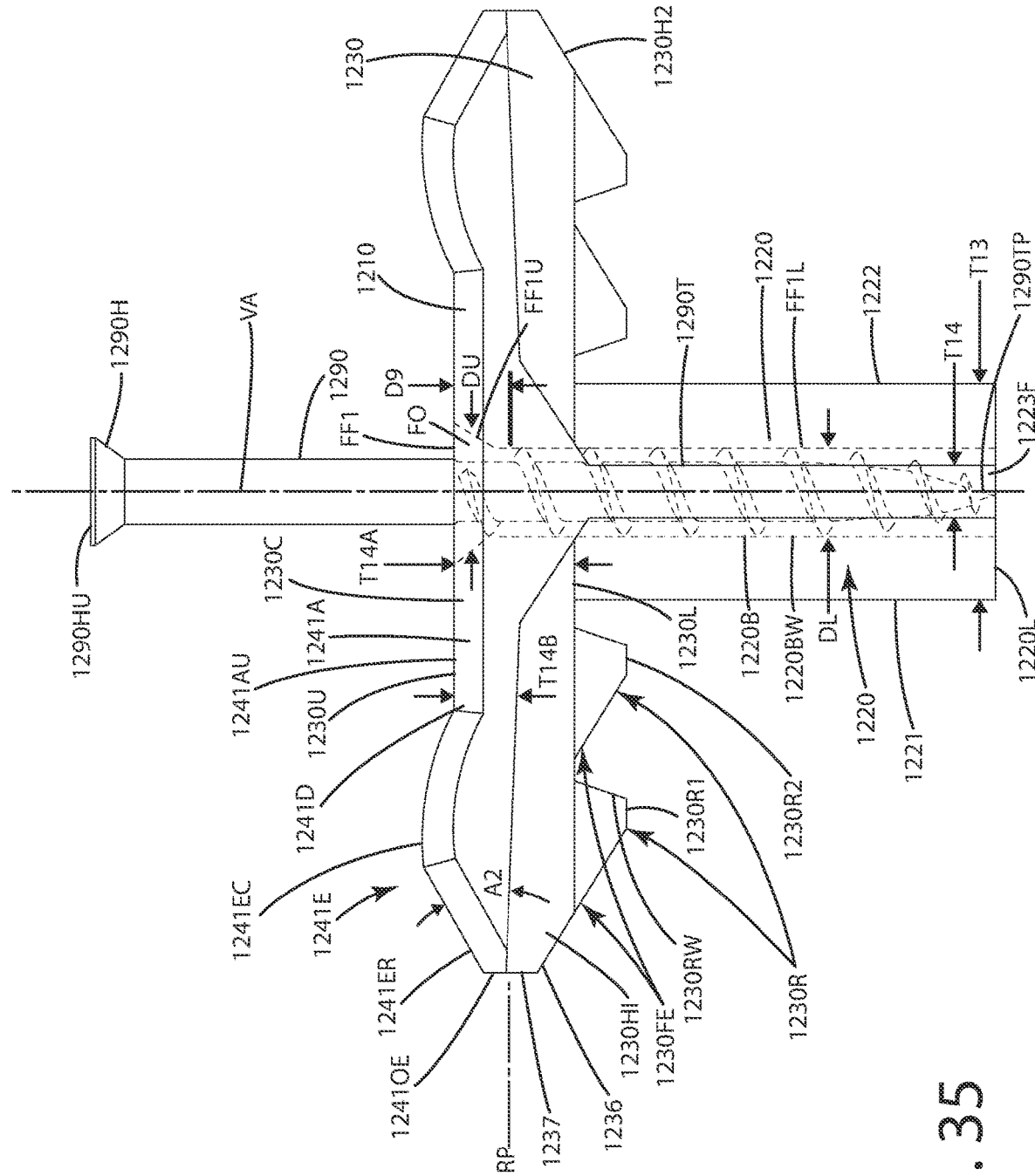
FIG. 35 is a right side front view of the fastener unit, the left side being a mirror image thereof.

The spacer block also can include an upper surface 1220U and a lower surface 1220L. The spacer block can extend between these upper and lower surfaces. The upper surface 1220U of the spacer block 1220 optionally can be contiguous with and parallel to upper surface 1230U of the grip element 1230. Indeed, these surfaces can be flush, parallel and/or continuous with one another. With reference to FIG. 35, the spacer block 1220 and the grip element 1230 also can be integrally formed as a single piece unit. This unit can be constructed from a polymeric, composite, metal or other material. This unit can be 3D printed, molded, milled, machined, formed or otherwise constructed.

Figure 34:
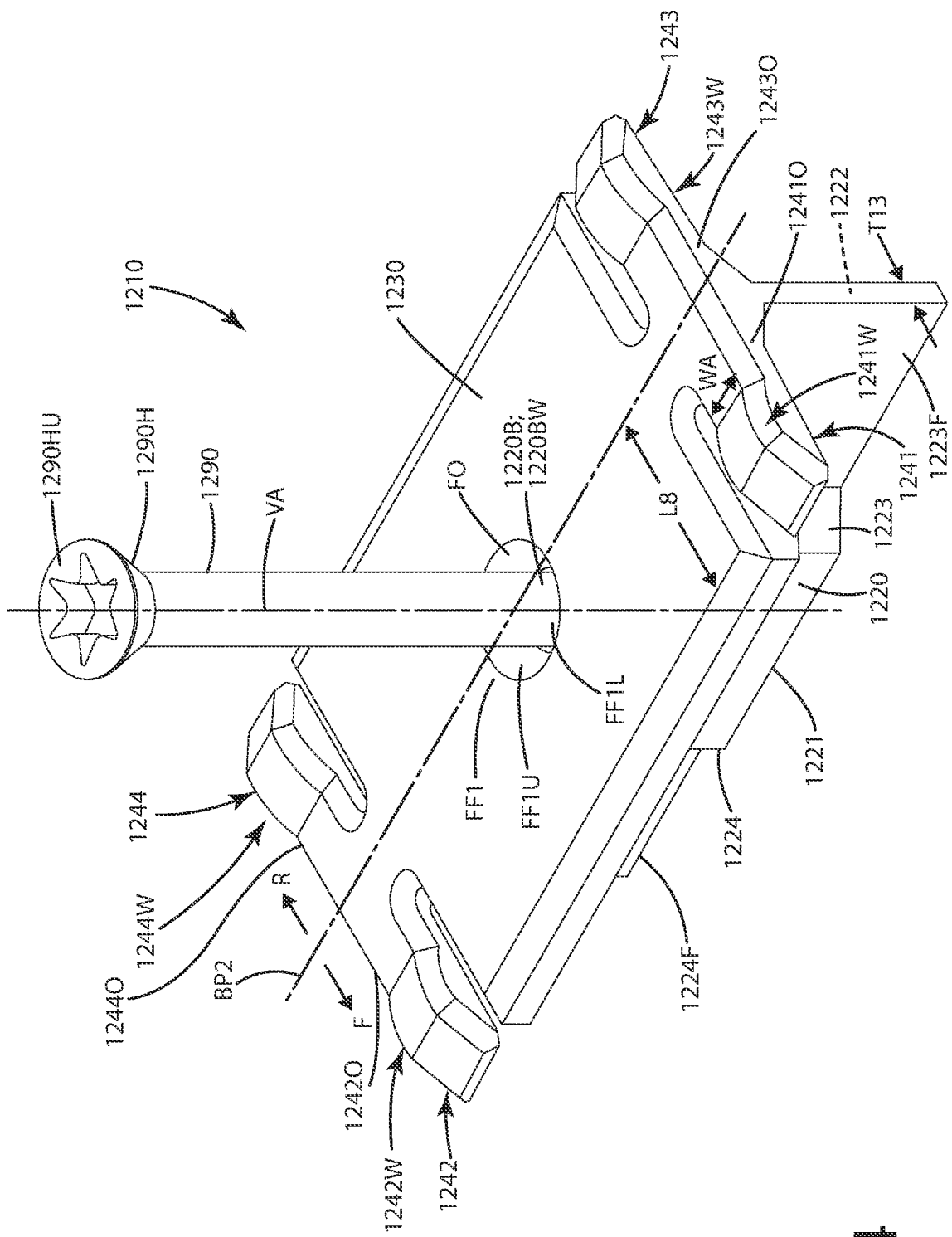
FIG. 34 is a perspective view of yet another alternative embodiment of the fastener unit including a fastener associated with the unit.

With reference to FIG. 35, the spacer block 1220 can define a fastener hole first fastener hole FF1. The first fastener hole FF1 can include an upper portion FF1U and a lower portion FF1L. The upper portion and lower portion can be of similar geometric shapes. For example, the upper and lower portions can both be cylindrical. In some cases, however, one can be frustoconical and the other can be cylindrical. In yet other applications, one or both of the shapes can be rectangular, square, polygonal, ellipsoid, rounded or other geometric shapes. As shown in FIGS. 34-35, the upper portion FF1U can be of a frustoconical shape. This frustoconical shape can include frustoconical opening FO that opens into the upper surfaces 1220U and 1230U of the spacer block and grip element. The frustoconical opening FO can be shaped to receive the head 1290H the faster 1290, which optionally also can be of a matching a corresponding frustoconical shape. Thus, when fully installed, the upper surface 1290HU of the fastener 1290 can be flush with upper surfaces 1220U and 1230U of the spacer block and the grip element surrounding the first fastener hole FF1. Optionally, in other configurations, the upper portion FF1U can be of a cylindrical shape. This cylindrical shape can match a cylindrical shape or a reverse taper shape of a screw head (not shown) which can have a flat bottom before transitioning to a shaft of the fastener. In such a case, the cylindrical head can fit in the cylindrical upper portion FF1U of the first fastener hole FF1. In either construction, with the frustooonical opening or a cylindrical opening in the upper portion FF1U, the screw head 1290H may or may not sit flush with the upper surface 1220U and/or 1230U of the respective spacer block and/or grip element.

The respective upper portion FF1U and lower portion FF1L can have different diameters or dimensions. For example, the upper portion can include a diameter DU and the lower portion can include a diameter DL. The lower portion diameter DL can be less than the upper portion diameter DU. It will be noted that although referred to herein as a diameter, that phrase encompasses any dimension of the first fastener hole, regardless of whether the respective portions of the hole are circular, elliptical, rounded or instead are polygonal. The tip 1290TP of the fastener 1290, which can be pointed, frustoconical, beveled, flat or of another shape, can be inserted into and have its threads partially bite into the lower portion FF1L.

As shown in FIGS. 34-36, the fastener 1290 can be fixedly supported to extend above the upper surface 1220U of the spacer block before the fastener unit 1210 is installed relative to a board or its respective groups. The fastener also can physically engage the first fastener hole FF1 so as to fixedly support the fastener in a generally orthogonal orientation relative to the upper surfaces 1220U, 1230U. For example, as shown in FIG. 35, the vertical axis VA of the first fastener 1290 extends orthogonally to the upper surface 1220U of the spacer block 1220 and to the upper surface 1230U of the grip element 1230. The fastener 1290 can be supported in this upright position sufficiently so that it does not wobble and is not loose relative to the first fastener hole FF1 defined by the spacer block 1220. Optionally, the first fastener hole FF1 also can be defined partially or fully by the grip element 1230 where the grip element 1230 and the spacer block 1220 are integral with one another around the vertical axis VA of the fastener unit 1210 and/or of the first fastener 1290.

As shown in FIG. 35, the fastener 1290 can be slightly threaded into the spacer body with the threads 1290 T so that it is secured thereto via those threads and the interaction of the threads with the first fastener hole FF1. The threads near the tip 1290 TP also or alternatively can be threaded into the lower portion FF1L of the first fastener hole FF1. The tip and/or threads can effectively bite into the material that comprises the spacer block around the lower portion FF1L of the hole FF1. Where the spacer block is polymeric and the fastener is a metal, the metal threads can bite into, mar and frictionally engage the bore wall 1220BW of the bore 1220B that forms the first fastener in this and other areas along the vertical axis VA.

With further reference to FIG. 35, the first fastener hole FF1 can form a tapered and/or frustoconical opening FO in the upper portion FF1U. This frustoconical opening can extend and transition from the upper surface 1220U of the spacer block 1222 to a depth D9. The depth D9 optionally can be less than the thickness T14A of the grip element 1230, which extends from its upper surface 1230U to its lower surface 1230L. In some cases, the depth D9 can be the same as or greater than the thickness T14A of the grip element 1230. Below the optional frustoconical opening FO, the first fastener hole FF1 can transition to the bore 1220B that extends downwardly from the frustoconical portion to the lower surface 1220L of the spacer block 1220. The bore can include a bore sidewall 1220BW. This bore sidewall can generally be of a cylindrical shape and/or cross-section and can surround the first fastener hole, optionally forming the perimeter of that first fastener hole. The bore sidewall 1220BW can extend from the upper surface 1220U or from the bottom of the upper portion FF1U downward to the lower surface 1220L of the spacer block 1220. The bore and the bore sidewall can extend downward, below the lower surface 1230L of the grip element to the lower surface 1220L of the spacer block 1220. In this region, the bore and the bore sidewall can circumferentiate the fastener that is disposed inside the first fastener hole below the grip element 1230. In this region, the spacer body 1220 also can generally circumferentiate and/or surround the vertical axis VA and the fastener 1290, with the spacer body itself extending downward from the lower surface 1230L of the grip element about the vertical axis VA. Optionally, the bore sidewall, in surrounding the fastener, can be continuous and can completely surround the fastener, without extending outward beyond the spacer block, for example, to or beyond the outermost side edges near the side surfaces of the fastener unit. Further optionally, the lower portion FF1L and/or the bore 1220B of the first fastener hole FF1 also can include steps, such that the diameter DL of the bore 1220B varies in extending from the grip element 1230 downward to the lower surface 1220L of the spacer block 1220.

Optionally, although not shown, there can be one, two, three, four or more different diameters DL defined in that bore 1220B. These diameters optionally can decrease as they extend toward the lower surface 1220L. Further optionally, although not shown, the bore 1220B and/or lower portion FF1L of the first fastener hole FF one can close off or terminate adjacent and/or above the lower surface 1220L of the spacer body. In this case, the bottom of the bore and first fastener hole can be closed. Where the bottom of the hole is closed, the material in that region can be thinned or can have a density, shape or property such that the tip 1290TP of the fastener 1290 can penetrate, break through and/or extend through the closure in that region to extend out of the first fastener hole. Further optionally, as shown in FIG. 35, the first fastener hole FF1 can be at least partially plugged by the fastener disposed in it, before the fastener unit is even installed relative to any board.

As mentioned above, the first fastener hole FF1 can extend partially through the grip element 1230 as well as the spacer block 1220. Around the first fastener hole FF1, these components can form an integral, one-piece component that defines the first fastener hole. Portions of the upper portion FF1U and lower portion FF1L of the first fastener hole FF1 can be defined in the grip element 1230 and/or the spacer body block 1220. In some cases, the first fastener hole FF1 optionally can be of a uniform tubular construction, with a bore sidewall that is tubular from the upper surface 1220U to the lower surface 1220L. In such a construction, however, the head 1290H of the fastener 1290 might not bury itself flush into the hole, and might extend above the upper surface 1220U of the spacer block and/or the upper surface 1230U of the grip element when fully installed.

Figure 36A:
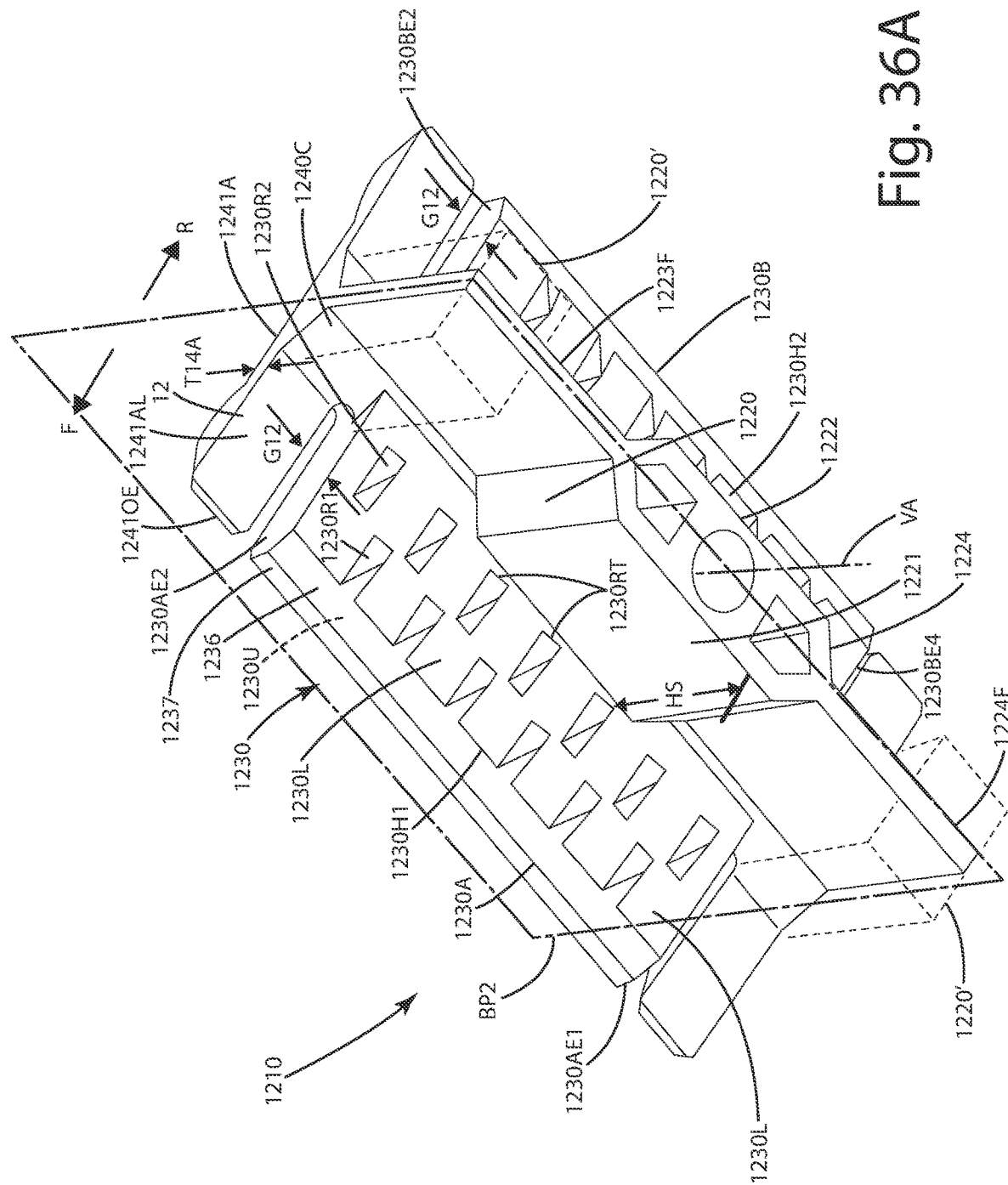
FIG. 36A is a bottom perspective view of the fastener unit.

As mentioned above, the grip element 1230 can be integrally formed with the spacer block 1220. With reference to FIGS. 34-36A, the grip element 1230 can extend outward from the front 1221 and rear 1222 surfaces of the spacer block, at least in the area around the vertical axis VA. The grip element 1230 optionally can be a greater length L5 then the length L6 of the spacer block 1220. The length L5 of the grip element however can be less than the overall length L7 of the fastener unit extending to the outermost side surfaces of the unit. The grip element can be disposed above the spacer body. As shown, the grip element can be located a height HS above the lower surface 1220L of the spacer body 1220. This height HS optionally can be less than, equal to, or greater than the height HG at which the first groove of the board is from the lower surface 101L of the board 101 as shown in FIG. 37. Where the height HS is less than the height HG, when the fastener unit 1210 is installed, the spacer body lower surface 1220L does not contact or substantially engage the upper surface of the underlying joist 106U. In such a case, the lower surface can be disposed a small distance HL above the joist. Of course, where height HS is the same as or greater than the height HG, that surface 1220L can engage the upper surface 106U of the joist 106.

Optionally, the grip element 1230 can include on its lower surface 1230L a multitude of grip ridges 1230R. As shown in FIGS. 35, 36A and 37, these grip ridges 1230R can extend downwardly from the lower surface 1230L. As shown, there can be one or more rows 1230R1 and 1230R2 of the ridges disposed on each of the grip element overhangs 1230H1 and 1230H2, which are disposed on opposite sides of the bisecting plane BP2, and generally associated with the different grip element parts 1230A and 1230B. These ridges can extend from the lower surface 1230L by a ridge height RH. This ridge height RH can be less than the thickness of the grip element in some cases. The individual ridges can be separated from one another a preselected distance and spaces along the lower surface 1230L and overhangs 1230H1 and 1230H2. The rows of ridges can extend beyond the length L6 of the spacer body 1220, and outward therefrom.

The ridges 1230R can be of a generally triangular shape as shown in FIGS. 36A and 37. Optionally, the ridges can be of other polygonal, rounded, hemispherical, or other shapes depending on the application and suitable engagement with the lower surfaces of the board grooves. The ridges also can be configured so that the tips 1230RT of the individual ridges 1230R are disposed closer to the spacer body 1220 than the front edges 1230FE of the ridges, optionally when the ridges are in a triangular or polygonal shape. The tips also can include a rear wall 1230RW, below the tips 1230RT, which can extend optionally perpendicularly to the grip element lower surface 1230L. With the tips in this configuration, they optionally can bite into the groove lower surface 109L, as shown for example in FIG. 37. Each of the ridges 1230R optionally can include a landing surface 1230L that is generally a flat or planar surface on the outermost extremity of the ridge, distal from the bisecting plane BP2, which transitions to the edge 1230FE of the ridge. The outer row 1230R1 of the ridges optionally can have landings 1230L that transition to a ramped or wedge surface 1236. This ramped surface 1236 can be at an angle relative to the lower surface 1230L of the grip element 1230. Optionally, the landing surfaces 1230L and the ramped surfaces 1236 of the ridges in the first row 1230R can lay in the same plane. The ramped surfaces 1236 can be configured to facilitate insertion of the grip element 1230 in a respective groove 109 of the first board 101 and/or a second groove 110 of the second board 102.

As shown in FIG. 36A, the respective ridges in the first row 1230R1 can be offset relative to the second ridges in the second row 1230R2. In some cases, the ridges in the second row can be centered relative to the ridges in the first row 1230 R1. Of course, other configurations can be selected depending on the application. Optionally, the offsetting of the ridges from one row to the next can distribute the forces exerted by the respective ridges against the lower surfaces of the grooves when the fastener unit is fastened down via the fastener 1290 being advanced into the underlying joist.

The grip element 1230 as noted above can extend outwardly from the spacer block 1220 on opposite sides of the bisecting plane BP2 in a cantilevered manner. The grip element also can extend outwardly over the flanges 1223F and 1224F in these directions. Optionally, in some cases, the flanges 1224F, 1223F can include additional spacer blocks 1220' on opposite sides of the spacer block, shown in broken lines in FIG. 36A. These spacer blocks can be disposed under the respective resilient compression elements at the opposing ends of the fastener unit 1210. These additional spacer blocks can include a thickness that is the same as, less than, or greater than the thickness T13, depending on the application.

The grip element 1230 can include outer lateral edges. For example, as shown in FIGS. 36 and 36A, the first part 1230A of the grip element 1230 that extends to the front F of the bisecting plane BP can be bounded by respective outer lateral edges 1230AE1, 1230AE2. A second part 1230B of the grip element 1230 that extends from the fastener unit 1210 on the opposite side, to the rear R of the bisecting plane BP2, can be bounded by respective outer lateral edges 1230BE2 and 1230BE4. These lateral edges can extend inwardly toward the flanges 1223F and 1224F and/or the spacer block depending on their location and the width of the parts of the grip element. These lateral edges can transition to respective transition corners 1240C that extend inwardly toward the bisecting plane BP2 under the grip element parts.

The respective lateral edges of the grip element parts 1230A and 1230B can be separated by respective elongated slots or gaps G12 from the respective resilient compression elements 1241, 1242, 1243 and 1244. The elongated slots or gaps G12 can be of a width that optionally can be less than the length of the grip element L5, less than the length of the spacer body L6, and/or less than the width WA of each of the respective resilient compression elements and any wings thereof. In some cases, the elongated slots or gaps G12 can have a width or dimension that is at least one tenth, at least one quarter, at least one half, less than half, or less than the width WA of the compression elements and/or their wings. Of course in other cases, these elongated slots or gaps G12 can be of a width greater than or equal to the width WA. In some cases, the widths WA of the resilient oppression elements or wings 1241, 1242 on opposite sides of the vertical axis VA can be equal, greater than or less than one another. The same is true for the resilient compression elements and/or wings 1243 and 1244 on the opposite sides of the bisecting plane BP2. The elongated slots or gaps G12 also can be of a length L8 (FIG. 34) that is greater than the width WA of the respective arms, but as less than the length of the spacer body and/or the width of the grip element part 1230A that extends outward from the bisecting plane BP2.

Turning to FIGS. 34, 36 and 36A, the resilient compression elements will be described in more detail. To begin, the resilient compression elements can be configured to move, reorient, or change shape or configuration so as to fit within a respective groove of a board. In general, the resilient compression elements can be configured to secure the spacer block adjacent one or more grooves of one or more boards that lie adjacent one another. In turn, this can establish a gap between the adjacent boards via the spacer block. The resilient compression elements can optionally compress substantially vertically and/or dynamically toward and/or away from a reference plane RP, which can be aligned with and/or contiguous with and/or below the lower surface 1230L of the grip element 1230.

As mentioned above, each of the respective resilient compression elements 1241, 1242, 1243 and 1244 can include respective wings 1241W 1242W, 1243W, and 1244W. Each of the resilient compression elements and respective wings can be spaced laterally outward from the respective edges of the grip element. In effect, these wings can be spaced farther from the lateral sides 1223 and 1224 of the spacer body than the edges of the grip element for example 1230AE2, 1230AE1, 1230BE2 and 1230BE4. Indeed, the wings can be disposed outwardly relative to these edges from the vertical axis VA. Each of the wings can be substantially identical as illustrated. Of course in other applications, the wings can differ in structure, shape and operation, depending on the application.

For purposes of this disclosure, only one of the wings 1241W will be described in substantial detail, with the understanding that the other wings can have similar or identical components, structure and function. With reference to FIGS. 35 and 36, the first wing 1241W can include a first elongated arm 1241A that extends in a cantilevered manner away from the bisecting plane BP2 of the fastener unit 1210. As mentioned above, this bisecting plane BP2 can have the vertical axis VA coincident with it. The first elongated arm 1241A can include a proximal end 1241P and a distal end 1241D. The proximal end 1241P can be joined with a central extension 1230C of the grip element 1230 and/or the spacer block 1220 that extends toward the outermost side surfaces of the fastener unit. The arm 1241A can include an upper surface 1241AU that can lay within same plane as the upper surfaces of one or more of the spacer block and/or grip element. Optionally, the upper surfaces of each of these elements, that is the upper surface 1230U and 1220U, can lay within same plane and can be the same as one another. Indeed, the spacer block and grip element can be contiguous with one another vertically and/or horizontally within the fastener unit 1210.

With further reference to FIGS. 36 and 36A, the first elongated arm 1241A can also include a lower surface 1241AL. This lower surface 1241AL can be disposed above the lower surface 1230L of the grip element, but below the upper surface 1230U of the grip element. The elongated first arm 1241A also can have a thickness T14B that is less than the thickness of the grip element and/or the thickness of the spacer body. The first wing 1241A can include an end portion 1241E that is joined at the distal end 1241D. This end portion can optionally include a curved upper portion 1241EC and/or a ramped portion 1241 ER. As shown the curved portion can transition to the ramped portion. The ramped portion 1241ER can transition to the outer edge 1241OE of the wing 1241W. This outer edge 1241OE can extend out from the bisecting plane BP2 the same distance as the outer edge 1237 of the grip element 1230 on the same side of the bisecting plane BP2. In other applications, this edge can be recessed relative to the edge 1237 and can terminate closer to the bisecting plane BP2, or can extend beyond the edge 1237.

The first end portion 1241E as mentioned above can include a ramped portion 1241ER. This ramped portion 1241ER can be angled at an angle A2 relative to the reference plane RP. This angle A2 optionally can be less than 90°, less than 60° degrees, less than 45°, less than 30°, between 0° and 60°, inclusive, between 0° and 50°, inclusive or about 45°. This ramped surface on the outer end of the wing can allow the wing to vertically compress downward relative to the reference plane RP when the grip element and resilient compression elements 1241, 1242 are inserted into a groove 109 of the board. For example, as shown in FIG. 37, the fastener unit can be moved in direction R5 so that the arm 1241 and wing 1241W (as well as the other arm 1242 and wing 1242W on the opposing side, but not shown) are inserted into the groove 109. When this occurs, the ramped portion 1241ER can engage the corner 109C, which may be angled or rounded depending on the board. The corner can exert a downward force F8 on the ramped portion and thus the wing 1241W. As a result, the elongated arm 1241A can bend or flex resiliently and/or dynamically. The arm or wing can bend or flex about a fixed axis, or dynamically bend or flex about multiple axes. In so doing, the end portion 1241E can move downward relative to the reference plane RP. As this occurs, the fastener unit 1210 continues to be moved in direction R5 by user. The grip ridges 1230R also can engage the lower surface 109L of the groove 109. The upper surface 1230U of the grip element 1230 can contact and/or engage the upper surface 109U of the groove. The ramped portion 1241ER and/or the portion 1241EC, which optionally can be curved, also can engage this upper surface 109U of the groove after that portion passes the corner 109C and can continue to move or slide along this upper surface, farther into the groove.

Optionally, as the force F8 is exerted by the groove against the wing to flex or bend it downward, opposite corresponding forces are exerted by the wing against the groove. As a result, the resilient compression element vertically compresses, and optionally the wing is compressed downward, and the arm and/or end portion can bend or flex. In general, the first wing 1241W, as well as the second wing 1242W, can move up and down beside, but spaced from, the grip element and the respective edges of the grip element, when the first wing, second wing and grip element are simultaneously placed in the groove 109. Further, as the resilient compression elements and wings are compressed, they exert another force on the associated grip element and ridges under the parts of the grip element. For example, the wings urge and press the grip element and ridges downward inside the groove, toward the lower surface 109L of the groove. This in turn causes the grip element part 1230A and any associated ridges 1230R to press down and against the lower surface of the groove. Optionally, the wings of the resilient compression elements can engage the upper surface of the groove, without engaging the lower surface of the groove, simultaneously while the grip element and/or any ridges engage the lower surface of the groove, without engaging the upper surface of the groove.

As shown in FIG. 37, the fastener unit 1210 can be moved farther in direction R5 until the spacer block 1220 and in particular the front surface 1221 engages the lower side surface 101S of the board 101 under the groove 109. Due to the optional vertical compression of the resilient compression elements 1241 and 1242 on the same side of the bisecting plane BP2 within the first groove 109, and the opposing corresponding force of those elements on the upper surface 109U of the groove, the spacer body 1220 is held in place adjacent the board and more particularly against the side surface 101S of the board under the groove 109. In general, the fastener unit 1210 is held in place against the side surface of the board 101, and near the grove 109, with portions of the fastener unit disposed in the groove to support it there.

Optionally, as shown in FIGS. 34 and 36, the resilient compression elements can be disposed on opposite sides of the respective grip element parts 1230A and 1230B. For example, the grip element part 1230A can be disposed between the first compression element 1241 and the second compression element 1242, and their respective wings. The second part 1230B of the grip element 1230 can be disposed between the third compression element 1243 and fourth compression element 1244, and their respective wings.

A method of using the fastener unit 1210 of this embodiment will be described with reference to FIGS. 37 and 38. In general, the method can include: providing a fastener unit including a fastener, a spacer block defining a first fastener hole, a grip element projecting outward from the spacer block, with the first fastener projecting into the first fastener hole so that the first fastener is fixedly supported and held within the first fastener hole such that a head of the first fastener projects above the spacer block, a first resilient compression element extending from the spacer block, and a second resilient compression element extending from the spacer block; placing the fastener unit over a joist; positioning the grip element so the grip element extends into a first groove of a first board; and advancing the fastener through the first fastener hole of the spacer block, wherein the head of the fastener forces the grip element into engagement with the first groove, thereby urging the first board toward the joist.

More particularly, with reference to FIG. 37, the fastener unit 1210 can be moved in direction R5 toward a side surface 101S of a first board 101. The first board can define a groove 109 having an upper groove surface 109U and a lower groove surface 109L. The grip element 1230 and arms 1241,1242 of the same side F of the bisecting plane BP2 as the front surface 1221 of the spacer body 1220 can be inserted into the groove 109. As described above, the ramped portion 1241ER of the wing 1241W (as well as the ramped portion and wing of the arm 1242) can engage the corner 109C and/or upper surface 109U of the recess. As this occurs, the wing and resilient compression elements in general forcibly engage the recess with a force that corresponds and is reactive to the force F8. The compression elements vertically compress relative to the reference plane RP and bend about the respective arms. Due to the reactive forces exerted by the compression elements and/or wings, the grip ridges 1230R are urged downward, and can engage the lower surface 109L of the first groove 109.

The fastener unit 1210 can continue to be moved in direction R5 of the user. The spacer body 1220 can engage the side surface 101S of the board 101. The resilient compression elements optionally can secure the fastener unit in place so that the spacer body remains with the front surface 1221 engaging the side surface 101S. Optionally, the lower surface 1220L of the spacer block is spaced a distance HL above the upper surface 106U of the joist. Optionally, where the spacer block 1220 is longer, it may slightly and/or fully engage the upper surface.

Further optionally, although not shown in this particular embodiment, when the grip element part 1230A and the respective resilient compression elements 1241, 1242 are fully inserted in the first groove 109, part of the fastener unit, such as a tertiary spacer block described below, also can engage the side surface 101F of the board 101 above the groove 109. In some cases, the fastener 1290 itself might engage part of that side surface 101F above the groove.

With reference to FIG. 38, the second board 102 can be moved in direction R6 toward the first board 101 and the already installed fastener unit 1210 in the first board 101. In so doing, the wings and resilient compression elements 1243 1244 and the opposing side of the bisecting plane BP2 are inserted into the second groove 110 of the second board 102. The wings of the respective compression elements 1243 and 1244 function similarly to the wings 1241 and 1242. The wings of the resilient compression elements 1233 and 1244 can vertically compress and exert a force on the upper surface of the second groove 110. This urges the fastener unit down, which in turn causes the grip element part 1230B and its ridges to engage the lower surface of the groove. The board 102 can be moved until its side surface 102F below the groove 110 engages the rear surface 1222 of the spacer block 1220. The spacer block is thus sandwiched between the side surfaces 101S and 102F of the respective first and second boards. In turn, this maintains a gap G13 between the board side surfaces. This gap G13 corresponds to the thickness T13 of the spacer body located between the side surfaces.

With the fastener unit 1210 installed relative to the first and second grooves of the first and second boards, a tool 111 can be used to rotate the fastener 1290, for example in direction R7. As this occurs, the threads of the fastener 1290 and the tip advance through the respective first fastener hole, and its upper and lower portions as described above. The tip 1290TP penetrates through the lower surface 1220L of the spacer block, then penetrates the upper surface 106U of the joist 106. The fastener continues to advance until the head 1290H of the fastener engages the fastener unit. When this occurs, the fastener unit is moved downward and the grip ridges 1230R further engage the lower surfaces 109L and 110L of the respective first and second grooves to grip the boards and hold them in place. The faster 1290 can be advanced so that the upper surface 1290HU of the head 1290H is above, flush with or below the upper surfaces 1220U and/or 1230U of the spacer block and/or grip element.

Another alternative embodiment of the fastener unit is illustrated in FIGS. 39-42 and generally designated 1310. The fastener unit of this embodiment is similar in structure, function and operation to the embodiments described above with several exceptions. For example, this unit 1310 can include a fastener 1390 similar to the fasteners described above. It also can include a grip element 1330 extending from a spacer block 1320. The grip element 1320 optionally can extend from and beyond the front and rear surfaces 1321, 1322 of the spacer block 1320. The spacer block 1320 can be configured to establish a gap G14 between adjacent boards, and sized with a thickness T14C similar to the thicknesses T1-T14 above. This unit 1320 also can include first 1341 and second 1342 compression elements that extend outward from the bisecting plane BP2. In this embodiment, however, the resilient compression elements might only extend from the front side F of the bisecting plane BP2. These compression elements also can be of a size, shape and configuration similar to that in the embodiment shown above in FIGS. 29-32.

The first and second compression elements can be similar in structure and function so only the first resilient compression element 1341 will be described here. The compression element 1341 can include a wing 1341W which can include a movable wing portion 1341M and an immovable or fixed wing portion 1341I. The movable wing portion 1341M can be joined at a transition 1341T to the immovable or fixed wing portion 1341I. The movable wing 1341M can be vertically compressed and/or moved in direction R8 when installed in a groove.

Figure 42:
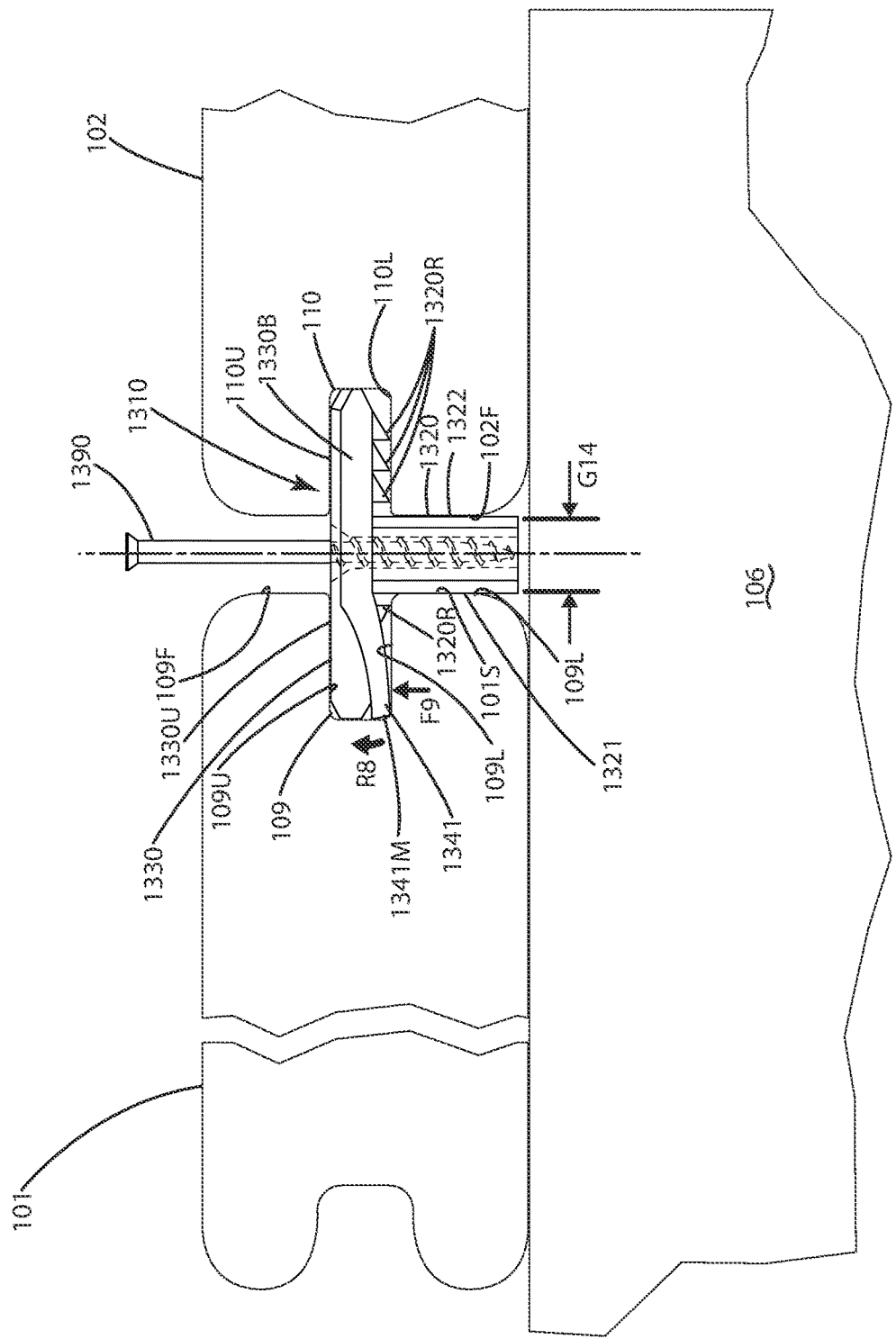
FIG. 42 is another side view of the fastener unit in the compression mode with a second board spaced from a first board by a gap and the opposing resilient compression elements further gripping a second groove of the second board so that the fastener unit is supported between the first and second boards.
Figure 43:
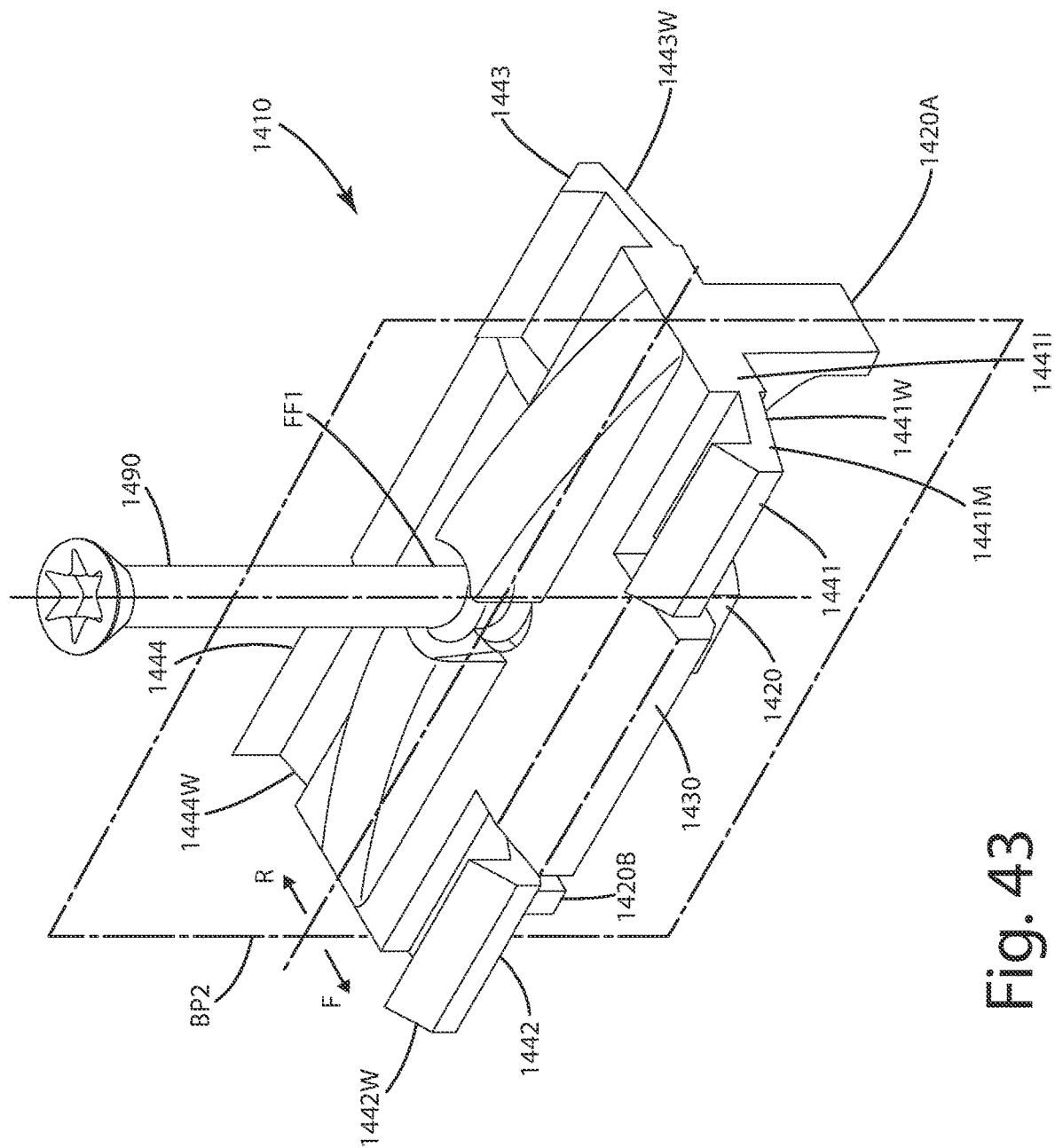
FIG. 43 is a perspective view of still another alternative embodiment of the fastener unit including a fastener associated with the unit
Figure 44:
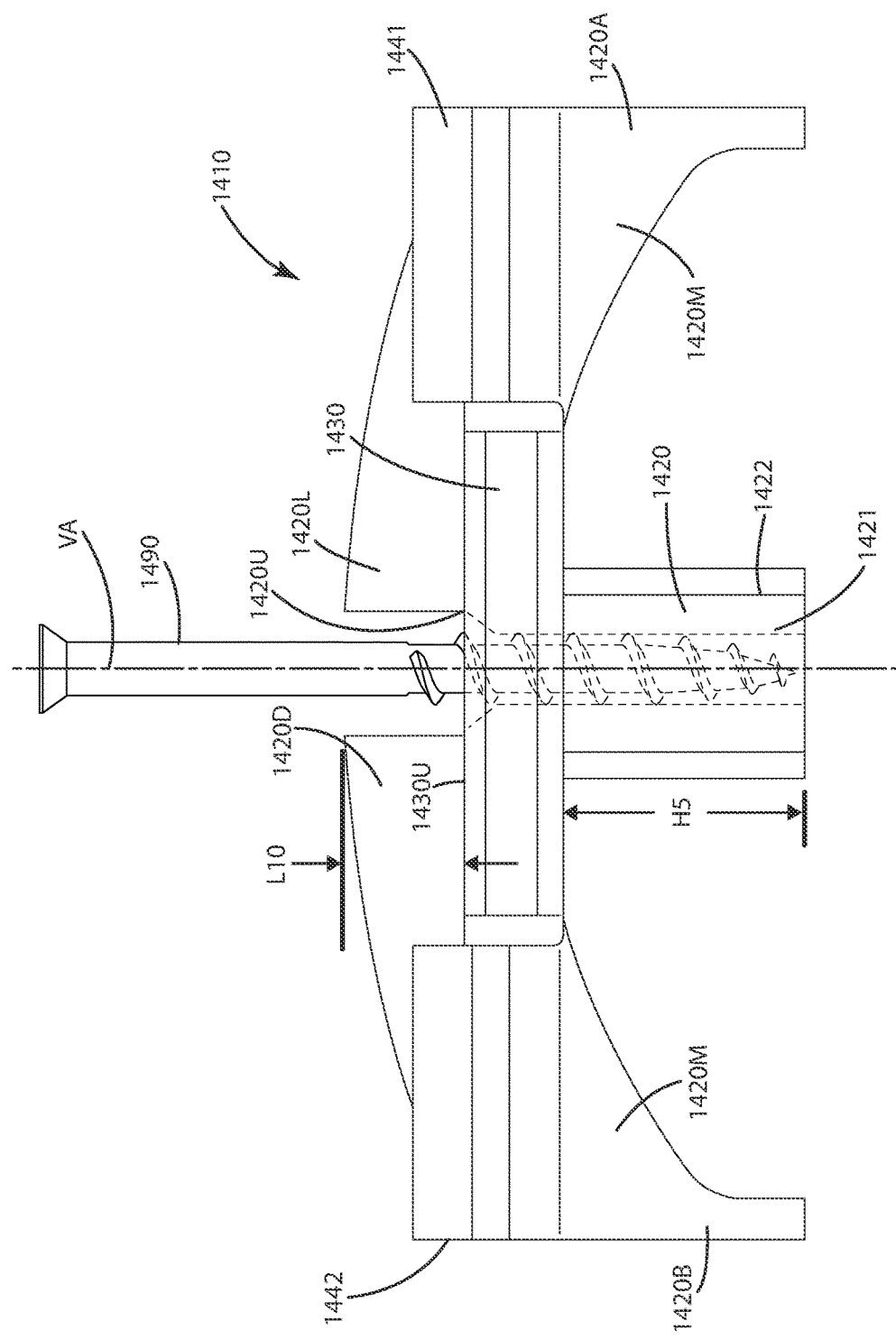
FIG. 44 is a right side front view of the fastener unit, the left side being a mirror image thereof.
Figure 45:
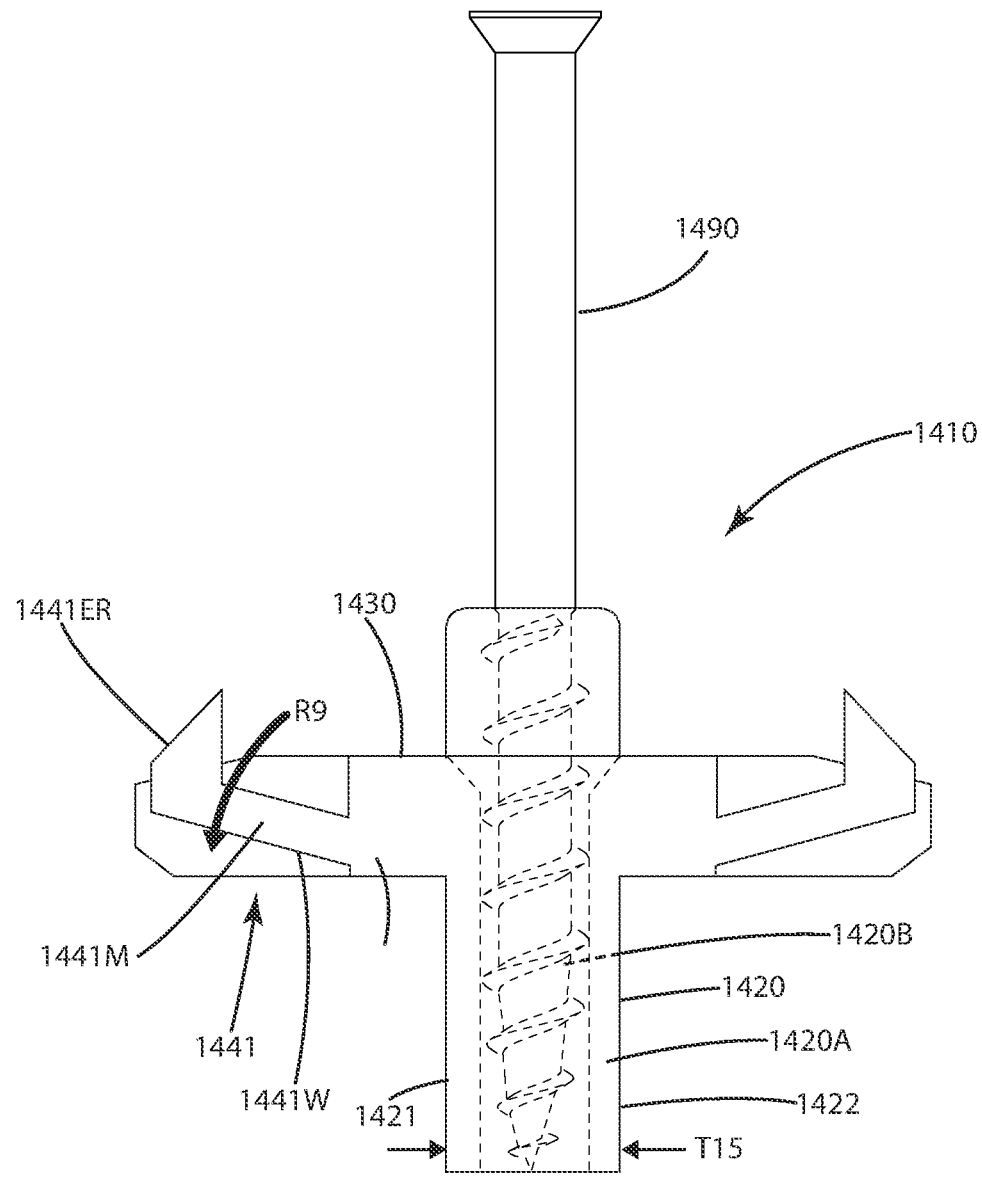
FIG. 45 is a front view of the fastener unit

This can be understood with a description of a method of installing the fastener unit 1310 relative to boards. Referring to FIG. 42, the fastener unit 1310 can first be installed relative to a first groove 109 of the first board 101. To do so, a user can install the first wing 1341 in the groove 109. The user can then tilt the fastener 1390 toward the upper side surface 109F of the board and slide the wing and compression element into the groove 109. As this occurs, the wing is pushed upward in direction R8 under the force F9 exerted by the board. Of course, the wing exerts a corresponding force, opposite the force F9. This pushes the grip element 1330 and the upper surface 1330U of the grip element upward against the upper surface 109U of the groove 109. The movable portion of the wing 1341M exerts a vertical force upward to push the grip element 1330 into the upper surface of the groove. The movable wing 1341M remains flexed or bent when initially installed in the first groove 109. Again this exerts a force on the groove by the fastener unit to secure the spacer body adjacent the first side surface 101S of the first board 101.

The second board 102 then can be moved over the joist 106 toward the first board 101 such that the opposing part 1330B of the grip element enters into the second groove 110 of the second board. As it does so, the upper surface 1330U of the grip element can engage the upper surface 110U of the groove 110 while the ridges 1320R engage the lower surface 110L of the groove 110. The fastener 1390 can be advanced to secure the fastener unit in place, and secure the boards 101 and 102 against the joist, with the grip element 1330 pulling down on them, as described in connection with the embodiments above.

A further alternative embodiment of the fastener unit is illustrated in FIGS. 43-46 and generally designated 1410. The fastener unit of this embodiment is similar in structure, function and operation to the embodiments described above with several exceptions. For example, this unit 1410 can include a fastener 1490 similar to the fasteners described above securely joined with the fastener unit 1410. It also can include a grip element 1430 extending from a spacer block 1320. The grip element 1430 optionally can extend from and beyond the front and rear surfaces 1421, 1422 of the spacer block 1420. The spacer block 1420 can be configured to establish a gap G15 between adjacent boards, and sized with a thickness T15 similar to the thicknesses T1-T14 above.

The unit 1410 can include resilient compression elements 1441, 1442, 1443 and 1444 joined with the spacer block 1420. The compression elements can include respective wings 1441W, 1442W, 1443W and 1444W. The wings can extend from the spacer block or a bisecting plane BP2 of the fastener unit on opposite front F and rear R sides of that bisecting plane BP2. The wings 1441W and 1443W can be opposite one another across the bisecting plane BP2; and the wings 1442W and 1444W can be opposite one another across the bisecting plane BP2. Optionally, the second set of wings 1443W and 1444W can be absent in some embodiments. As shown and described below, the opposing sets of wings can be used to grip and secure the grip element 1430 in opposing grooves of a first board 101 and a second board 102 simultaneously after placement.

In this embodiment, the fastener unit 1410 also can include additional elements to space one board from the next. For example, the fastener unit 1410 can include a primary spacer block 1420, but also can include secondary spacer blocks 1420A and 1420B disposed at opposite sides of the fastener unit, optionally opposing one another across the vertical axis VA. These secondary spacer blocks 1420A and 1420B can include buttresses 1420M, which extend upward toward the grip element 1430 and/or the respective compression elements. These buttresses 1420M can provide extra support for the secondary spacer blocks 1420A and 1420B. The spacer blocks also can have a thickness T15 similar or the same as the thickness of the primary spacer block 1420.

In this embodiment, the fastener unit 1410 can also include one or more tertiary spacer blocks 1420C and 14200. The tertiary spacer blocks can project above the upper surface 1430U of the grip element 1430 a preselected distance L10. This distance L10 can be less than the height HS the spacer block 1420 extending below the grip element 1430. The tertiary spacer blocks can include a thickness that is the same as the thickness T15 of the primary spacer block 1420. When this tertiary spacer blocks above the grip element 1430, the tertiary spacer blocks can engage the side surface of the board above the grooves within which the grip element 1430 extend as described below. Optionally, the tertiary spacer blocks can define a part of the first fastener hole FF1, which can be similar to the other first fastener holes of the other embodiments above.

The resilient compression elements of this embodiment also can be somewhat different from the embodiments described above. The compression elements 1441, 1442, 1443 and 1444 can be similar in structure and function so only the first resilient compression element 1441 will be described here. The compression element 1441 can include a wing 1441W which can include a movable wing portion 1441M and an immovable or fixed wing portion 1441I. The movable wing 1441M can be vertically compressed and/or moved in direction R9 when installed in a groove. The movable wing 1441M also can include an outermost ramped portion 1441ER that can facilitate entry of the wing into a groove and bending or flexing of the wing in direction R9 when so installed in the groove.

Figure 46:
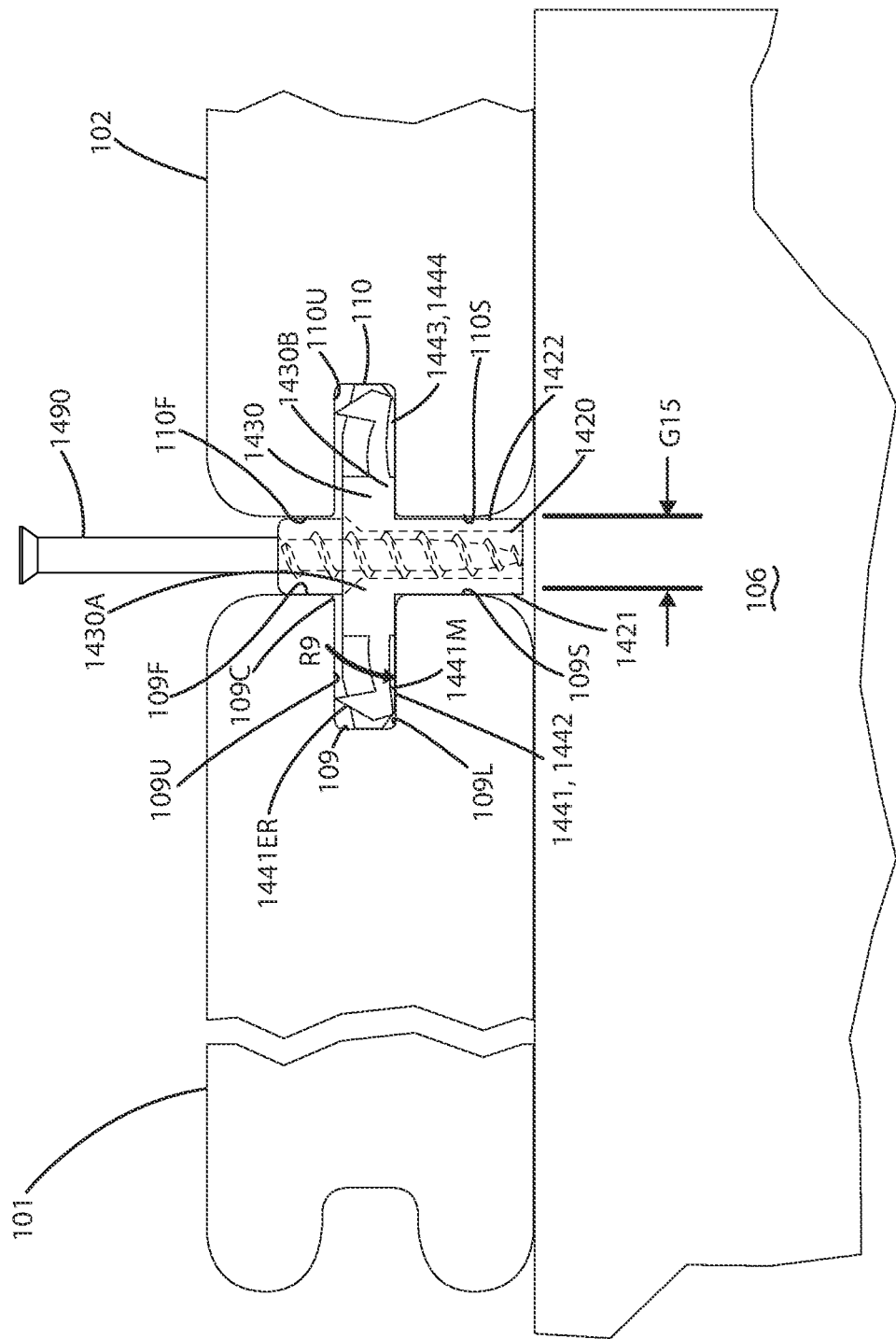
FIG. 46 is another side view of the fastener unit in the compression mode with a second board spaced from a first board by a gap and the opposing resilient compression elements further gripping a second groove of the second board so that the fastener unit is supported between the first and second boards.
Figure 47:
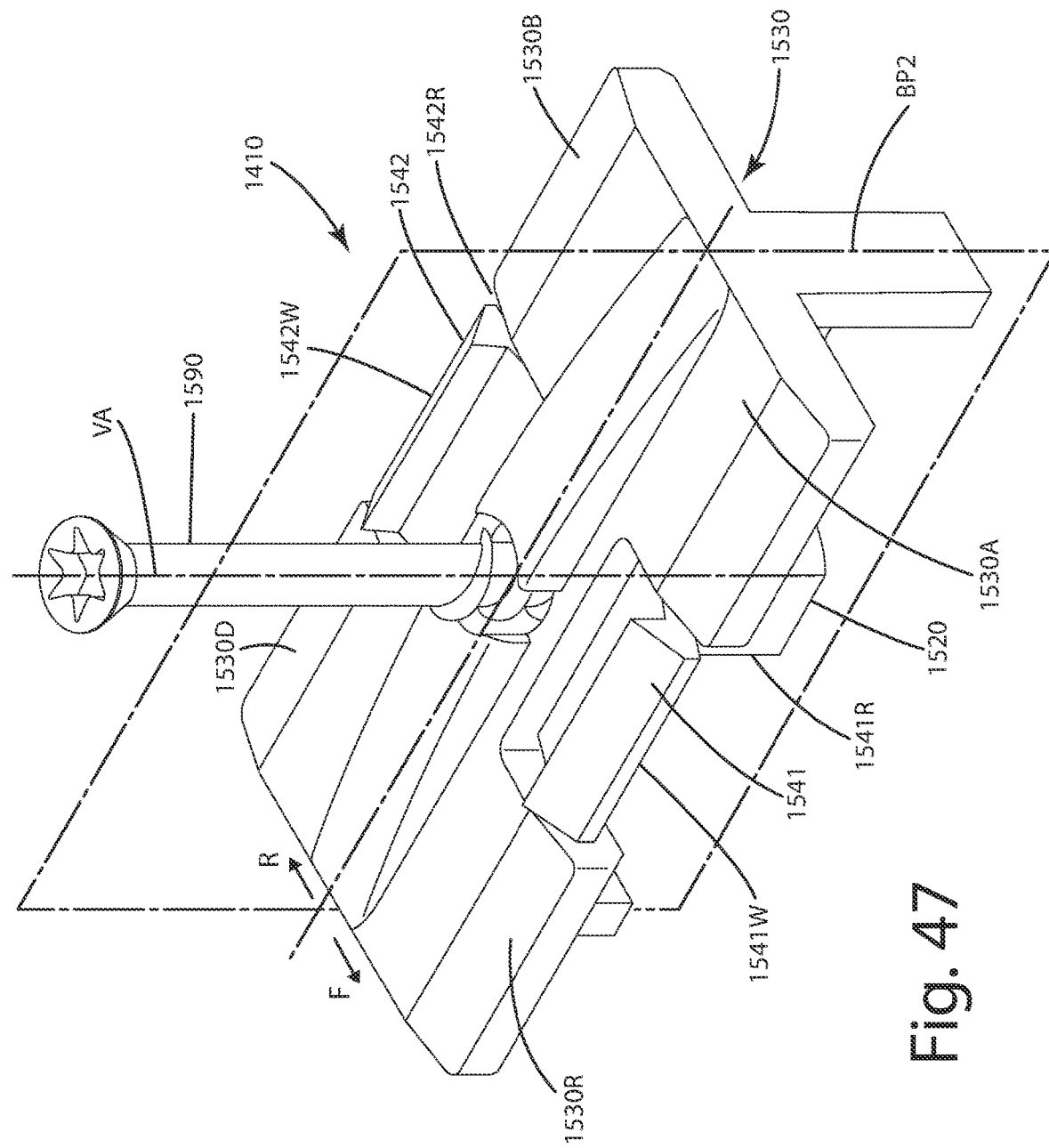
FIG. 47 is a perspective view of still another alternative embodiment of the fastener unit including a fastener associated with the unit
Figure 48:
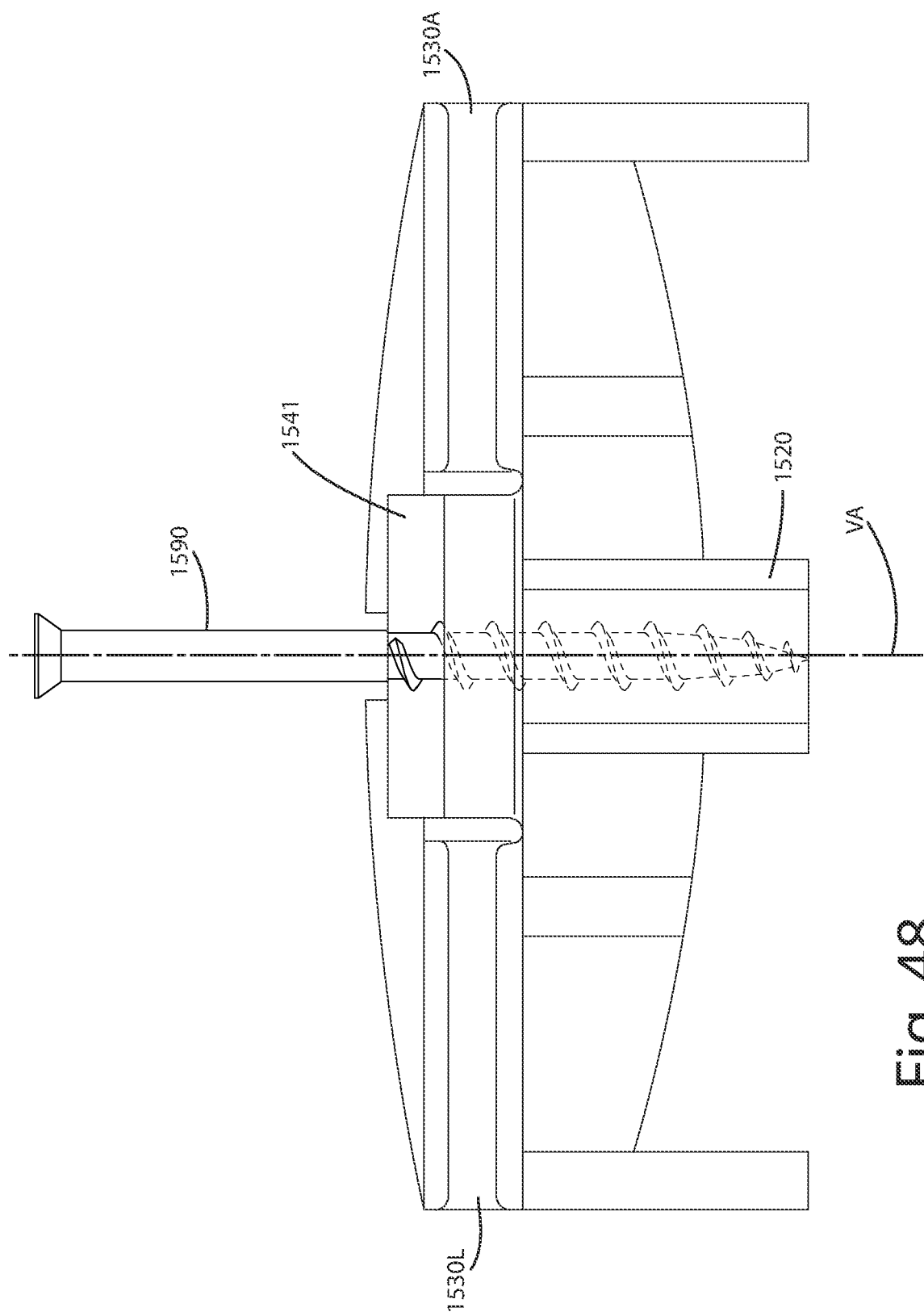
FIG. 48 is a right side front view of the fastener unit, the left side being a mirror image thereof.
Figure 49:
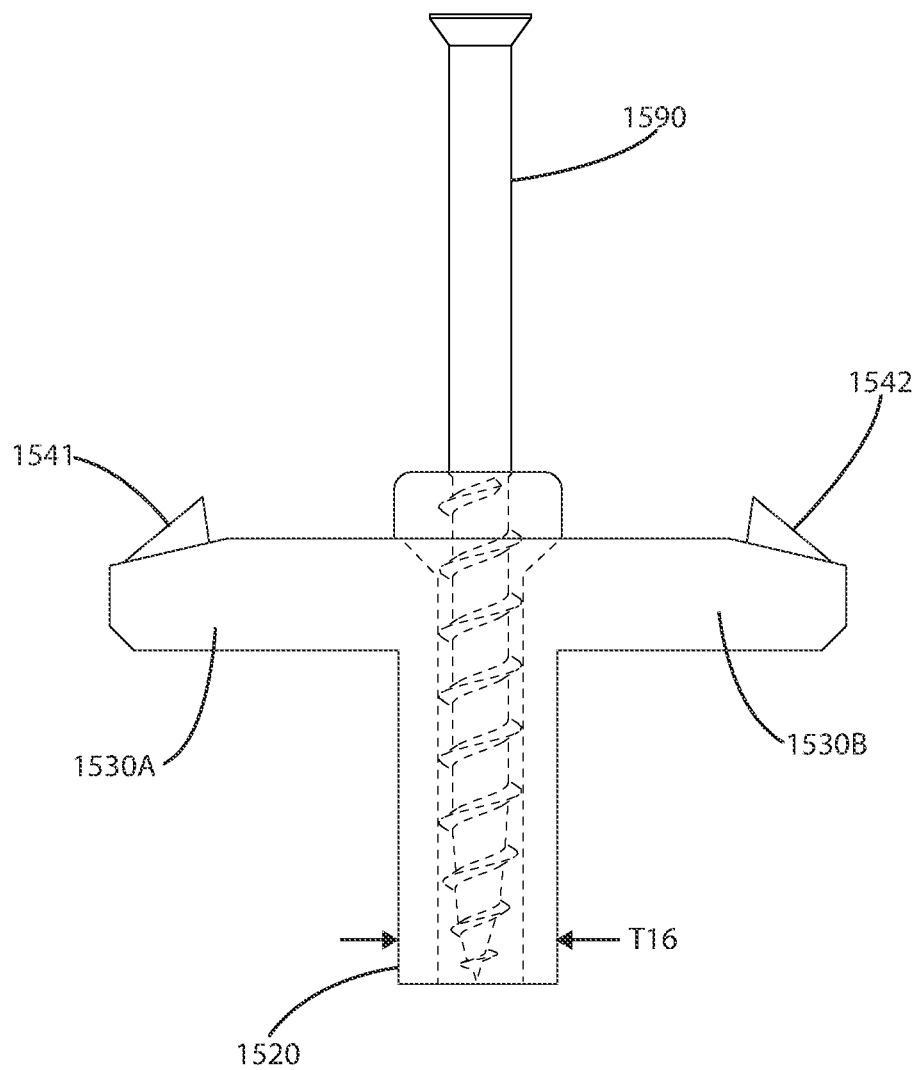
FIG. 49 is a front view of the fastener unit.

This can be understood with a description of a method of installing the fastener unit 1410 relative to boards. Referring to FIG. 46, the fastener unit 1410 can first be installed relative to a first groove 109 of the first board 101. To do so, a user can install the first and second resilient compression elements 1441 and 1442 along with the first part 1430A of the grip element 1430 in the groove 109. As the user does so, the movable portion 1441M of the wing 1441 bends or flexes in direction R9. The engagement of the ramped portion 1441ER with the corner 109C of the groove 109 can assist in moving the wing in this direction. With the wing bent, it exerts a force against the upper surface 109U of the groove. A corresponding, opposite force is exerted on the grip element so that it is urged downward against the lower surface 109L of the groove. The wing thus biases itself and the grip element against the respective upper and lower surfaces of the groove to secure the grip element and fastener unit within the groove. In so doing, the spacer block 1420 also can be brought into engagement with the side surface 109S of the board. The secondary spacer blocks 1420A and 1420B can be brought into engagement with that side surface 109S under the groove. In addition, the tertiary spacer blocks 1420C and 1420D can be brought into engagement with the side surface 109F of the first board 101 above the groove 109.

The second board 102 then can be moved over the joist 106 such that the opposing part 1430B of the grip element and the compression elements 1443 and 1444 enter into the second groove 110 of the second board 102. As these elements do so, the resilient compression elements 1443 and 1444 engage the upper surface 110U in a similar manner to that of the first and second compression elements described above. This, in turn, further secures the grip element and the associated compression elements within the second groove 110. The spacer block 1420, the secondary spacer blocks 1420A and 1420B also engage the side surface 110S below the second groove 110. Any included tertiary spacer blocks 1420C and 1420D also engage the side surface 110F above the groove 110. The fastener 1390 then can be advanced to secure the fastener unit in place, and secure the boards 101 and 102 against the joist, with the grip element 1330 pulling down on them, as described in connection with the embodiments above.

A further alternative embodiment of the fastener unit is illustrated in FIGS. 47-50 and generally designated 1510. The fastener unit of this embodiment is similar in structure, function and operation to the embodiments described above with several exceptions. For example, this unit 1510 can include a fastener 1590 similar to the fasteners described above to secure boards joined with the fastener unit 1510. It also can include a grip element 1530 extending from a spacer block 1520. The grip element 1530 optionally can extend from and beyond the front and rear surfaces 1521, 1522 of the spacer block 1520. The spacer block 1520 can be configured to establish a gap between adjacent boards, and sized with a thickness T16 similar to the thicknesses T1-T15 above.

This fastener unit 1510 can include first 1541 and second 1542 compression elements extending on opposite sides of a bisecting plane BP2. These first and second compression elements 1541 and 1542 can be similar to the compression elements 1441-1444 described above. In this embodiment, however, these compression elements and the associated wings 1541W and 1542W are disposed between different parts of the grip element 1530 opposite sides of the vertical axis VA. For example, the first wing 1541W can be disposed in a recess 1541R between a first grip element part 1530A and a second grip element part 1530C. The second wing 1542W can be disposed on the opposite side of the bisecting plane BP2, and in a second recess 1542R, located between the third grip element part 1530B and a fourth grip element part 15300.

The first and second wings 1541W and 1542W and compression elements 1541, 1542 can be similar to those of the embodiments described immediately above. For example, in use, the fastener unit 1510 can be installed such that the first compression element 1541 and associated wing 1541W, as well as the grip element parts 1530A and 1530C are inserted into a first groove 109 of a first board 101. Insertion can continue until the spacer block 1520, as well as any secondary and tertiary spacer blocks shown in the figures, engage the respective side surfaces 101S above and 101F below the first groove 109. The second board 102 can then be slid or moved along the joist 106 such that the second wing 1542W and second resilient compression element 1542 enter the second groove 110 of the second board 102. When this occurs, the wing can compress and exert a force against the upper surface of the second groove, which also can cause the grip element parts 1530B and 1530D to engage the lower surface of the second groove, thereby securing the fastener unit relative to the second groove and second board. As with the embodiments above, wings and the resilient compression elements can forcibly expand and engage the grooves to hold the fastener unit 1510 adjacent the board surfaces by exerting forces on the interior surfaces of the respective grooves. The spacer block 1520 can establish the appropriate gap between the first and second boards. The fastener 1590 can be installed and advanced into the underlying joist 106 to secure the fastener unit between the boards, and to secure or clamp the boards 101 and 102 to the underlying joist 106.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientations.

In addition, when a component, part or layer is referred to as being "joined with," "on," "engaged with," "adhered to," "secured to," or "coupled to" another component, part or layer, it may be directly joined with, on, engaged with, adhered to, secured to, or coupled to the other component, part or layer, or any number of intervening components, parts or layers may be present. In contrast, when an element is referred to as being "directly joined with," "directly on," "directly engaged with," "directly adhered to," "directly secured to," or "directly coupled to" another element or layer, there may be no intervening elements or layers present. Other words used to describe the relationship between components, layers and parts should be interpreted in a like manner, such as "adjacent" versus "directly adjacent" and similar words. As used herein, the term "and/or" includes any and all combinations of one or more of the associated listed items.

The above description is that of current embodiments of the invention. Various alterations and changes can be made without departing from the broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements as "at least one of X, Y and Z" is meant to include any one of X, Y or Z individually, any combination of X, Y and Z, for example, X, Y, Z; X, Y; X, Z; Y, Z, and/or any other possible

What is claimed is:

1. A fastener unit adapted to secure at least one board to a support, the fastener unit comprising:
   a spacer block defining a first fastener hole configured to receive a fastener therein, the spacer block including a front surface, an opposing rear surface, a first side surface and a second side surface opposite the first side surface, the spacer block having a thickness extending from the front surface to the rear surface, the thickness configured to span in a gap between a first board and an adjacent second board, the first fastener hole including an upper portion having an upper portion diameter and a lower portion having a lower portion diameter, the lower portion diameter being less than the upper portion diameter;
   a grip element extending from the front surface of the spacer block, the grip element configured to fit in a first groove defined by the first board; and
   a first resilient compression element and a second resilient compression element extending from the front surface of the spacer block on opposing lateral sides of the grip element, configured to secure the spacer block adjacent the first groove within a gap between the first board and the second adjacent board,
   wherein the first resilient compression element is spaced laterally and outwardly distal from the grip element and is configured to engage an upper surface of the first groove,
   wherein the second resilient compression element is spaced laterally and outwardly distal from the grip element and is configured to engage the upper surface of the first groove,
   wherein the grip element includes a lower surface configured to frictionally engage a lower surface of the groove distal from the upper surface of the first groove.

2. The fastener unit of claim 1 comprising:
   a fastener including a tip with threads extending above the tip, the tip disposed within the lower portion and the threads disposed within the upper portion.

3. The fastener unit of claim 1 comprising:
   a fastener including a tip with threads extending above the tip, which is pointed,
   wherein the grip element and spacer body are an integrally formed, single piece unit constructed from a polymeric material,
   wherein the tip bites into the lower portion so that the fastener is threaded into the spacer block so that it is secured thereto via the interaction with the first fastener hole.

4. The fastener unit of claim 1,
   wherein the lower surface of the grip element comprises a plurality of grip ridges that engage the lower surface of the first groove.

5. The fastener unit of claim 1,
   wherein at least one of the first resilient compression element and the second resilient compression element includes a first wing that forcibly engages the first groove.

6. The fastener unit of claim 1,
   wherein the grip element, the spacer block and the first and second compression elements form an integral polymeric single piece unit,
   wherein a fastener is fixedly supported in an upright manner extending orthogonally from the spacer block via engagement of threads of the fastener with the spacer block.

7. The fastener unit of claim 1 comprising:
   a threaded fastener supported by the spacer block within the first fastener hole and threaded into at least one of the upper portion and the lower portion.

8. The fastener unit of claim 1,
   wherein the grip element, spacer block and first and second resilient compression elements form an integral polymeric unit.

9. A fastener unit adapted to secure at least one board to a support, the fastener unit comprising:
   a spacer block defining a first fastener hole configured to receive a fastener therein, the spacer block including a front surface, an opposing rear surface, a first side surface and a second side surface opposite the first side surface, the spacer block having a thickness extending from the front surface to the rear surface, the thickness configured to span within a gap between a first board and a second adjacent board, the spacer block extending downward from an upper surface to a lower surface, the first fastener hole extending through the spacer block such that the spacer block forms a bore sidewall that surrounds the first fastener hole; and
   a grip element extending from the front surface of the spacer block, the grip element configured to fit in a first groove defined by the first board; and
   a first resilient compression element and a second resilient compression element extending from the front surface of the spacer block on opposing lateral sides of the grip element, configured to extend into the first groove and thereby secure the spacer block adjacent the first groove within a gap between the first board and the second adjacent board,
   wherein the first resilient compression element is spaced laterally and outwardly distal from the grip element and is configured to engage an upper surface of the first groove,
   wherein the grip element includes a lower surface configured to frictionally engage a lower surface of the groove distal from the upper surface of the groove.

10. The fastener unit of claim 9,
    wherein the first fastener hole includes an upper portion having an upper portion diameter and a lower portion having a lower portion diameter, the lower portion diameter being less than the upper portion diameter.

11. The fastener unit of claim 10 comprising:
    a fastener including a tip with threads extending above the tip, the tip disposed within the lower portion and the threads disposed within the upper portion.

12. The fastener unit of claim 9 comprising:
    a fastener including threads,
    wherein the fastener is disposed in the first fastener hole,
    wherein the threads are engaged with the bore wall such that the engagement of the threads with the bore wall supports the fastener relative to the spacer block,
    wherein the fastener is fixedly supported to extend above the upper surface before the fastener unit is installed relative to the first groove.

13. The fastener unit of claim 9 comprising:
    a fastener fixedly engaging the first fastener hole so as to fixedly support the fastener in an orthogonal orientation relative to the upper surface.

14. The fastener unit of claim 9 comprising:
a fastener threadably engaging the first fastener hole so that the fastener is fixedly secured to the spacer block before installation relative to the first groove.

15. The fastener unit of claim 9,
wherein the grip element, spacer block and first resilient compression element form an integral polymeric unit.

16. A method of using a fastener unit comprising:
providing a fastener unit including a fastener, a spacer block defining a first fastener hole, the spacer block including a front surface, an opposing rear surface, a first side surface and a second side surface opposite the first side surface, the spacer block having a thickness extending from the front surface to the rear surface, configured to span within a gap between a first board and an adjacent second board, a grip element projecting outward from the front surface of the spacer block, with the fastener projecting into the first fastener hole so that the fastener is fixedly supported and held within the first fastener hole such that a head of the fastener projects above the spacer block, a first resilient compression element extending away from the spacer block, and a second resilient compression element extending away from the spacer block, the first and second resilient compression elements extending from the front surface of the spacer block on opposing lateral sides of the grip element;
placing the fastener unit over a joist;
positioning the grip element and first and second resilient compression elements so the grip element and the first and second resilient compression elements extend into a first groove of a first board and thereby secure the spacer block adjacent the first groove within a gap between the first board and the adjacent second board; and
advancing the fastener through the first fastener hole of the spacer block,
wherein the head of the fastener forces the grip element into engagement with the first groove, thereby urging the first board toward the joist,
wherein the first resilient compression element is spaced laterally and outwardly distal from the grip element and engages an upper surface of the first groove,
wherein the second resilient compression element is spaced laterally and outwardly distal from the grip element and engages the upper surface of the first groove,
wherein the grip element includes a lower surface that frictionally engages a lower surface of the groove distal from the upper surface of the first groove.

17. The method of claim 16,
wherein the fastener is pointed,
wherein threads of the fastener are threaded into the spacer block so that the fastener is secured to the spacer block via the interaction of the threads with the first fastener hole.

18. The method of claim 16,
wherein at least one of the first resilient compression element and the second resilient compression element includes a wing that forcibly engages the first groove.

19. The method of claim 16,
wherein the first fastener hole includes an upper portion having an upper portion diameter and a lower portion having a lower portion diameter, the lower portion diameter being less than the upper portion diameter a longitudinal axis.

20. The method of claim 16,
wherein the grip element, spacer block and first resilient compression element form an integral polymeric unit.

21. A fastener unit adapted to secure at least one board to a support, the fastener unit comprising:
a spacer block defining a first fastener hole configured to receive a fastener therein, the spacer block including a front surface, an opposing rear surface, a first side surface and a second side surface opposite the first side surface, the spacer block having a thickness extending from the front surface to the rear surface, the thickness configured to span within a gap between a first board and an adjacent second board, the spacer block extending downward from an upper surface to a lower surface, the first fastener hole extending through the spacer block such that the spacer block forms a bore sidewall that surrounds the first fastener hole;
a grip element extending from the front surface of the spacer block, the grip element configured to fit in a first groove defined by a first board; and
a first resilient compression element in the form of a first wing and a second resilient compression element in the form of a second wing, the first wing and the second wing extending from the front surface of the spacer block on opposing lateral sides of the grip element and configured to extend into the first groove and thereby secure the spacer block adjacent the first groove within a gap between the first board and the adjacent second board,
wherein the first resilient compression element is spaced laterally and outwardly distal from the grip element and configured to engage an upper surface of the first groove,
wherein the grip element includes a lower surface configured to frictionally engage a lower surface of the groove distal from the upper surface of the first groove.

22. The fastener unit of claim 21,
wherein the first wing and the second wing extend above the grip element,
wherein the first wing and the second wing are configured to engage an upper surface of the first groove, without engaging a lower surface of the first groove, simultaneously while the grip element engages a lower surface of the first groove, without engaging the upper surface of the first groove.

23. The fastener unit of claim 21,
wherein the grip element, spacer block and first and second resilient compression elements form an integral polymeric unit.

* * * * *